United States Patent
Suda et al.

(10) Patent No.: US 7,275,255 B2
(45) Date of Patent: *Sep. 25, 2007

(54) DATA COMMUNICATION APPARATUS, DATA COMMUNICATION SYSTEM, DATA COMMUNICATION METHOD AND STORAGE MEDIUM

(75) Inventors: Hirofumi Suda, Yokohama (JP); Yasutomo Suzuki, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/371,537

(22) Filed: Aug. 10, 1999

(65) Prior Publication Data

US 2003/0134590 A1    Jul. 17, 2003

(30) Foreign Application Priority Data

Aug. 11, 1998 (JP) ................................. 10-226966

(51) Int. Cl.
*H04N 7/18* (2006.01)

(52) U.S. Cl. .................... 725/80; 725/81; 725/141; 725/153

(58) Field of Classification Search ............... 455/6.3, 455/3.1, 3.06; 348/6, 8, 552, 13–15, 17, 348/143, 207, 211.2, 211.3, 207.1; 725/62, 725/81, 78, 80, 82, 141, 153; 370/401; 386/46, 386/112, 109, 125, 131
See application file for complete search history.

(56) References Cited

U.S. PATENT DOCUMENTS

| 5,579,239 | A | * | 11/1996 | Freeman et al. | ............ 364/514 |
| 5,666,159 | A | * | 9/1997 | Parulski et al. | ............ 348/211 |
| 5,794,116 | A | * | 8/1998 | Matsuda et al. | ............ 455/5.1 |
| 5,806,005 | A | * | 9/1998 | Hull et al. | ............ 455/566 |
| 5,828,403 | A | * | 10/1998 | DeRodeff et al. | ............ 348/7 |

(Continued)

FOREIGN PATENT DOCUMENTS

DE        232548 A  *  8/2000

(Continued)

OTHER PUBLICATIONS

"PIAFS Microcode for MC68302(IMP) Family User's Manual Rev. 1.0", Nipon Motorola Ltd., 1997.

*Primary Examiner*—Ngoc Vu
(74) *Attorney, Agent, or Firm*—Fitzpatrick, Cella, Harper & Scinto

(57) ABSTRACT

A communication apparatus includes a wireless communication unit which receives first encoded video data encoded by a first video encoding system from the first apparatus through a wireless network; a decoding unit which decodes the first encoded video data to provide decoded video data; an encoding unit which encodes the decoded video data into second encoded video data using a second video encoding system; and a wired communication unit which transmits the second encoded video data to the second apparatus through a wired network. The first video encoding system is suitable for a first communication protocol used between the first apparatus and the communication apparatus. The second video encoding system is suitable for a second communication protocol used between the second apparatus and the communication apparatus. The first video encoding system uses a video encoding different from MPEG encoding. The second video encoding system uses MPEG encoding.

26 Claims, 37 Drawing Sheets

U.S. PATENT DOCUMENTS

| | | | |
|---|---|---|---|
| 5,991,842 A * | 11/1999 | Takayama | 710/105 |
| 6,038,625 A * | 3/2000 | Ogino et al. | 710/104 |
| 6,078,350 A * | 6/2000 | Davis | 348/14.08 |
| 6,131,130 A * | 10/2000 | Van Ryzin | 710/6 |
| 6,157,650 A * | 12/2000 | Okuyama et al. | 370/401 |
| 6,453,110 B1 * | 9/2002 | Kawamura et al. | 386/46 |
| 6,522,352 B1 * | 2/2003 | Strandwitz et al. | 348/211.2 |
| 6,529,522 B1 * | 3/2003 | Ito et al. | 370/466 |

FOREIGN PATENT DOCUMENTS

| | | | |
|---|---|---|---|
| EP | 886 420 A2 | * | 12/1998 |
| JP | 11-187453 | * | 7/1999 |

* cited by examiner

POWER SOURCE LINE
(8-40V DC MAX CURRENT 1.5A)

TWIST-PAIR SIGNAL LINE
2 SETS

SIGNAL LINE SHIELD    (CABLE SECTION)

(EXCLUSIVE OR SIGNAL OF DATA AND STROBE)

FIG. 25

CONTROL INFORMATION CONTENTS:
COMMUNICATION PARAMETER SETTING

| SEQUENCE NUMBER | REQUEST/RECEPTION/REFUSAL (CONTROL INFORMATION CLASSIFICATION) | OCTET 1 |
|---|---|---|
| COMMUNICATION PARAMETER SETTING (CONTROL INFORMATRION CONTENT IDENTIFIER) || OCTET 2 |
| ARQ DATA TRANSFER PROTOCOL VERSION || OCTET 3 |
| ARQ CONTROL INFORMATION TRANSFER PROTOCOL VERSION || OCTET 4 |
| MEASURED RTF VALUE || OCTET 5 |
| DATA COMPRESSION IDENTIFIER || OCTET 6 |
| TOTAL NUMBER OF CODES (PARAMETER P1) || OCTET 7 |
| MAX CHARACTER STRING LENGTH (PARAMETER P2) || OCTET 8 |
| FRAME LENGTH || OCTET 9 |
| MAX FRAME NUMBER (M) || OCTET 10 |
| ALL 1 || OCTET 11-72 |
| RECEPTION RESULT/REFUSAL REASON (REASON DISPLAY) || OCTET 73 |

FIG. 26

CONTROL INFORMATION CONTENTS:
ARQ PARAMETER SETTING

| SEQUENCE NUMBER | REQUEST/RECEPTION/REFUSAL (CONTROL INFORMATION CLASSIFICATION) | OCTET 1 |
|---|---|---|
| ARQ PARAMETER SETTING (CONTROL INFORMATRION CONTENT IDENTIFIER) || OCTET 2 |
| MEASURED RTF VALUE || OCTET 3 |
| ALL 1 || OCTET 4-72 |
| RECEPTION RESULT/REFUSAL REASON (REASON DISPLAY) || OCTET 73 |

FIG. 27

CONTROL INFORMATION CONTENTS:
DATA LINK RELEASE

| SEQUENCE NUMBER | REQUEST/RECEPTION/REFUSAL (CONTROL INFORMATION CLASSIFICATION) | OCTET 1 |
|---|---|---|
| DATA LINK RELEASE (CONTROL INFORMATRION CONTENT IDENTIFIER) || OCTET 2 |
| ALL 1 || OCTET 3-72 |
| RECEPTION RESULT/REFUSAL REASON (REASON DISPLAY) || OCTET 73 |

FIG. 28

CONTROL INFORMATION CONTENTS:
USER INFORMATION

| SEQUENCE NUMBER | REQUEST/RECEPTION/REFUSAL/ NOTIFICATION/RESPONSE (CONTROL INFORMATION CLASSIFICATION) | OCTET 1 |
|---|---|---|
| USER INFORMATION (CONTROL INFORMATRION CONTENT IDENTIFIER) || OCTET 2 |
| USER INFORMATION IDENTIFIER || OCTET 3 |
| USER INFORMATION || OCTET 4-72 |
| RECEPTION RESULT/REFUSAL REASON (REASON DISPLAY) || OCTET 73 |

FIG. 29

CONTROL INFORMATION CONTENTS:
CONTINUOUS FRAME TRANSMITTABLE

| SEQUENCE NUMBER | CONTINUOUS FRAME TRANSMITTABLE (CONTROL INFORMATION CLASSIFICATION) | OCTET 1 |
|---|---|---|
| CONTINUOUS FRAME TRANSMITTABLE (CONTROL INFORMATRION CONTENT IDENTIFIER) || OCTET 2 |
| ALL 1 || OCTET 3-72 |
| ALL 1 || OCTET 73 |

SUCCESS IN SETTING COMMUNICATION PARAMETER

SUCCESS IN SETTING COMMUNICATION PARAMETER

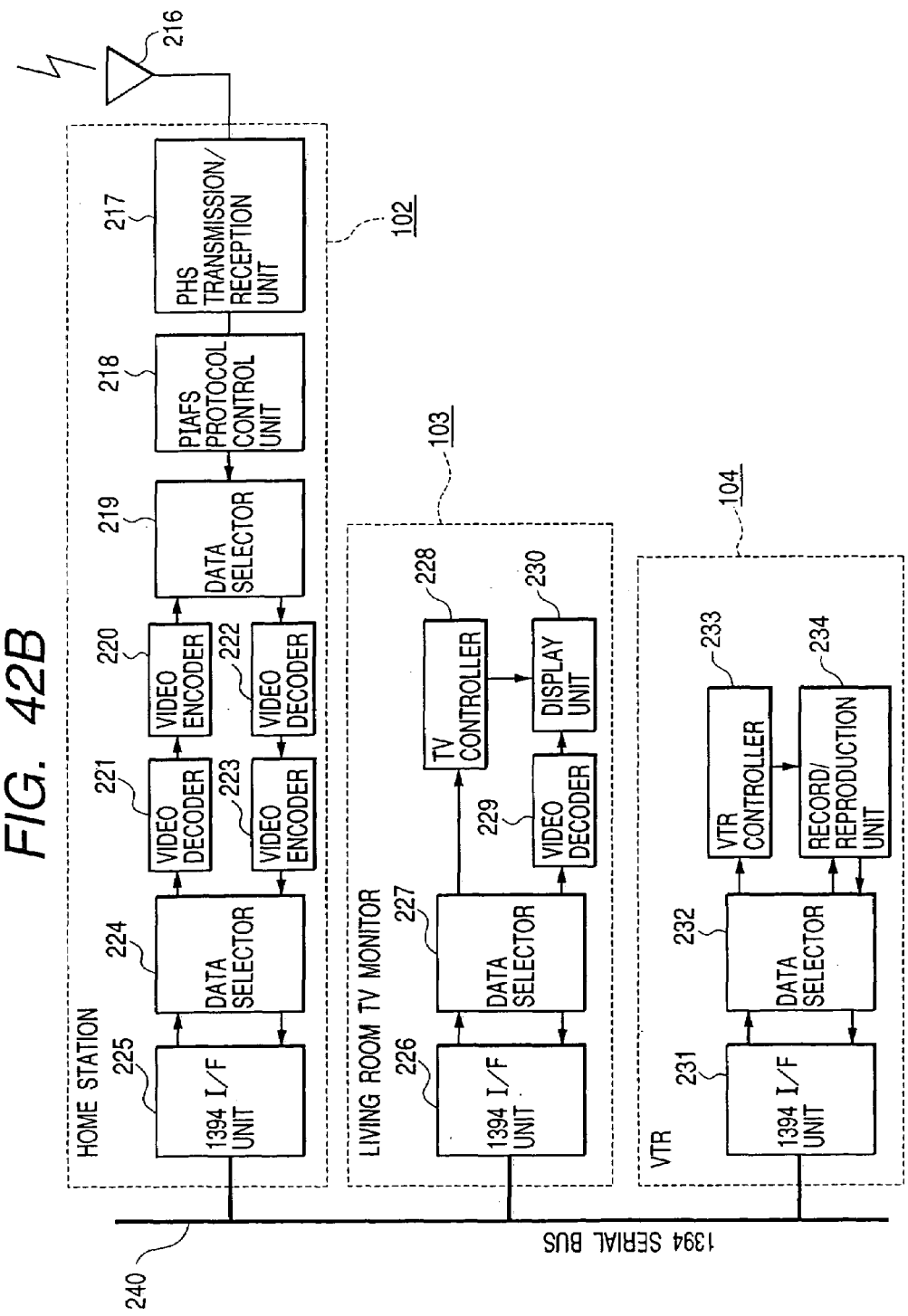

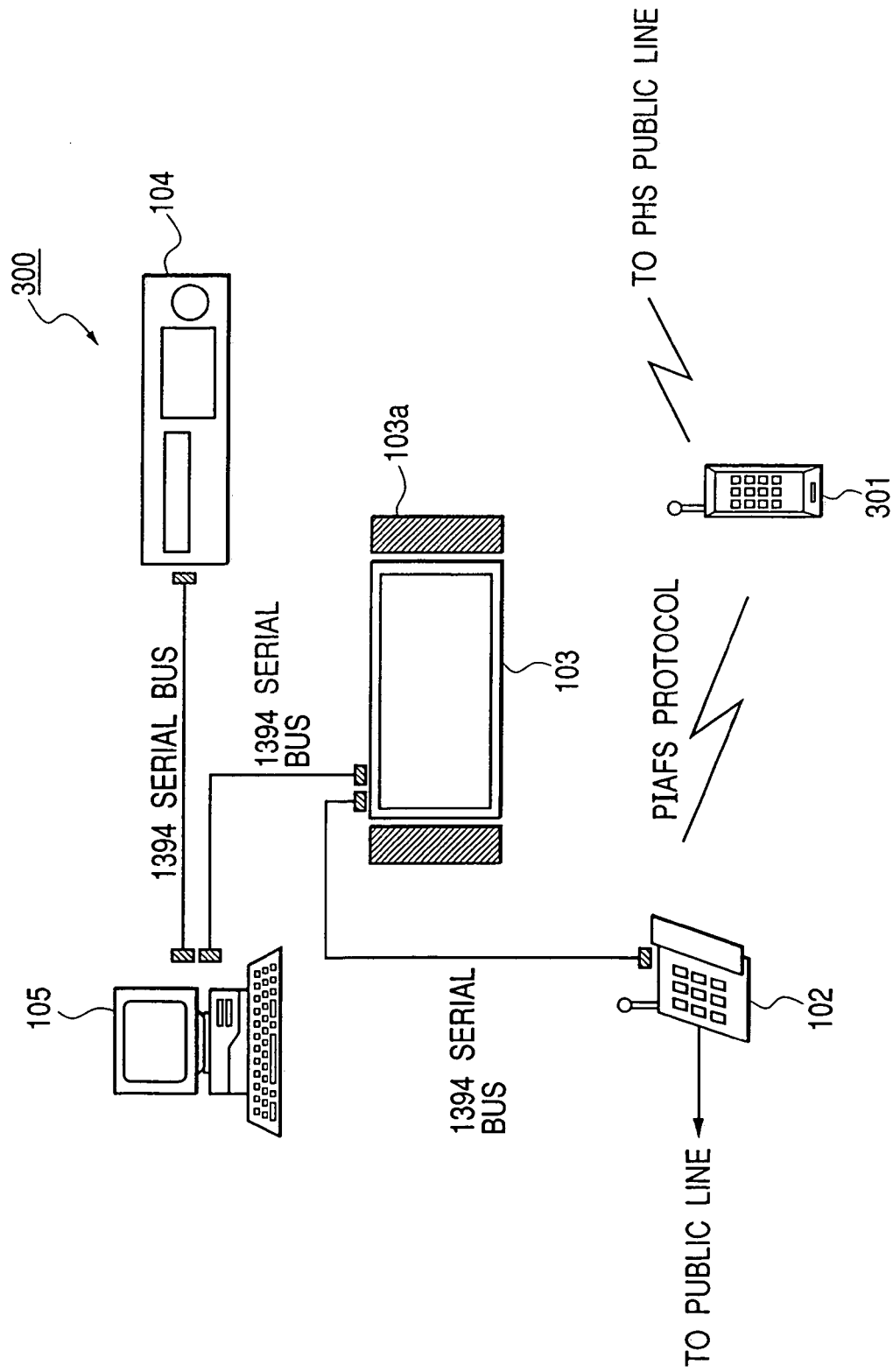

DATA COMMUNICATION APPARATUS, DATA COMMUNICATION SYSTEM, DATA COMMUNICATION METHOD AND STORAGE MEDIUM

BACKGROUND OF THE INVENTION

1. Field of the Invention

The present invention relates to data communication apparatus, system and method which are adopted in, e.g., a system to which plural electronic equipments are connected by a communication control bus capable of performing communication with mixture of control signals and data and in which data communication is performed among the plural equipments. Further, the present invention relates to a storage medium which computer-readably stores processing steps to perform the above method.

2. Related Background Art

In recent years, there has been adopted a home bus system which connects various electronic equipments (simply called as equipments or nodes hereinafter) together in a home. In the home bus system, e.g., audio/visual (AV) equipments such as a TV equipment, a stereo and the like, kitchen equipments such as a refrigerator, a microwave oven and the like, and home equipments such as a water bath, an interphone and the like are connected and associated to others, and each equipment in the home can be controlled by information communication among these equipments.

On the other hand, there has been popularized a data communication system using a public line outdoors. Especially, a user can perform the data communication at any place (not limited to home or office) by a PIAFS (PHS Internet Access Forum Standard) communication developed on a wired ISDN line or a wireless PHS.

Further, the PHS has an extension mode and a public mode. In the home, the user can perform the communication without charge (function as digital cordless slave) by using the extension mode. On the other hand, the user can directly perform the communication to the public line (function as simple digital portable telephone) outdoors by using the public mode.

However, in the conventional system such as the above home bus system, the data communication is performed based on a specific protocol. Further, in the conventional ISDN communication and PIAFS communication, the data communication is performed respectively based on specific protocols. For this reason, it is very difficult to perform the data communication between, e.g., the equipments in the home and the outside equipments (PHS and the like).

As above, according to conventional technique, the equipments in the home, the equipments in the office and the outdoor equipments respectively have different protocols for data communication, whereby it is impossible to freely perform the data communication among all of these equipments.

SUMMARY OF THE INVENTION

An object of the invention is to eliminate at least one or all of the above-described conventional drawbacks.

That is, the object is to provide a data communication apparatus, a data communication system, a data communication method and a storage medium computer-readably storing processing steps to perform the data communication method, which can freely perform effective data communication even between equipments each existing different environment.

According to the above object, the first invention is to provide a data communication apparatus which performs data communication between a first equipment performing wireless data transmission and reception according to a first protocol and a second equipment performing data transmission and reception through a bus according to a second protocol, the apparatus comprising:

a conversion means for performing format conversion between data according to the first protocol and data according to the second protocol.

Another object of the invention is to be able to correspond to different protocols in a home network.

Still another object of the invention is to be able to correspond to different protocols in a wireless network.

Other objects of the invention will become apparent from the following description and the attached drawings.

BRIEF DESCRIPTION OF THE DRAWINGS

FIG. 25 is a view for explaining communication parameter setting of control information contents;

FIG. 26 is a view for explaining ARQ parameter setting of the control information contents;

FIG. 27 is a view for explaining data link release setting of the control information contents;

FIG. 28 is a view for explaining user information setting of the control information contents;

FIG. 29 is a view for explaining continuous frame transmittable setting of the control information contents;

FIGS. 42A and 42B are block diagrams showing internal structure of the system;

FIG. 43 is a block diagram showing structure of a home station system to which the second embodiment of the invention is adopted;

DETAILED DESCRIPTION OF PREFERRED EMBODIMENTS

Hereinafter, the embodiments of the invention will be explained with reference to the attached drawings.

First Embodiment

Figure 1:
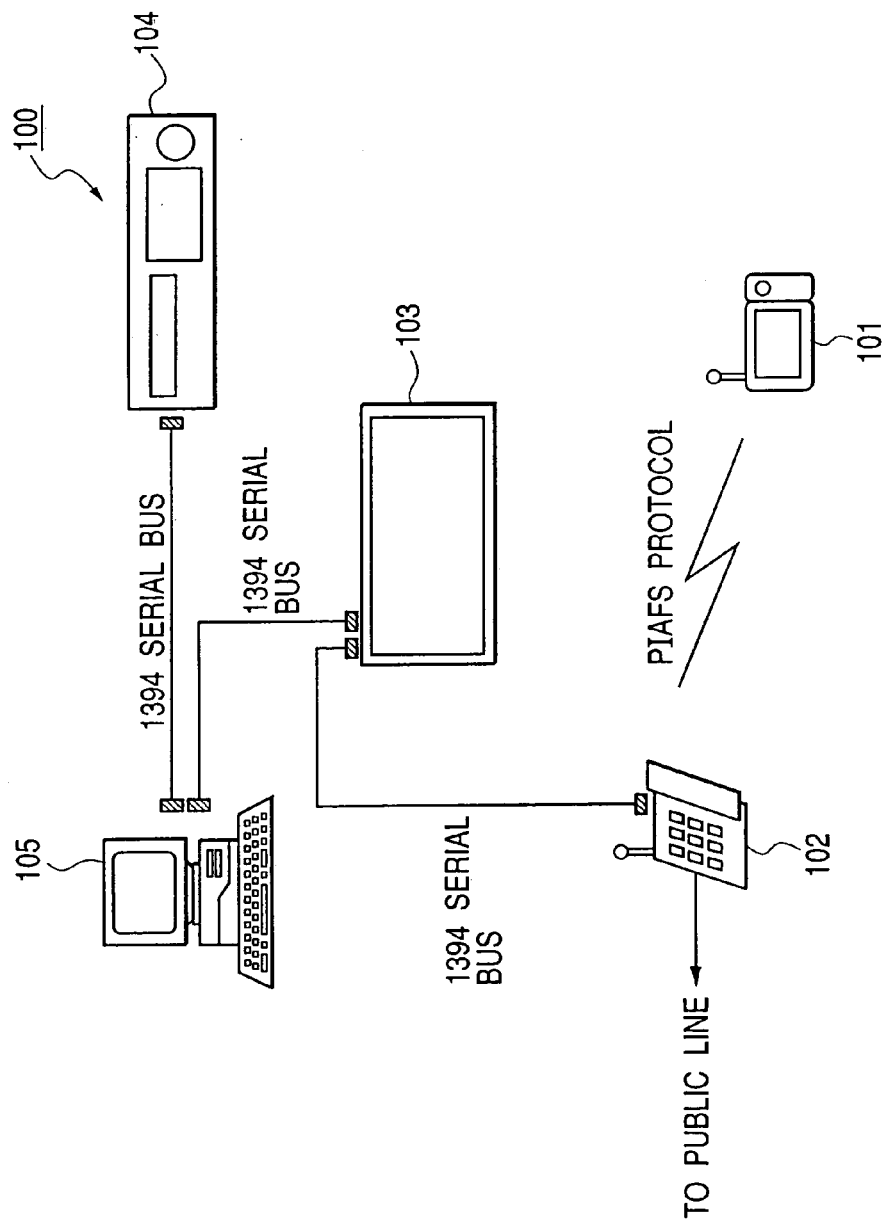
FIG. 1 is a block diagram showing a home station system to which the first embodiment of the invention is adopted.

The invention is adopted to, e.g., a network system 100 shown in FIG. 1.

As shown in FIG. 1, the system 100 includes a portable video camera 101 usable in a home and outside, a home station 102 provided in the home, a TV monitor 103 for a living room, a digital video tape recorder (simply referred as VTR hereinafter) 104, and a personal computer (simply referred as PC hereinafter) 105.

The system 100 uses a home bus (IEEE 1394-1995 interface (high performance serial bus) as digital I/F: hereinafter referred as 1394 serial bus) for connecting together respective digital equipments (home station 102, living room TV monitor 103, PC 105 and VTR 104) in the home.

The portable video camera 101 has a PHS function, and thus transmits video data obtained by taking a subject and reproduction video data stored in the body to the home station 102. At this time, the data transmission is performed by wireless data communication (transfer) according to a PIAFS communication protocol (referred as PIAFS protocol hereinafter) developed on extension and public modes of the PHS.

The home station 102 receives the video data from the portable video camera 101, and transmits it to the living room TV monitor 103, the PC 105 or the VTR 104 through the 1394 serial bus.

Thus, later described in detail, the video data obtained by the camera 101 can be displayed on a screen of the monitor 103, the PC 105 or the VTR 104.

Further, for example, the video data reproduced by the VTR 104 is transmitted to the home station 102 through the 1394 serial bus.

The home station 102 which received the video data from the VTR 104 transmits it to the portable video camera 101, by the wireless data communication according to the PIAFS protocol.

Thus, later described in detail, the video data obtained by the VTR 104 can be displayed on an LCD (liquid crystal display) of the video camera 101 or stored inside the camera 101.

As explained above, in this system 100, since the 1394 serial bus is used as the digital interface for connecting the respective equipments, outline of the 1394 serial bus will be initially explained.

Further, since PIAFS protocol is used for the wireless data communication with the portable video camera 101, outline of the PIAFS protocol will be previously explained.

[Outline of 1394 Serial Bus]

With the development of home-use digital VTR and DVD (digital video disk), there is being required to support the transfer of data of a large amount such as video data or audio data (integrally called as AV data hereinafter) on real-time basis. For transferring such AV data on real-time basis, fetching such data into a PC (personal computer) or effecting transfer to other digital equipment, there is required an interface capable of high-speed data transfer with required transfer functions. For this purpose there has been developed the 1394 serial bus.

Figure 2:
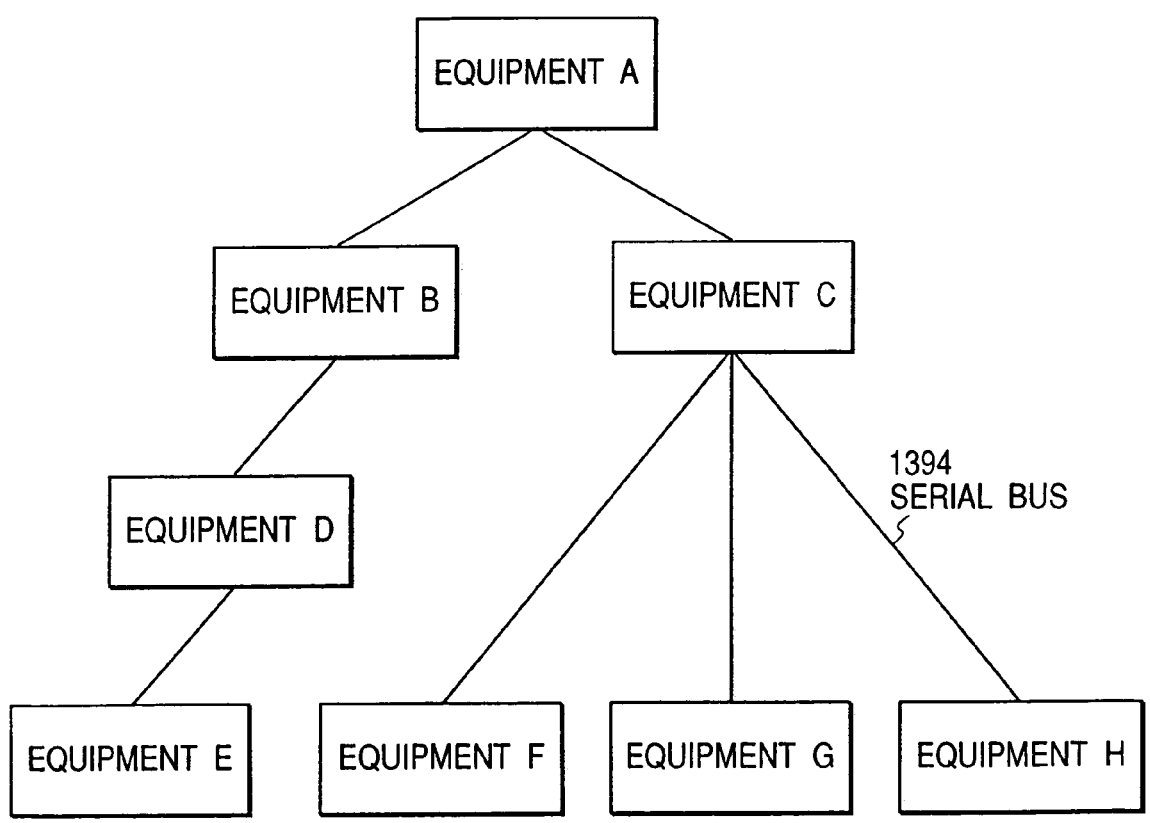
FIG. 2 is a view for explaining an example of network structure of 1394 serial buses adopted in the above system in FIG. 1.

FIG. 2 shows an example of the network system constituted with the 1394 serial buses.

The system contains plural digital equipment A, B, C, D, E, F, G and H, and a twisted pair cable of the 1394 serial bus is used for making connections A-B, A-C, B-D, D-E, C-F, C-G and C-H.

As examples of the digital equipment A to H, a PC, a digital VTR, a DVD player, a digital camera, a hard disk, a monitor and the like are provided.

The connections among the digital equipment are a mixture of daisy chain connection and node branched connection, and the connections can be with high flexibility. The digital equipment A to H are respectively given specific ID's, which are mutually recognized to constitute a single network within the range of connection by the 1394 serial buses.

For example, since the unified network can be constituted by merely connecting each of the digital equipment with a 1394 serial bus cable (daisy chain connection), each equipment performs the function of relaying, thereby constituting the single network.

Further, since the 1394 serial bus corresponds to a plug and play function (automated mechanism on the interruption signal and the setting of I/O port address), there is automatically executed the recognition of the equipment and the connection status thereof when the cable is connected to the equipment.

For this reason, in the network system as shown in FIG. 1, when an arbitrary equipment is deleted therefrom or newly added thereto, a bus resetting is automatically executed to reset the network configuration and the configuration of the network is constructed anew. This function allows to always set and recognize the current configuration of the network.

Also it has data transfer rates 100/200/400 Mbps, and an equipment having the higher transfer rate supports the lower transfer rate for achieving compatibility.

There are provided two data transfer modes, namely "isochronous transfer mode (ATM)" for transferring asynchronous data (hereinafter referred as a sync data) such as control signals, and "isochronous transfer mode" for transferring isochronous data (hereinafter referred as iso data) such as real-time AV data.

The a sync data and iso data are mixedly transferred within a predetermined communication cycle (usually 125 μs/cycle) after the transfer of a cycle start packet (CSP) indicating the start of a cycle and with priority given to the transfer of the iso data.

Figure 3:
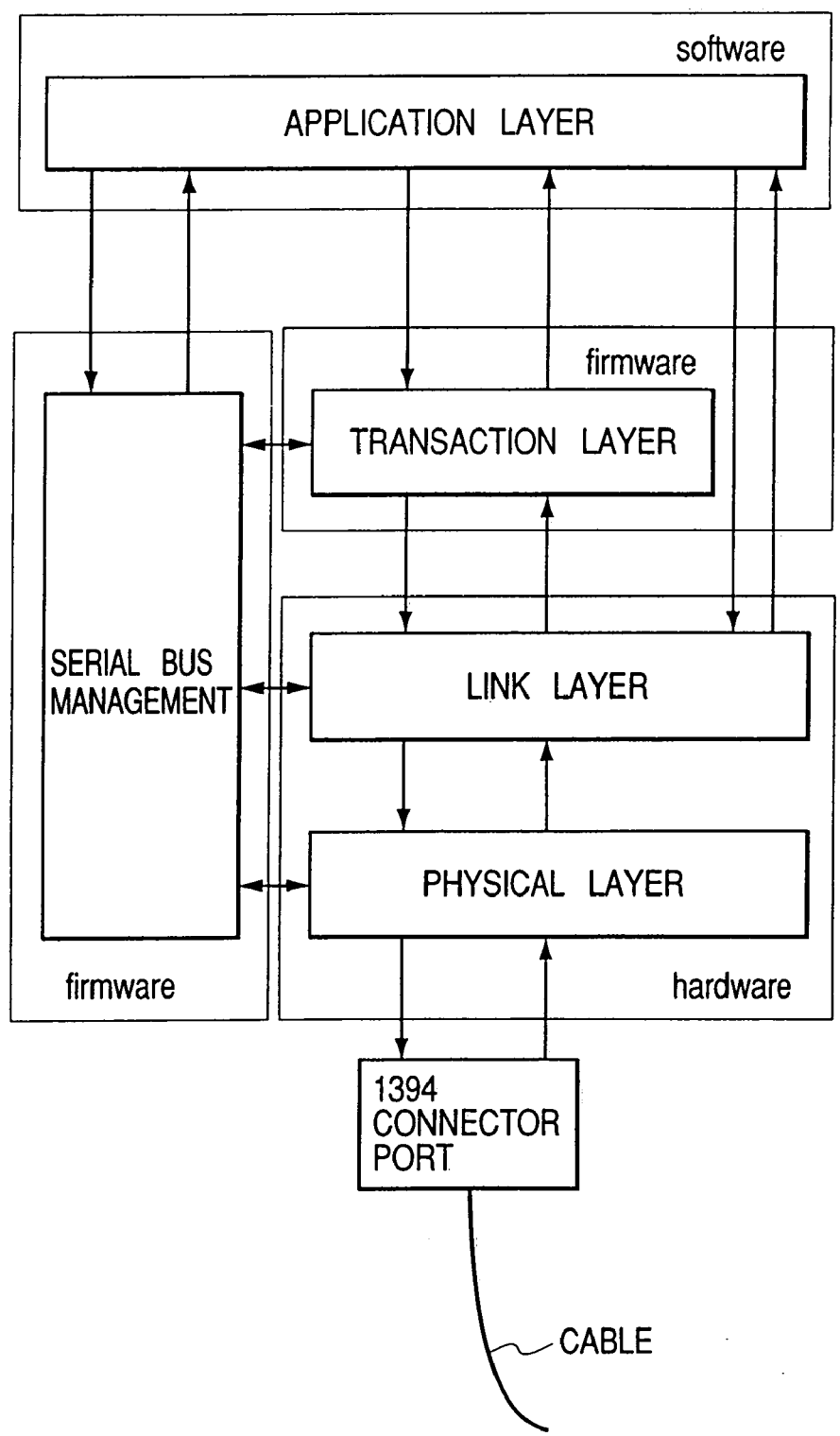
FIG. 3 is a view for explaining structural components of the 1394 serial bus.

FIG. 3 shows the components constituting the 1394 serial bus.

As shown in FIG. 3, the 1394 serial bus has a layer (hierarchic) structure.

There are provided a cable for the 1394 serial bus, of which connector is connected to a 1394 connector port.

On the 1394 connector port, a hardware portion (or hardware) including a physical layer and a link layer 812.

The hardware is substantially constituted by an interface chip, in which the physical layer executes controls related to the encoding and to the connector, while the link layer executes controls related to the packet transfer and the cycle time.

On the hardware, a firmware portion (or firmware) including a transaction layer and a management layer is positioned.

The transaction layer manages the data to be subjected to transfer (transaction), and issues commands such as read, write and lock. The management layer manages the connection status and ID of the connected equipment, thereby managing the configuration of the network.

These hardware and firmware practically constitute the 1394 serial bus.

On the firmware, a software portion (or software) including an application layer is positioned.

The application layer is variable depending on the software to be used, and defines how the data are to be transferred in the interface by a protocol such as AV protocol.

Figure 4:
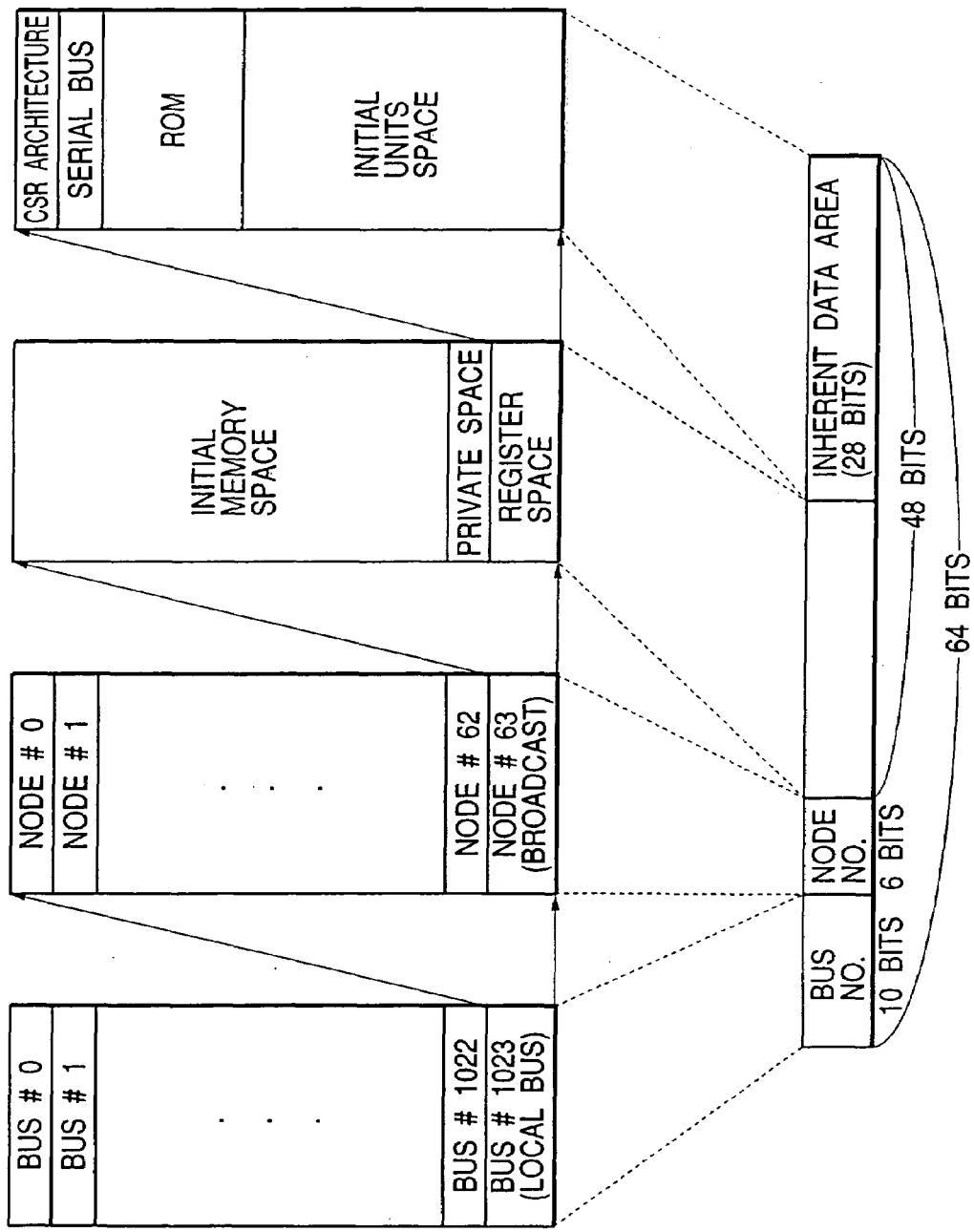
FIG. 4 is a view for explaining an address map of the 2394 serial bus.

FIG. 4 shows the address space of the 1394 serial bus.

Each equipment (node) connected to the 1394 serial bus is always given a 64-bit address specific to such node. Such address is stored in a memory of the node, so that the node address of own or another node can be always confirmed, and there can be executed communication designating the partner.

The addressing of the 1394 serial bus is based on the IEEE 1212 standard, and the initial 10 bits are used for designating the bus number, while the next 16 bits are used for designating the node ID number, and the remaining 48 bits are an address width given to the equipment, usable as a specific address space. The last 28 bits are used as a specific data area, for storing information for identifying each equipment or designating the condition of use.

The 1394 serial bus technique is principally constructed as explained in the foregoing.

In the following there will be given a more detailed explanation on the technique featuring the 1394 serial bus.

[Electric Specification of the 1394 Serial Bus]

Figure 5:
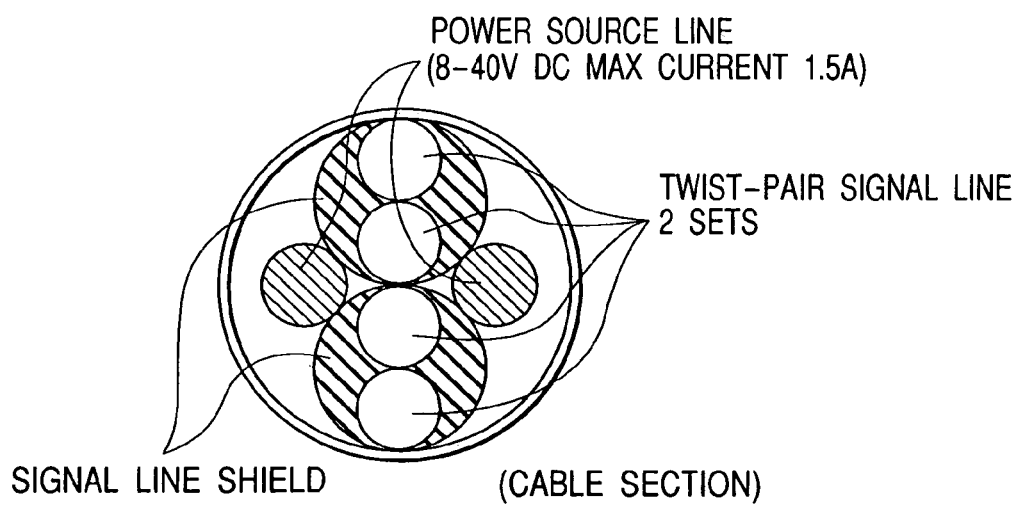
FIG. 5 is a view for explaining the section of a 1394 serial bus cable.

FIG. 5 is a cross-sectional view of the 1394 serial bus cable.

As shown in FIG. 5, the 1394 serial bus contains two sets of twisted pair signal lines and a power supply line, thereby enabling power supply to a equipment not provided with power source therein or showing a voltage lowering because of a failure.

The voltage of the DC power supplied from the power supply line is 8V to 40V, and the maximum DC current thereof is defined 1.5 A.

[DS-Link Encoding]

Figure 6:
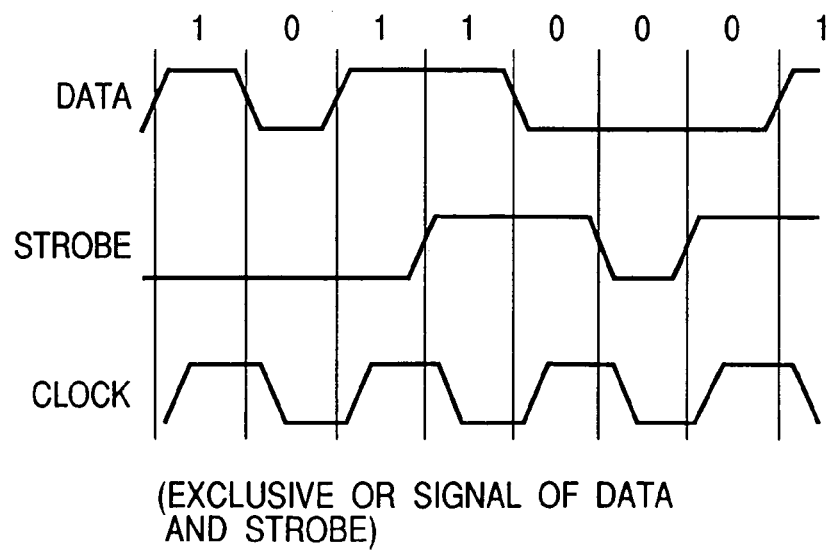
FIG. 6 is a timing chart for explaining a DS-link (data/strobe link) encoding method employed in the 1394 serial bus.

FIG. 6 is a timing chart for explaining the DS-link (data/strobe link) encoding method for the data transfer format employed in the 1394 serial bus.

The DS-link encoding method employed therein is suitable for high-speed serial data communication, which requires two signal lines. One of the twisted pair signal lines is used for transmitting the main data and the other is used for transmitting strobe signal. Therefore, the receiving side can reproduce the clock signal by forming the exclusive logic sum (exclusive OR) of the communicated data and the strobe signal.

As above, the DS-link encoding method has various advantages such as a higher transfer efficiency in comparison with other serial data transfer methods, a smaller circuit magnitude of the controller LSI because the PLL (phase-locked loop) circuit can be dispensed with, and a lower electric power consumption by maintaining the transceiver circuit of each equipment in the sleep state because it is unnecessary to send information indicating the idle state in the absence of the data to be transferred.

[Bus Resetting Sequence]

In the 1394 serial bus, each connected equipment (node) is given a node ID and is recognized as a constituent of the network.

For example, when it becomes necessary to recognize the network configuration anew by a change in the network configuration, for example a change in the number of nodes by deletion or addition of a node or by an on/off operation of the power supply, each node detecting such change transmits a bus resetting signal on the bus, thereby entering a mode for recognizing the new network configuration.

The detection of the change is achieved by detecting a change in the bias voltage on the 1394 port board (shown in FIG. 3, and merely referred as connector port hereinafter).

Receiving the bus resetting signal from a node, the physical layer (FIG. 3) of each node simultaneously transmits the generation of bus resetting to the link layer (FIG. 3) and also transmits the bus resetting signal to other nodes. The bus resetting is activated after the bus resetting signal is detected by all the nodes.

The bus resetting is activated by a hardware detection such as the insertion or extraction of a cable or an abnormality in the network, or by a direct command to the physical layer (FIG. 3) for example from a host equipment according to the protocol. The data transfer is interrupted with the activation of bus resetting and is restarted, after the bus resetting, under the new network configuration.

[Node ID Determination Sequence]

As described above, after the bus resetting, the nodes enter an operation of giving ID's thereto for constructing the new network configuration. The general sequence from the bus resetting to the node ID determination will be explained with reference to flow charts shown in FIGS. 7, 8 and 9.

Figure 7:
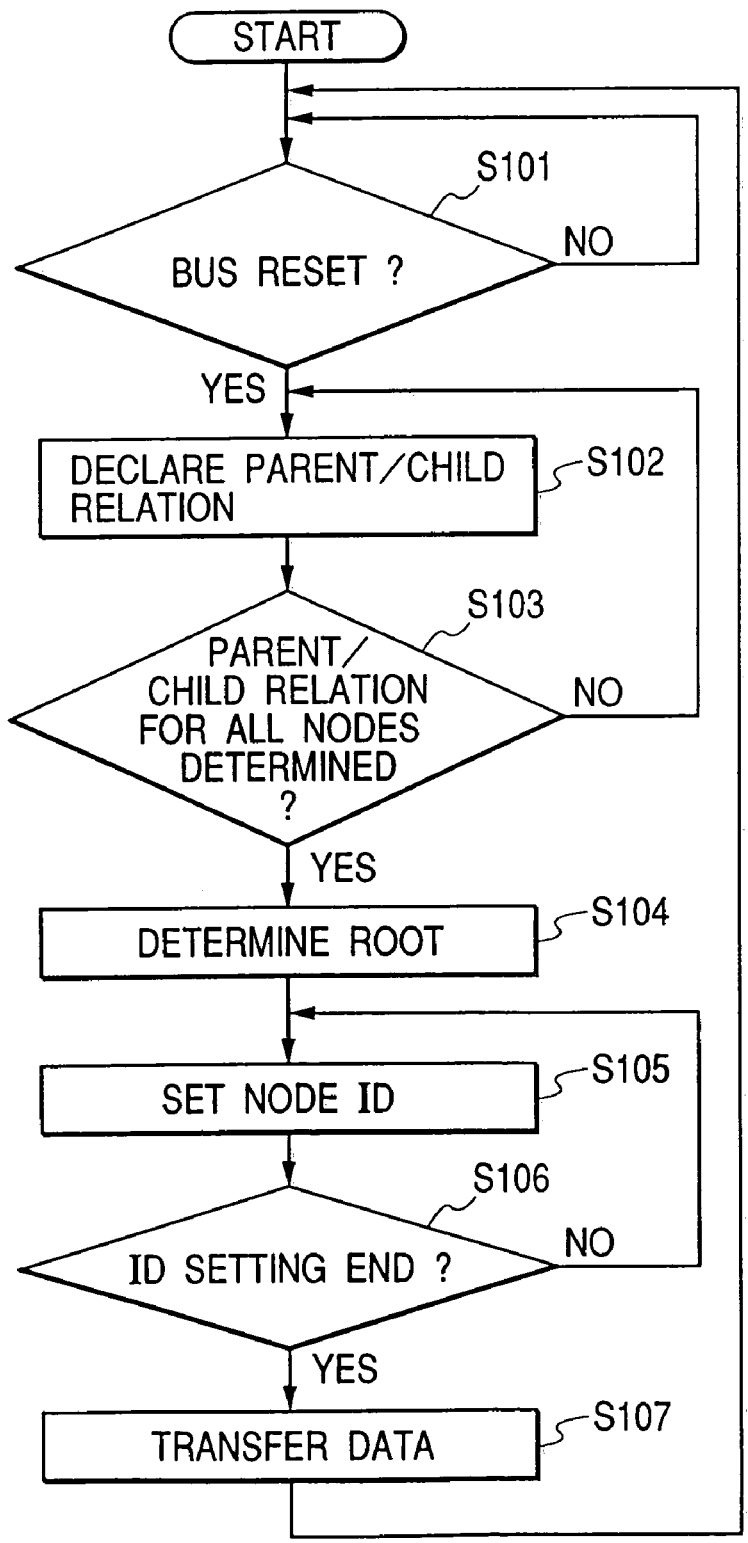
FIG. 7 is a flow chart for explaining a series of bus operations from generation of bus resetting to determination of node ID whereupon data transfer is enabled.

The flow chart in FIG. 7 shows a series of bus operations from the generation of bus resetting to the determination of node ID whereupon the data transfer is enabled.

In FIG. 7, initially constantly monitors the generation of a bus resetting in the network (step S101). When a bus resetting is generated for example by a power on/off operation of the node, it executes declaration of the parent-child relationship between the directly connected nodes in order to know the connection status of the new network (step S102).

When the parent-child relationship is determined among all the nodes in a step S103, a step S104 determines a root. The declaration of the parent-child relationship in the step S102 is executed and the root is not determined, until the parent-child relationship is determined among all the nodes.

After the root determination in the step S104, it executes a node ID setting operation for giving ID to each node (step S105).

The node ID setting operation in the step S105 is repeated with a predetermined order of nodes, until all the nodes are given ID's (step S106).

When the step S106 identifies the completion of ID setting in all the nodes, the new network configuration is recognized by all the nodes to enable data transfer among the nodes, and it executes the data transfer (step S107). In the state of the step S107, there is again entered the mode of monitoring the generation of bus resetting, and, if a bus resetting is generated, the setting operations of the steps S101 to S106 are repeated.

Figure 8:
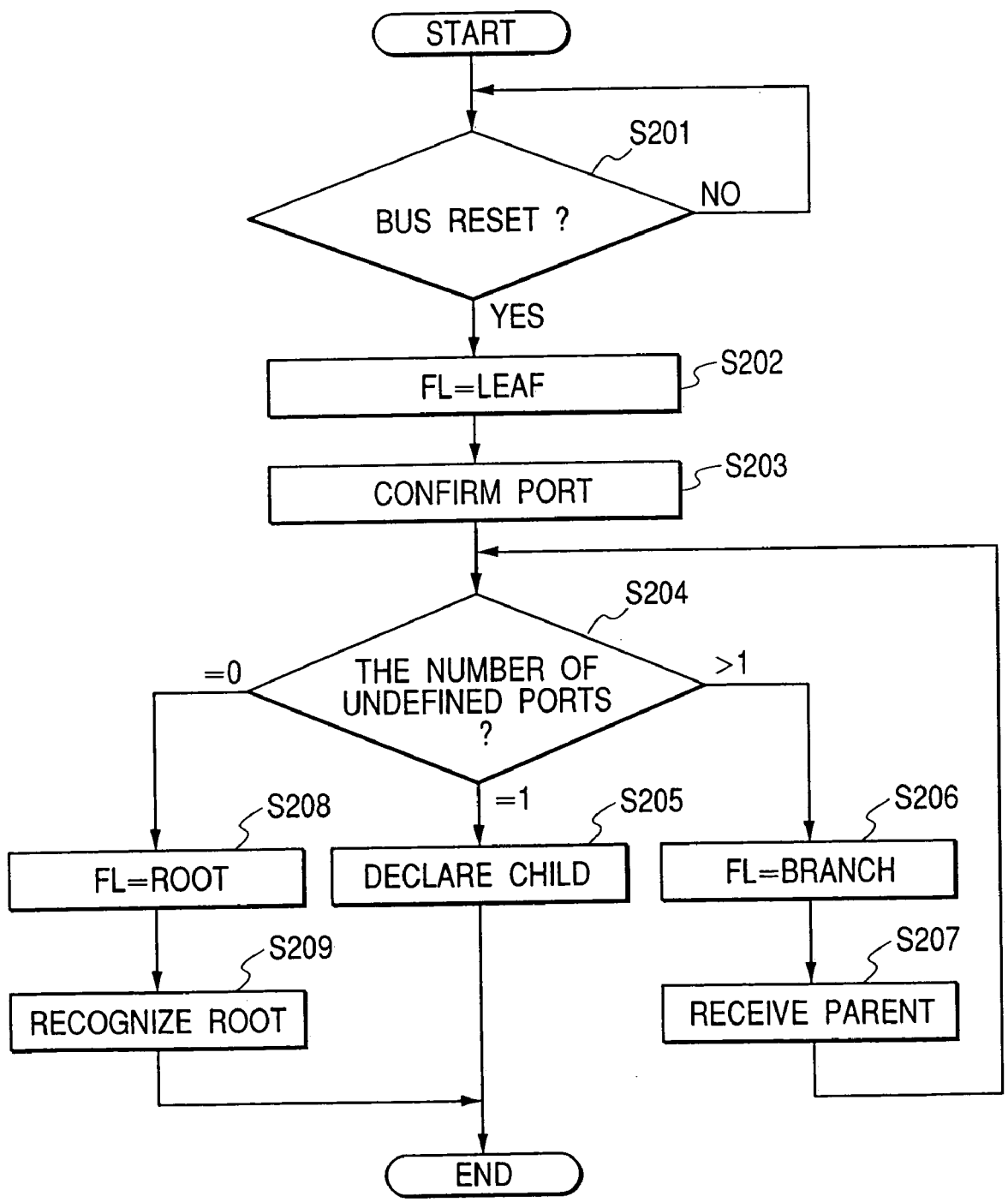
FIG. 8 is a flow chart for explaining processes from monitoring of bus resetting to root determination.
Figure 9:
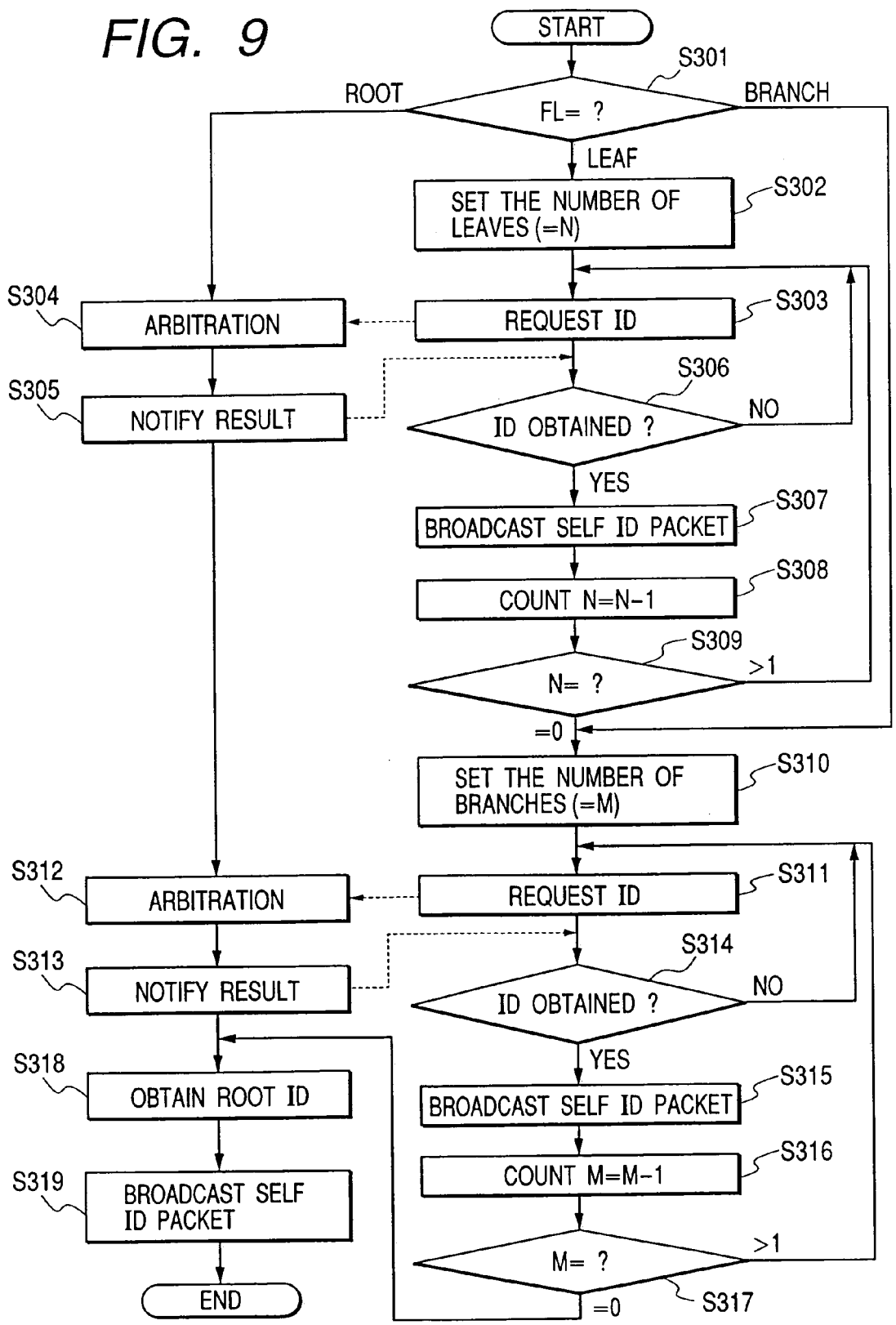
FIG. 9 is a flow chart for explaining processes of ID setting.

The flow chart in FIG. 8 shows the detailed processes from the monitoring of the bus resetting (step S101) to the root determination (step S104), and the flow chart in FIG. 9 shows the detailed processes of the ID setting (steps S105, S106).

Initially there will be explained the flow chart shown in FIG. 8. When a bus resetting occurs (step S201), the network configuration is once reset.

The step S201 constantly monitors the generation of the bus resetting. Then in each equipment, a flag indicating that the equipment is a leaf (node), as a first step of the operation for re-recognizing the connection request of the network thus reset (step S202).

Then each equipment checks the number of nodes to which the port of the equipment is connected (step S203). According to the result indicating the number of ports, there is checked the number of undefined ports (for which the parent-child relationship is not determined) in order to start the declaration of the parent-child relationship (step S204).

The number of ports checked in the step S204 is equal to the number of undefined ports immediately after the bus resetting, but, the number of undefined ports varies with the proceeding of determination of the parent-child relationship.

Immediately after the bus resetting, the declaration of the parent-child relationship can be started only from a leaf. Being a leaf can be known from the confirmation of the number of ports in the step S203. The leaf declares, to a node connected thereto, that "the leaf itself is a child and the partner is a parent" (step S205), and the sequence ends.

In a node having two or more ports in the step S203 and recognized as a branch, the step S204 identifies that the number of the undefined ports>1 immediately after the bus resetting, so that the node is given a branch flag (step S206). Then it waits to receive the position as parent in the parent-child declaration from a leaf (step S207).

The branch receiving the parent-child relationship declaration of the leaf in the step S207 confirms the number of the undefined ports checked in the step S204, and, if the number of the undefined ports has become one, it can declare that "it is a child" in the step S205 to the node connected to the remaining port. The branch having two or more undefined ports in the step S204 in the second or subsequent cycle waits to receive the position as parent from a leaf or another branch in the step S207.

The declarations of the parent-child relationship is completed in the entire network when the number of the undefined ports checked in the step S204 becomes eventually zero in a branch or exceptionally a leaf (because of a belated declaration of being a child), and the unique node having zero undefined port (being determined as the port of all the parents) is given a root flag (step S208) and is recognized as a root (step S209), and then the sequence ends.

Thus, there is completed the procedure from the bus resetting to the declarations of the parent-child relationship among all the nodes in the network.

Subsequently, in giving ID to the nodes, the ID setting can be initiated from a leaf. The ID setting is executed in the order of leaves, then branches and root, and in the increasing order of the node number starting from 0.

That is, in FIG. 9, based on the data set in the flag FL, the flag information of the nodes, indicating leaves, branches and root and determined in the sequence are classified (step S301).

If the result of the step S301 is the leaves, it sets the number N (being a natural number) of the leaves present in the network (step S302). Then, each leaf request an ID to the root (step S303). In case of plural requests, the root executes an arbitration (step 304), and, it gives ID to a winning node and informs the losing nodes of the losing results (step S305).

In a step S306, the leaf having failed to acquire ID issues the request for ID again, and the sequence is similarly repeated in the step S303.

On the other hand, the leaf having acquired ID transfers the ID information to all the nodes by broadcasting (communication from a node to unspecified plural nodes on the network) (step S307). After the broadcasting of the ID information of a node, it decreases the number of the remaining leaves by one (step S308).

After then, if a step S309 identifies that at least one leaf remains, the sequence starting from the ID request in the step S303 is repeated. When all the leaves have finally broadcast the ID information, the step S309 identifies N=0, whereupon the ID setting shifts to branches (steps S310 to S317).

The ID setting for the branches is executed in a similar manner as in the case of leaves. At first it sets the number M (being a natural number) of the branches present in the network (step S310). Then, each branch requests an ID to the root (step S311).

In response, the root executes an arbitration (step S312), and gives an ID number, next to the numbers already given to the leaves, to a winning node. The root informs the requesting branches with the ID information or the losing results (step S313).

In a step S314, the branch having failed to acquire ID issues the request for ID again, and the sequence is similarly repeated in the step S311.

On the other hand, the branch having acquired ID transfers the ID information to all the nodes by broadcasting (step S315). After the broadcasting of the ID information of a node, it decreases the number of the remaining branches by one (step S316).

If a step S317 identifies that at least one branch remains, the sequence starting from the ID request in the step S311 is repeated. When all the branches have finally acquired the ID information, the acquired information is broadcasted, and the ID setting processes for the next root are executed (steps S318 and S319).

When the ID acquisition mode for the branches is terminated, in this state the root only has not acquired the ID information. Thus, the root sets the smallest ungiven number as its own ID number (step S318), and it broadcasts the ID information of the root (step S319).

It should be noted that the ID setting processes for this root are executed even if the result in the step S301 indicates the root.

Thus, in the above flow charts, there is completed the procedure after the determination of the parent-child relationship to the ID setting for all the nodes.

In the following there will be explained, as an example, the operations in an actual network shown in FIG. 10.

Figure 10:
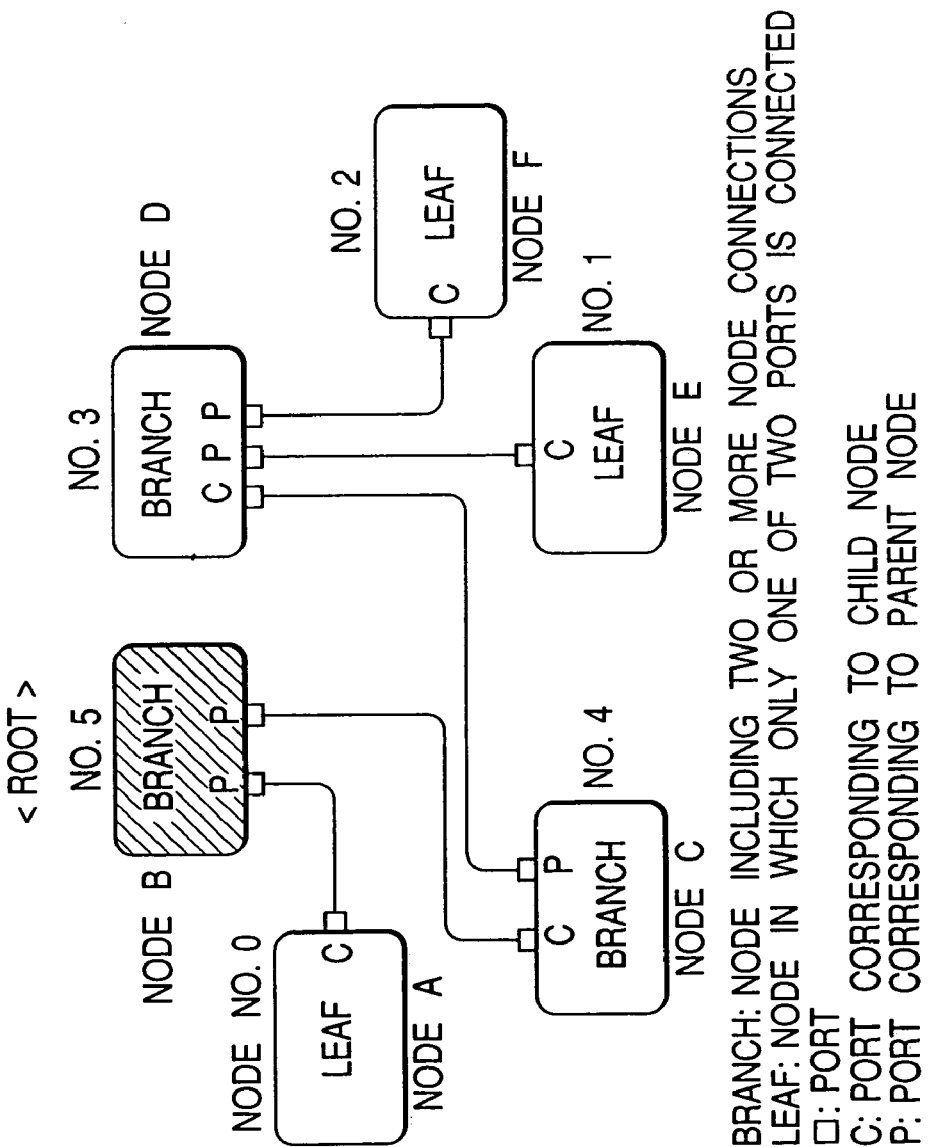
FIG. 10 is a view for explaining hierarchic structure in which node ID's of the equipments are determined using the 1394 serial buses.

FIG. 10 shows a hierarchic structure in which nodes A and C are directly connected under a root node B, while a node D is directly connected under the node C, and nodes E, F are connected under the node D. In the following there will be given an explanation on such hierarchic structure and the procedure of determining the root node and the node ID's.

After bus resetting, there is executed the declaration of the parent-child relationship between the directly connected ports of the nodes, in order to recognize the connection status of the nodes. In the parent-child relationship, the parent side assumes a higher position and the child side assumes a lower position in the hierarchic structure.

After the bus resetting in the configuration of FIG. 10, the parent-child declaration is at first executed by the node A.

Basically, the parent-child declaration can be started from a node having connection only at a port thereof (such node being called a leaf). Such node can identify that it has the connection at one port only and-can therefore known that it constitutes an end of the network, and the parent-child relationship is determined from a fast reacting one among such leaves. Thus the port of the side declaring the parent-child relationship (namely node A in the connection A-B) is set as a child, and the port of the partner (node B) is set as a parent. Thus in the connections A-B, E-D and F-D there are respectively determined a child and a parent.

Then the procedure shifts to an upper level, and the parent-child relationship declaration to an further higher level starting from the nodes, among those having port with plural connections (such node being called a branch), having received the parent-child declaration from other nodes.

In FIG. 10, the node D, after the determination of the parent-child relationship in D-E and D-F, declares the parent-child relationship to the node, whereby the nodes D, C are respectively determined as a child and a parent in the connection D-C.

The node C, having received the parent-child declaration from the node D, declares the parent-child relationship to the node B connected to another port, whereby the nodes C, B are respectively determined as a child and a parent in the connection C-B.

As a result the hierarchic structure shown in FIG. 10 is determined, and the node B finally becoming the parent in all the connected ports is determined as the root node.

There exists only one root within a network configuration. In the configuration shown in FIG. 10 the node B is determined as the root node, but the root node may shift to another node if the node B, having received the parent-child declaration from the node A, executes the parent-child declaration to another node at an earlier timing. Thus depending on the timing of declaration, any node may become the root node, and the root node is not fixed in a given network configuration.

After the determination of the root node, there is entered the mode of determining the node ID. Each of all the nodes informs all other nodes of the determined self ID (broadcasting function).

The self ID information contains the self node number, information on the connecting position, number of ports, number of connected ports, information on the parent-child relationship of each port, and the like.

The node ID assignment can be initiated from the nodes having connection only at a port (namely leaves), and the node numbers are assigned in the order of 0, 1, 2, . . . among such leaves. The node having acquired the node ID transmits the information including the node number to other nodes by broadcasting. Thus such ID number is recognized as "already assigned".

When all the leaves have acquired the self node ID's, ID numbers succeeding to those assigned to the leaves are then assigned to the branch nodes. As in the case of leaf, branches having acquired the node ID number broadcast the node ID information in succession, and the root node at last broadcasts the self ID information. Consequently the root node always has the largest node ID number.

In this manner the node ID assignment is completed for the entire hierarchic structure, whereby the network configuration is reconstructed and the bus initialization is completed.

[Bus Arbitration]

In the 1394 serial bus, an arbitration for the bus use right is always executed prior to the data transfer. The 1394 serial bus is a logic bus-type network in which the same signal is transmitted to all the equipment in the network by the relaying function of each connected equipment, the arbitration is indispensable for avoiding packet collision. Through such arbitration, only one node can execute transfer at a given time.

Figure 11:
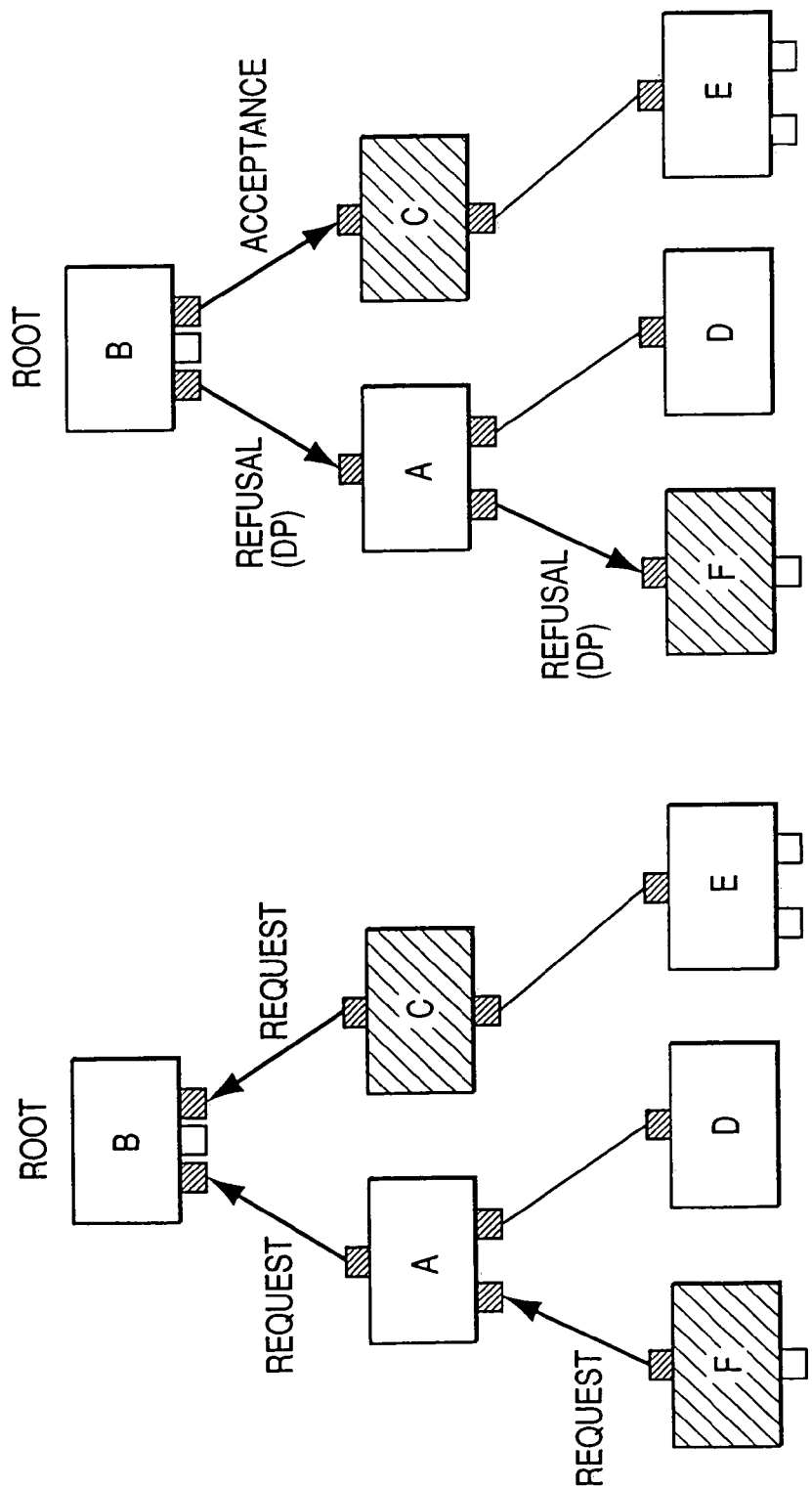
FIGS. 11A and 11B are views for explaining arbitration using the 1394 serial buses.

FIGS. 11A and 11B are the views for explaining the arbitration. That is, the arbitration procedure will be explained with reference to FIG. 11A showing the operation of requesting the bus use right and FIG. 11B showing the operation of permitting the bus use right.

When the arbitration is initiated, a node or each of plural nodes issues a request for the bus use right to the parent node. In FIG. 11A, the nodes C and F issue the requests respectively to the parent nodes B and A.

In response, the parent node (node A in FIGS. 11A and 11B) issues (or relays) the request for the bus use right to a parent node. The request is finally delivered to the arbitrating root. In FIG. 11A, the node A received the request from the node F requests the bus use right to the parent node F. Namely, the node A interrupts the request of the bus use right of the node F.

Receiving the request for the bus use right, the root node determines the node by which the bus is to be used. The arbitrating operation is executed only by the root node, and the permission to use the bus is given to the winning node in the arbitration. FIG. 11B shows a state in which the permission is given to the node C while the use by the node F is refused. A DP (data prefix) packet is transmitted to the losing node, indicating the refusal of the request. The request for the bus use right from the refused node has to wait until the next arbitration.

On the other hand, the node having won the arbitration and acquired the permission for using the bus can thereafter start the data transfer.

Figure 12:
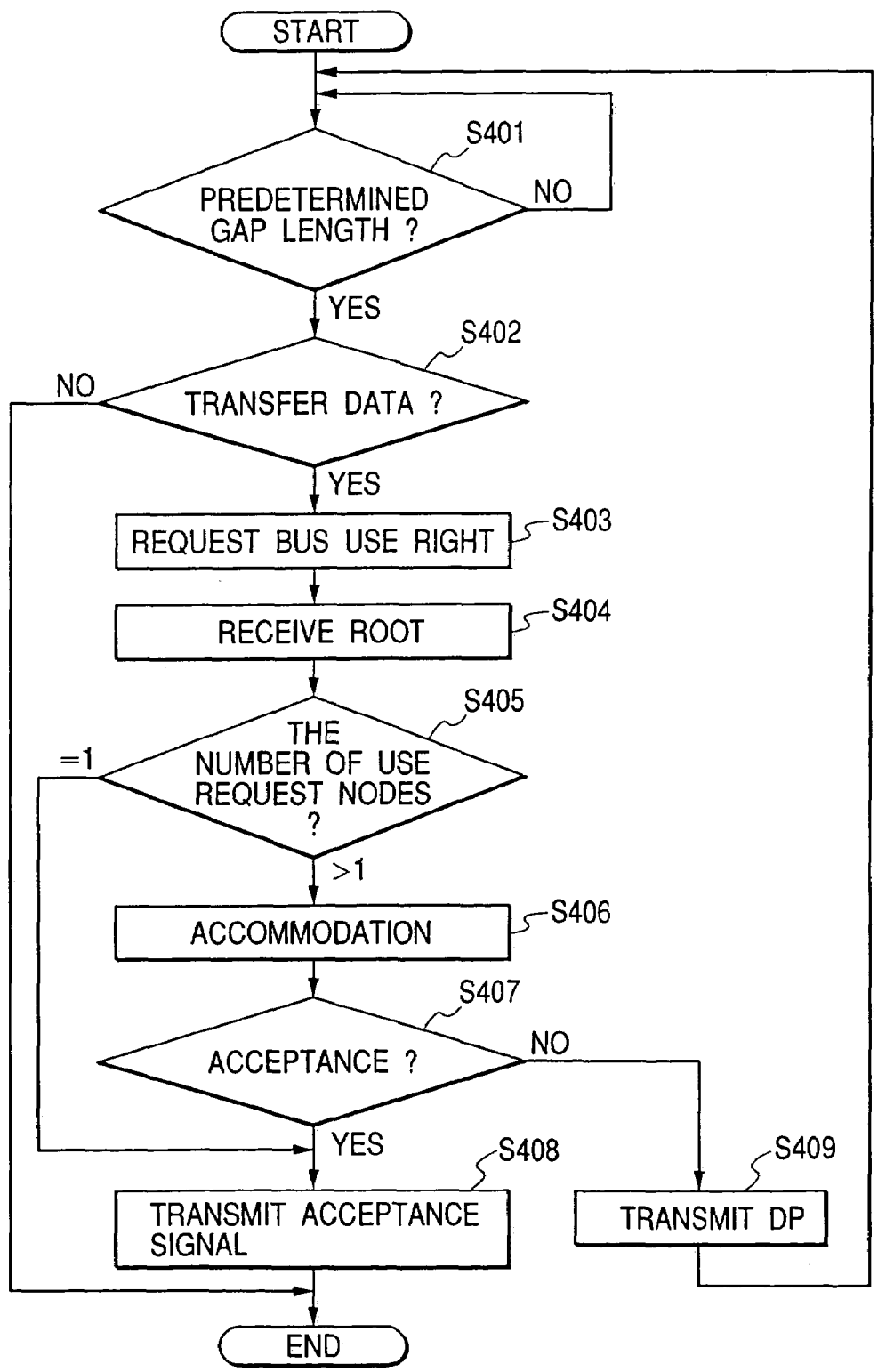
FIG. 12 is a flow chart for explaining an arbitration process.

The flow of the arbitration will be explained with reference to flow charts shown in FIG. 12.

In order that the node can initiate the data transfer, the bus has to be in the idle state. In order to recognize that the bus is currently empty after the completion of the preceding data transfer, there is predetermined an idle time gap length (for example subaction gap) for each transfer mode, and each node judges that it can start its transfer after the lapse of such time gap.

It discriminates whether a predetermined gap length is obtained corresponding to the data to be transferred such as the a sync data or iso data (step S401). The sequence waits until the predetermined gap length is obtained, since the bus use right required for starting the data transfer cannot requested unless such gap length is obtained.

The predetermined gap length is obtained in the step S401, it discriminates whether data to be transferred are present (step S402), and, if present, it issues a request for the bus use right for securing the bus to the root (step S403). The signal representing the request for the bus use right is transmitted through the nodes in the network as shown in FIG. 11A and eventually delivered to the root.

If the step S402 identifies absence of data, the sequence remains in the waiting state.

Then, if the root receives at least a request for the bus use right issued in the step S403 (step S404), the root checks the number of the nodes having issued the request (step S405).

If the step S405 identifies that the node number=1 (request issued from only one node), the permission to use the bus is to be given to such node immediately thereafter (step S408).

On the other hand, if the step S405 identifies the node number>1 (requests issued from plural nodes), the root executes an arbitration for selecting one node for giving the permission (step S406). This arbitration is conducted in such fair manner that the permissions are not given to a particular node but uniformly given to all the nodes (i.e., fair arbitration).

Then, the root classifies, among the plural nodes having issued the request in the step S403, a winning node that has acquired the permission by the arbitration and other losing nodes (step S407).

The root sends a permission signal to the single node that has acquired the permission as the result of the arbitration or without the arbitration in case the node number=1 (step S408), and the node having received the permission signal immediately initiates the transfer of the data (packet) to be transferred. After the data transfer is completed, the flow returns to the step S401.

The root also sends, in a step S409, the aforementioned DP packet indicating the loss in the arbitration to the node which has failed to acquire the permission in the arbitration (step S409). The node which has received the DP packet returns to the step S401 in order to issue again the request for the bus use right for data transfer, and waits until the predetermined gap length is obtained in the step S401.

[Asynchronous (Non-Sync) Transfer]

Figure 13:
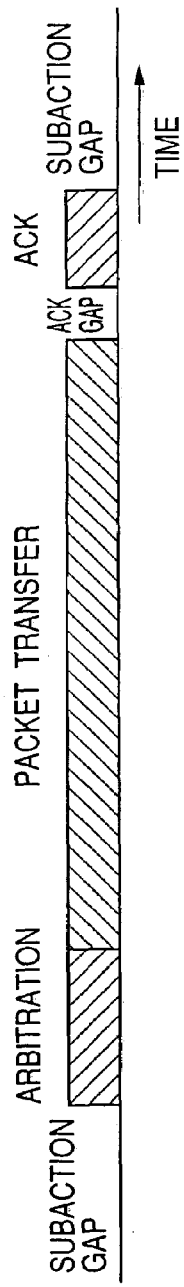
FIG. 13 is a view for explaining time transition of asynchronous transfer using the 1394 serial bus.

FIG. 13 shows phases in time of the asynchronous transfer, in which the initial subaction gap indicates the idle state of the bus. When this idle time reaches a predetermined value, the node wishing the data transfer judges that the bus is available and enters the arbitration process for acquiring the bus use right.

When the bus use right is acquired in the arbitration, the data transfer is executed in a packet format. After the data transfer, the receiving node completes the transfer by returning an acknowledgment code "ack" indicating the result of reception or sending a response packet, after a short gap called "ack gap". The "ack" code consists of 4-bit information and 4 check sum bits, including information indicating whether the transfer is successful or pending or the line is busy, and is immediately returned to the transmitting node.

Figure 14:
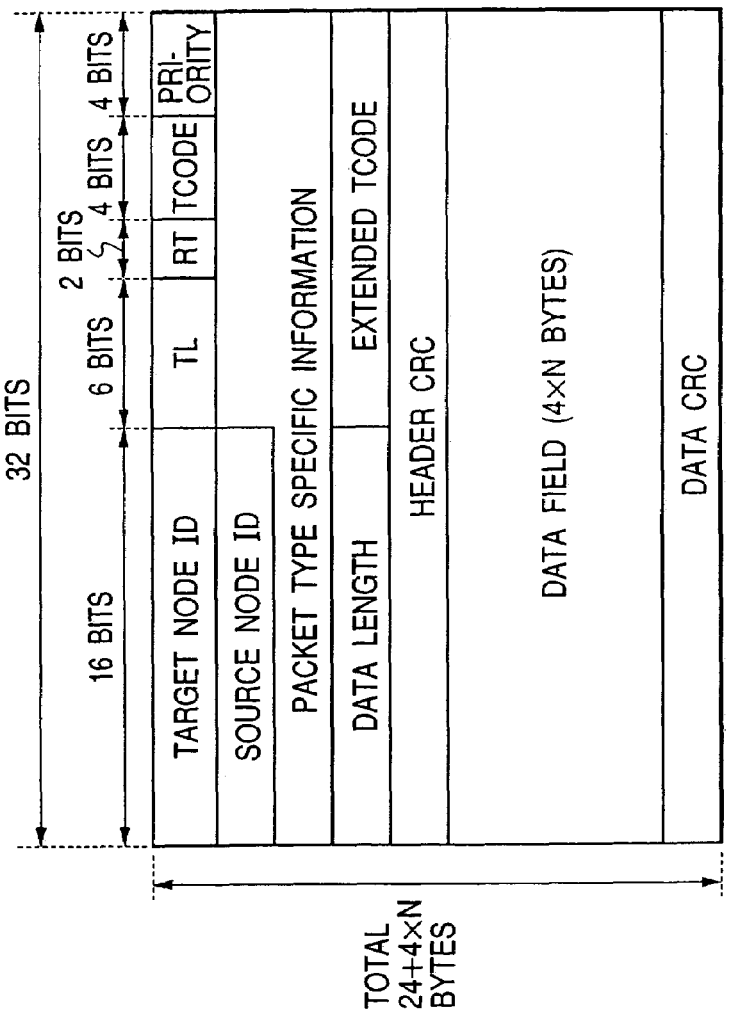
FIG. 14 is a view for explaining an example of packet format of the asynchronous transfer.

FIG. 14 shows an example of the packet format for the asynchronous transfer. The packet consists of a data portion, CRC (cyclic redundancy check) data for error correction and a header, which contains, as shown in FIG. 14, a destination node ID, a source node ID, a transfer data length and various codes.

The asynchronous transfer is a one-to-one communication from the source node to the destination node. The packet transferred from the source node is delivered to all the nodes in the network, but is disregarded in the nodes different in address and is read by the only one node of the address.

[Isochronous (Sync) Transfer]

The isochronous transfer is a synchronized transfer. The isochronous transfer, constituting the most important feature of the 1394 serial bus, is particularly suitable for transfer of the data requiring real-time transfer, for example multimedia data such as video image data or audio data.

In contrast to the asynchronous transfer in the one-to-one form, the isochronous transfer is conducted from the transferring source node to all other nodes uniformly by the broadcasting function.

Figure 15:
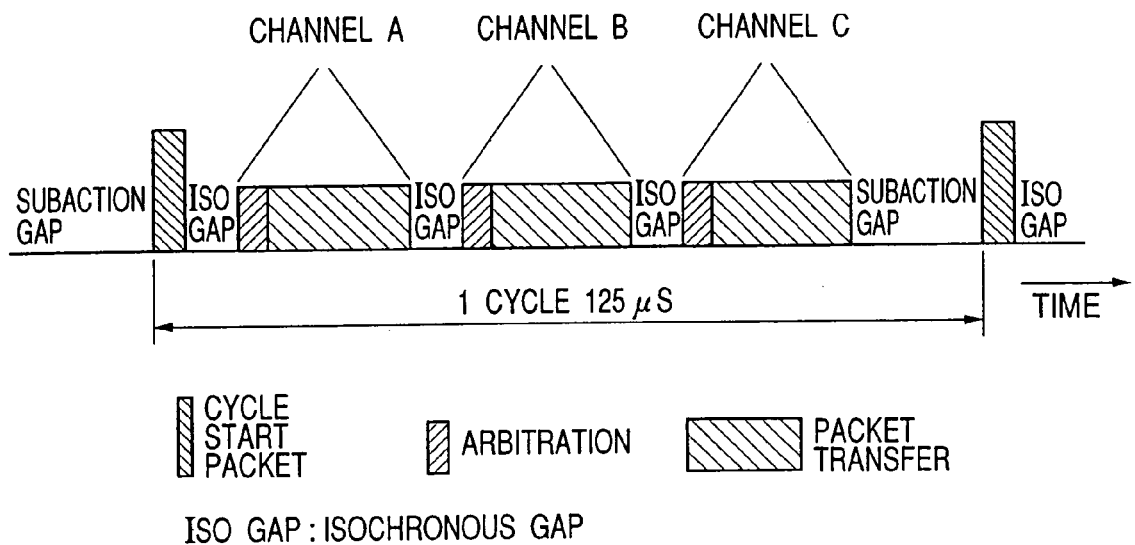
FIG. 15 is a view for explaining time transition of isochronous transfer using the 1394 serial bus.

FIG. 15 shows phases in time of the isochronous transfer. The isochronous transfer is executed on the bus at a constant interval, which is called the isochronous cycle and is selected as 125 μs. A cycle start packet (CSP) indicates the start time of the isochronous cycle, thus adjusting the time in each node. The cycle start packet is transmitted by a node called cycle master, which transmits the cycle start packet indicating the start of a cycle, after the lapse of a predetermined idle time (subaction gap) following the end of transfer in the immediately preceding cycle. Thus the cycle start packets are transmitted with an interval of 125 µs.

As indicated by channels A, B and C in FIG. 15, the packets of plural kinds within a cycle are respectively given channel ID's and can be distinguished in the transfer. Consequently the real-time simultaneous transfers among plural nodes are made possible, and the receiving node fetches the data of a desired channel ID only.

The channel ID does not indicate the address of the destination but merely gives a logic number to the transferred data. Consequently any packet is transmitted by broadcasting from a source node to all other nodes.

Prior to the isochronous packet transfer, there is executed an arbitration as in the case of asynchronous transfer. However, in the isochronous transfer, which is not the one-to-one transfer, there is no acknowledgment code.

The isochronous gap (iso gap) shown in FIG. 15 indicates an idle time required for confirming the availability of the bus, prior to the start of the isochronous transfer. When this idle time lapses, the node wishing the isochronous transfer judges that the bus is available and can enter the arbitration prior to the data transfer.

Figure 16:
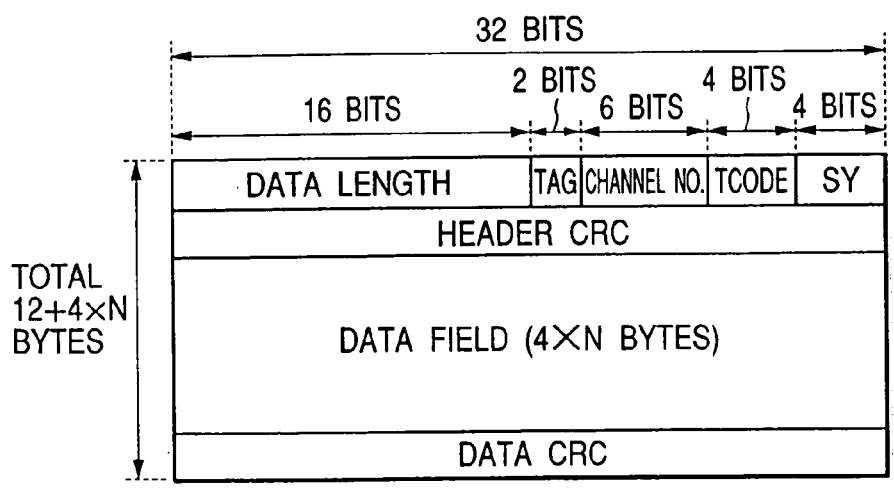
FIG. 16 is a view for explaining an example of packet format of the isochronous transfer.

FIG. 16 shows an example of the packet format for the isochronous transfer. The packet divided in each channel consists of a data portion, CRC (cyclic redundancy check) data for error correction and a header, which contains a transfer data length, a channel number, various codes and an error correcting CRC data.

[Bus Cycle]

Figure 17:
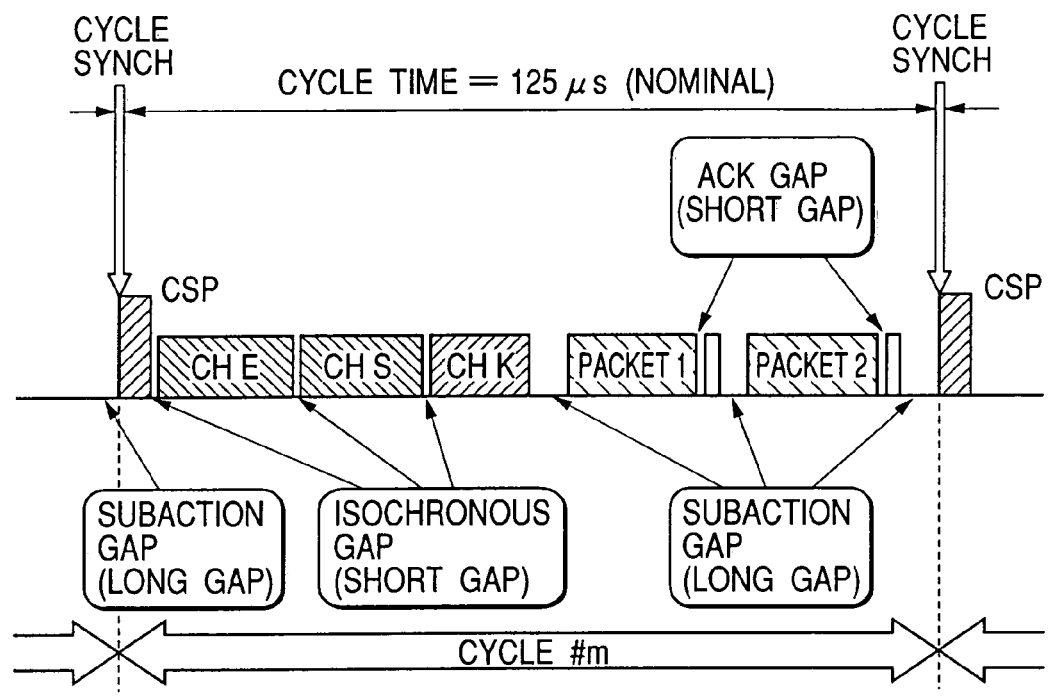
FIG. 17 is a view for explaining the state of packets transferred on the 1394 serial bus.

On the actual 1394 serial bus, the asynchronous transfer and the isochronous transfer can be present in mixed manner. FIG. 17 shows phases in time of the transfer state on the bus wherein the asynchronous transfer and the isochronous transfer are present in mixed manner.

The isochronous transfer has the higher priority than the asynchronous transfer, because, after the cycle start packet, the isochronous transfer can be activated with a shorter gap length (isochronous gap) of the idle period than the gap length (subaction gap) required for activating the asynchronous transfer. Therefore the isochronous transfer is executed preferentially to the asynchronous transfer.

In a general bus cycle shown in FIG. 17, the cycle start packet is transferred from the cycle master to other nodes at the start of a cycle #m. In response each node executes time adjustment, then the node wishing the isochronous transfer enters arbitration after waiting for the predetermined idle period (isochronous gap) and then transfers the packet. In FIG. 17, the isochronous transfer is executed in succession in the channels e, s and k.

The sequence from the arbitration to the packet transfer is repeated for the number of assigned channels to complete the isochronous transfer in the cycle #m, and the asynchronous transfer is then enabled.

When the idle time reaches the subaction gap required for the asynchronous transfer, the node wishing the asynchronous transfer judges that it can enter the arbitration.

However, the asynchronous transfer is enabled only if the subaction gap required for activating the asynchronous transfer can be realized within the period from the end of the isochronous transfer to the time (cycle synch) for transferring the next cycle start packet.

The cycle #m shown in FIG. 17 executes isochronous transfer of 3 channels and asynchronous transfer of 2 packets (packets 1 and 2) including the acknowledgments.

The cycle #m ends after the asynchronous packet 2 because there is reached the time (cycle synch) for starting the cycle #m+1.

However, if the time (cycle synch) for starting the next cycle is reached in the course of an isochronous or asynchronous transfer, such transfer is not interrupted but the cycle start packet of the next cycle is transmitted in the idle time after the end of such transfer. Thus, if a cycle continues in excess of 125 µs, the next cycle is made correspondingly shorter than 125 µs. In this manner the isochronous cycle can be made longer or shorter, taking 125 µs as the standard.

However, the isochronous transfer, if requested, is always executed in every cycle in order to maintain the real-time transfer, while the asynchronous transfer may be delayed to the next or subsequent cycle in case the cycle time is shortened. The cycle time, including information on such delay, is managed by the cycle master.

In the foregoing, there has been summarized the functions of the IEEE 1394 serial bus.

Subsequently, the outline of the PIAFS protocol will be explained.

[Outline of PIAFS Protocol Technique]

"PIAFS" represents PHS Internet Access Forum Standard which provides the transfer control procedure for realizing high-quality data transfer by using 32 Kbits/sec unrestricted digital bearer. The transfer control procedure (PIAFS procedure) will be explained with reference to FIG. 18.

Figure 18:
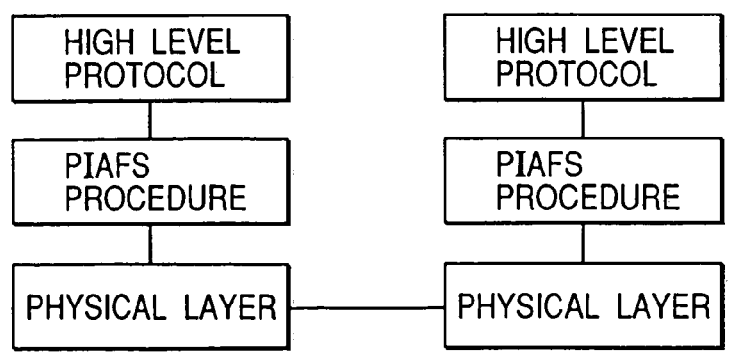
FIG. 18 is a view for explaining positioning of transfer control procedure of PIAFS communication employed in the system.

In FIG. 18, the high level protocol represents the protocol depending on application program such as facsimile communication, PC communication and Internet communication. The physical layer represents the layer for converting the signal format output in the procedure into the form suitable for the physical line.

The PIAFS procedure between the high level protocol and the physical layer includes an in-band negotiation procedure and an ARQ transfer control procedure. The in-band negotiation procedure is the procedure in which end-to-end negotiation is performed before establishment of data link and one of plural data link protocols is selected in order to be able to cope with ulterior image transfer and future new transfer system. The ARQ transfer control procedure is the error control procedure corresponding to the layer 2 in the PHS communication phase.

Hereinafter, the PIAFS protocol will be explained in more detail.

[In-Band Negotiation Procedure]

Figure 19:
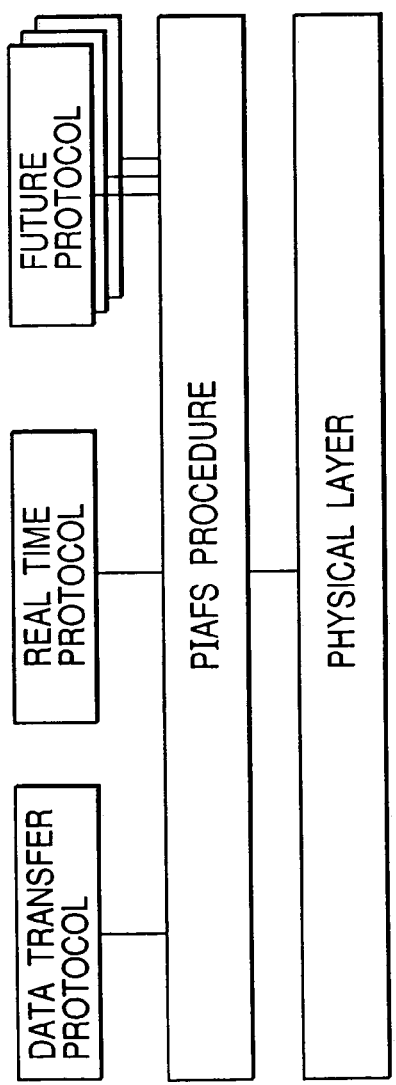
FIG. 19 is a view for explaining positioning of in-band negotiation procedure constituting the transfer control procedure.

FIG. 19 shows the in-band negotiation.

As shown in FIG. 19, the in-band negotiation part selects one of a data transfer protocol, a real-time protocol and a future protocol on the basis of the in-band negotiation.

Figure 20A:
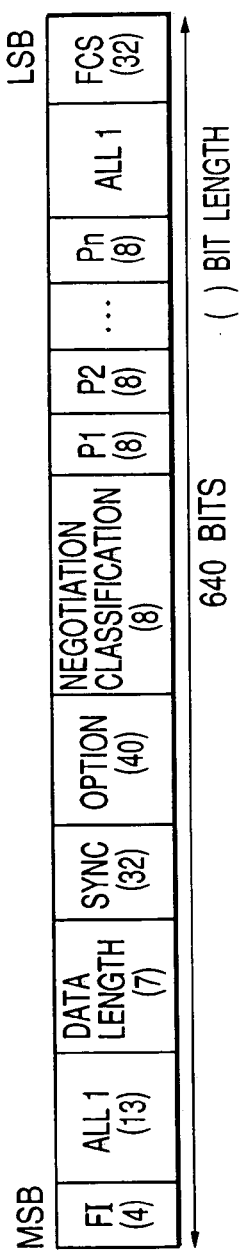
FIGS. 20A and 20B are views for explaining frame structures in the in-band negotiation procedure.

FIG. 20A shows the frame structure of the in-band negotiation.

In FIG. 20A, "FI" is used to discriminate whether there is the negotiation frame or the negotiation frame including a sync function.

"DATA LENGTH" represents the data lengths of "SYNC" to "P1, P2, . . . , Pn" in number of bytes. For example, if n=2 and thus the data length is "SYNC" to "P2", the data length=12 (bytes) is set.

"SYNC" is used to establish frame sync (or frame synchronization). The detection condition is that all the bits are coincident (no error tolerance).

"NEGOTIATION CLASSIFICATION" is used to represent classification of "REQUEST" (negotiation request to partner station), "RECEPTION" (reception response to negotiation request) and "REFUSAL" (refusal response to negotiation request).

"P1, P2, . . . , Pn" is used to represent the classification of the protocol. For example, "P1" represents the data transfer protocol, and the "P2" represents the real-time protocol.

"FCS" is used to detect a frame error in accordance with ITU-T Recommendation V4.2 CRC-32.

Figure 20B:
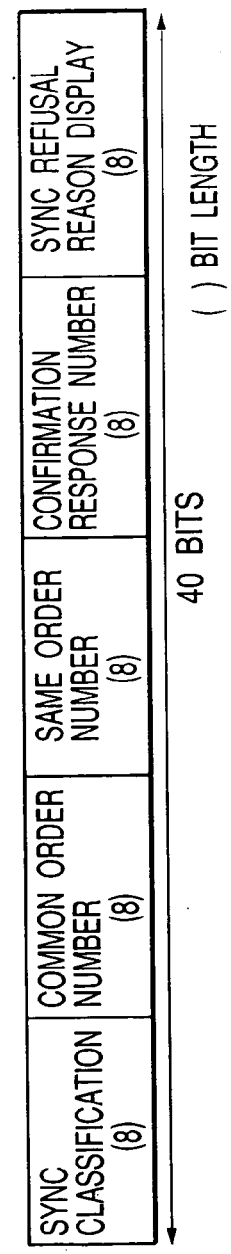

"OPTION" has such a structure as shown in FIG. 20B if "FI" represents the negotiation frame including the sync function.

The negotiation procedure is as follows.

(1) The data link starting side (also called as control starting side) sets the usable protocols to the negotiation frames "P1 to Pn" in the priority order, sets "REQUEST" to "NEGOTIATION CLASSIFICATION", and sends them to the partner station. Then the data link starting side starts a waiting timer for "REQUEST", and continuously sends the "REQUEST" setting frame until "REQUEST" is received from the partner station.

If there is only one usable protocol, only "P1" is used. On the other hand, if there are the plural usable protocols, "P1, P2, . . . , Pn" are used according to the priority order, and "FI" is set to the negotiation frame including the sync function. The "OPTION" area in this case accords to the structure shown in FIG. 20B.

(2) The data link started side (i.e., side to which data link is started) (also called as control started side) selects only one usable protocol in the requested priority order, from the usable protocols indicated by the reception frame "P1 to Pn". Concretely, if the requested first-priority protocol is usable at the control started side, such the first-priority protocol is selected. On the other hand, if the first-priority protocol is unusable and the second-priority protocol is usable, such the second-priority protocol is selected.

(3) The control started side sets the protocol selected in the above procedure (2) to "P1", sets "RECEPTION" to the frame "NEGOTIATION CLASSIFICATION", and continuously sends them to the control starting side.

At this time, if the protocol (i.e., selected protocol) set to "P1" is the data transfer protocol, "FI" is set to the negotiation frame including the sync function. The "OPTION" area in this case accords to the structure shown in FIG. 20B.

(4) If the "RECEPTION" setting frame is received from the partner station, the control starting side stops a waiting timer for "RECEPTION", selects the protocol indicated by the reception frame "P1", and ends the negotiation. Then the control starting side establishes the data link. If "FI" of the received frame is the negotiation frame including the sync function, the ARQ frame sync and RTF measurement end.

(5) If the control started side does not have the usable protocol indicated by the reception frame "P1 to Pn", nothing is set to "P1 to Pn" and "REFUSAL" is set to "NEGOTIATION CLASSIFICATION". Then the control started side continuously sends them to the control starting side.

If the control starting side receives the "REFUSAL" setting frame, it stops the "RECEPTION" waiting timer and releases the physical link.

(6) If competition occurs in the negotiation, i.e., if both sides are the control starting sides and the protocols resulted from the negotiation are incoincident, it can be recognized that these sides become incoincident with each other. Thus, the data link is not started, but the negotiation is again started.

[ARQ Transfer Control Procedure]

Figure 21:
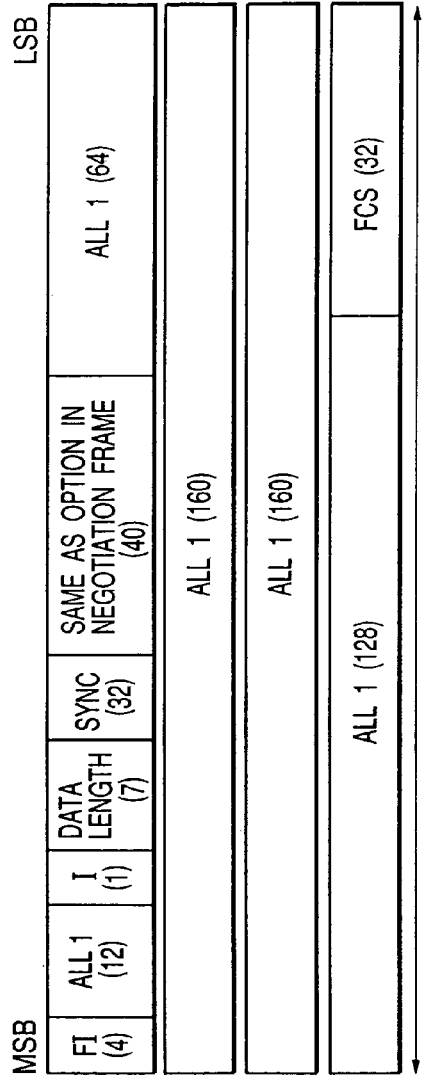
FIG. 21 is a view for explaining sync frame structure in an ARQ transfer control procedure constituting the transfer control procedure.

FIG. 21 shows the structure of the sync frame to be transmitted and received in the ARQ transfer control. The sync frame shown in FIG. 21 is the frame to be sent for frame sync. As the sync frame, there are three kinds of frames, i.e., sync request, sync reception and sync refusal classified in "SYNC CLASSIFICATION" area shown in FIG. 20B.

Figure 22:
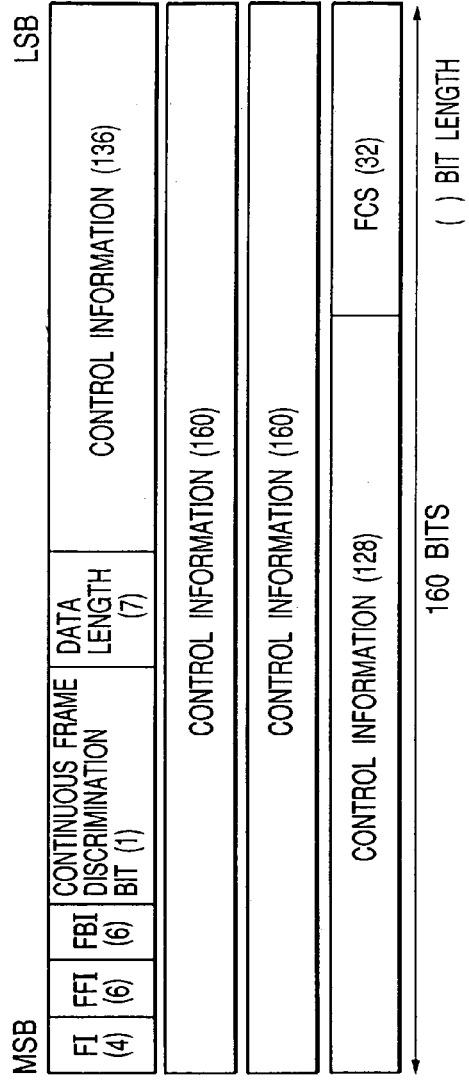
FIG. 22 is a view for explaining control frame structure in the ARQ transfer control procedure.
Figure 23:
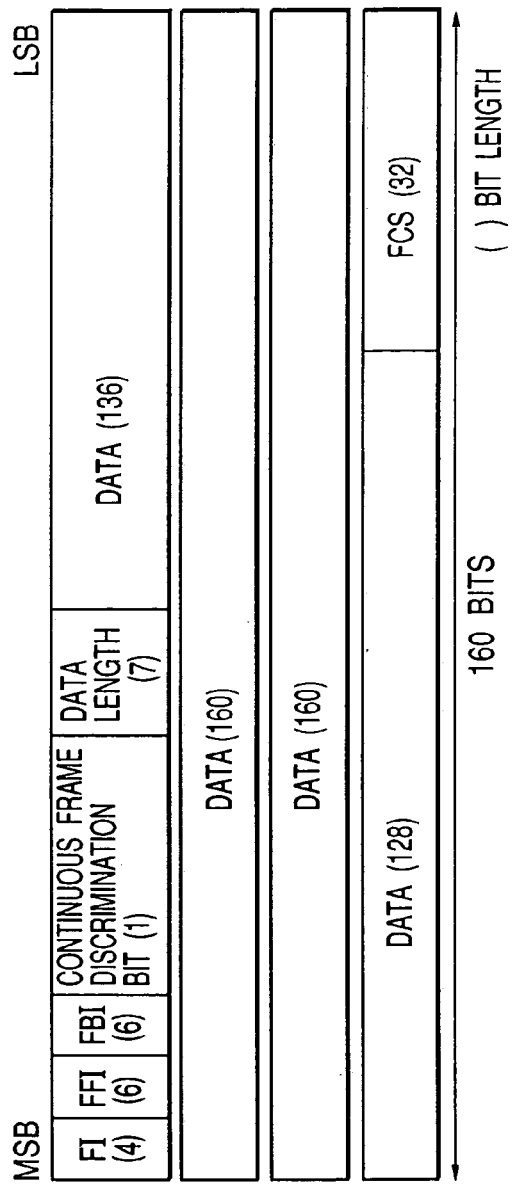
FIG. 23 is a view for explaining data frame structure in the ARQ transfer control procedure.

FIG. 22 shows the structure of the control frame, and FIG. 23 shows the structure of the data frame.

In these drawings, "FI" is used to discriminate whether there is the negotiation frame, the negotiation frame including the sync function, the sync frame, the control frame or the data frame.

"FFI" is "Feed Forward Information" and represents the frame number in the ARQ transfer control.

"FBI" is "Feed Back Information" and represents the request frame number in the ARQ transfer control.

"CONTINUOUS FRAME DISCRIMINATION BIT" represents whether continuous frame exists in the control frame and the data frame.

"DATA LENGTH" represents the range from the true data length to "FCS" in which available data exists, in the unit of bytes. "DATA LENGTH" in the sync request or the sync reception is "8", and "DATA LENGTH" in the sync refusal is "9". Further, "DATA LENGTH" in the control frame (continuous frame) represents the control information field for each frame.

"SYNC" is used to establish frame sync. The detection condition is that all the bits are coincident (no error tolerance).

"CONTROL INFORMATION" is transferred by the control frame. In the transfer system, every time the control frame is transmitted, reception confirmation of the frame is expected by the control frame reception side.

"FCS" is used to detect the frame error in accordance with ITU-T Recommendation V4.2 CRC-32.

The area next to "SYNC" accords to the structure shown in FIG. 20B. In this area (FIG. 20B), "SYNC CLASSIFICATION" is set with "SYNC RECEPTION" as the response when the control starting side receives "SYNC REQUEST", and the frame of this reception is sent. If the data link is impossible, "SYNC REFUSAL" is set, and the frame of this refusal is sent. If the "SYNC REQUEST" transmission side receives "SYNC REFUSAL" as the response, sending of the "SYNC REQUEST" setting frame is stopped.

"COMMON ORDER NUMBER" represents the numbers independently counted by the control starting side and the control started side. Every time the "SYNC REQUEST", "SYNC RECEPTION" and "SYNC REFUSAL" setting frames are sent, the number is increased one by one from sending start of "SYNC REQUEST". Then if the result of increment exceeds "255", the number is returned to "1" and then the increment restarts. Such "COMMON ORDER NUMBER" is used for the RTF measurement, and its initial value is "1".

"SAME ORDER NUMBER" represents the number incremented one by one from sending start of "SYNC RECEPTION" and "SYNC REFUSAL". If the result of increment exceeds "255", the number is returned to "1" and then the increment restarts. Such "SAME ORDER NUMBER" is used for the RTF measurement, and its initial value is "1". However, "SAME ORDER NUMBER" for "SYNC REQUEST" is fixed to be "1".

"CONFIRMATION RESPONSE NUMBER" is to set "COMMON ORDER NUMBER" of the initially received "SYNC REQUEST" setting frame. Such setting is performed when "SYNC RECEPTION" or "SYNC REFUSAL" is set to send this frame. Such "CONFIRMATION RESPONSE NUMBER" is also used for the RTF measurement, and "CONFIRMATION RESPONSE NUMBER" in "SYNC REQUEST" is fixed to be "1".

"SYNC REFUSAL REASON DISPLAY" is to set predetermined information at the "SYNC REFUSAL" setting frame sending when response is impossible for some reasons although "SYNC REQUEST" has been received.

The sync frame, the control frame and the data frame including the above areas are sequentially sent from most significant bit (MSB) toward least significant bit (LSB).

Figure 24:
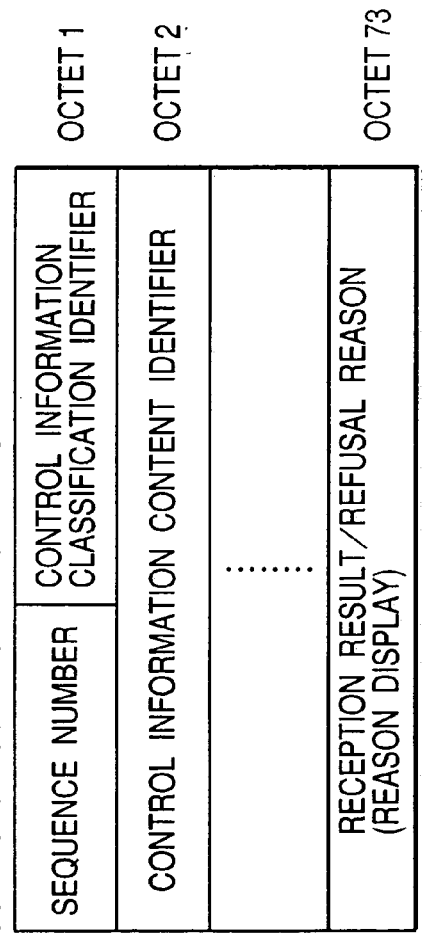
FIG. 24 is a view for explaining coding of control information in the control frame structure.

FIG. 24 shows coding of "CONTROL INFORMATION" of the control frame shown in FIG. 22.

In FIG. 24, "CONTROL INFORMATION CLASSIFICATION IDENTIFIER" represents request, notification, reception (of request), refusal (of request), response (to notification), continuous frame transmittable and the like.

"SEQUENCE NUMBER" represents by the modulo 16 the sequence number of which contents are indicated by "CONTROL INFORMATION CLASSIFICATION IDENTIFIER", and discriminates the correspondence between the control information (request and notification) sent from the started side and the reception confirmation number (reception, refusal, response continuous frame transmittable) sent from the started side.

"CONTROL INFORMATION CONTENT IDENTIFIER" is to discriminate the contents of the information indicated by the modulo 3 or lower. In this area, the discrimination information such as the control information (communication parameter setting) concerning data link establishment, the in-communication control information (ARQ parameter setting), the control information (data link release) concerning data link release, and other control information (user control information) are stored.

FIG. 25 shows the contents of the control information (communication parameter setting) concerning data link establishment.

The messages of communication parameters are to set the communication parameter in the above transfer system, and initially sent from the control starting side when the communication by the ARQ transfer control starts.

In FIG. 25, the octet 3 represents "ARQ data transfer protocol version", and thus the protocol version concerning the data transfer in the ARQ transfer control is notified. This "ARQ data transfer protocol version" can be end-to-end negotiated. For example, if there are the plural protocol versions, the lower version is selected and set in the negotiation.

The octet 4 represents "ARQ control information transfer protocol version", and thus the protocol version concerning the control information transfer in the ARQ transfer control is notified. This "ARQ control information transfer protocol version" includes protocol regulation concerning a sync system of the ARQ transfer control. Further, also the "ARQ control information transfer protocol version" can be end-to-end negotiated. If there are the plural protocol versions, the lower version is selected and set in the negotiation.

The octet 5 represents "measured RTF value", and thus the RTF value measured is notified by the sync frame exchange in the ARQ control transfer.

The octet 6 represents "data compression identifier", and thus a data compression system in case of performing the data communication by the ARQ transfer control is designated. Also, the "data compression identifier" can be end-to-end negotiated.

The octet 7 represents "total number of codes", i.e., the parameter P1 of the data compression system (V42.bis).

The octet 8 represents "maximum character string length", i.e., the parameter P2 of the data compression system (V42.bis).

The octet 9 represents "frame length", and thus the frame length in the ARQ transfer control can be set. Also, the "frame length" can be end-to-end negotiated.

The octet 10 represents "maximum frame number", i.e., the modulo number. The "maximum frame number" is set by the initial negotiation.

The octet 73 represents "reception result/refusal reason (reason display)". In this octet, "reception result" is the reception result of the request message in the reception message. For example, as "reception result", there are "all setting possible", "partial setting possible" and the like. Further, "refusal reason" is the reason for refusing the request message in the refusal message. For example, as "refusal reason", there are "description error", "setting impossible" and the like.

FIG. 26 shows the contents of the in-communication control information (ARQ parameter setting).

The in-communication control information is used to measure the RTF at the control starting side every time the ARQ sync starts and to notify the measured RTF after the ARQ sync completion from the control starting side to the started side, during the data communication by the ARQ transfer control.

FIG. 27 shows the contents of the control information (data link release) concerning the data link release.

In FIG. 27, in the "reception result/refusal reason (reason display)", for example, "normal release", "normal release and data link continuity prohibition", "DTE busy", "temporary obstacle", "request parameter setting nonrecognition", "request parameter current setting impossible", "unprovided parameter designation" and the like are set.

FIG. 28 shows the contents of other control information (user control information).

The information is to transmit the user information. The contents of the information field is not at all restricted, and the user information can be freely used by the user. However, if the request of incomprehensible user information is received, the refusal with the setting impossible reason is sent. Even if the notification of incomprehensible user information is received, it is necessary to send the response to such the notification.

FIG. 29 shows the contents of the continuous frame transmission possible information.

In the frame of which "control information classification" has been set with "request" or "notification", the information is to enable the continuous frame transmission to the control frame transmission side.

The operation sequence of the ARQ transfer control by the sync frame, the control frame and the data frame is as follows.

(1) Link Establishment

<Control Starting Side>

In this sequence, if there is the communication request from the high-level module, the negotiation frame (negotiation classification: request, sync function existing, sync request) is initially sent so as to establish the ARQ frame sync. After then, a sync reception waiting timer is started, to detect the negotiation frame (negotiation classification: reception, sync function existing, sync reception) from the partner. In case of time-out, failure of the transmission request is notified to the high-level module. If the negotiation frame (negotiation classification: reception, sync function existing, sync reception) from the partner is detected, it is considered that the sync is given. Thus, the sync reception waiting timer is stopped, initial setting to an internal parameter or the like is performed, and the negotiation of the communication parameter is performed. The link establishment is completed at normal completion of the negotiation, the communication request establishment is notified to the high-level module, and it enters into the in-communication state. If the negotiation of the communication parameter is not normally completed due to parameter incoincidence or the like, the communication request failure is notified to the high-level module.

<Control Started Side>

If the negotiation frame (negotiation classification: request, sync function existing, sync request) from the control starting side is detected, the negotiation frame (negotiation classification: reception, sync function existing, sync reception) is sent. After then, the sync reception after-transmission timer is started to detect the control frame (request) from the partner. In case of time-out, the sync establishment failure is notified to the high-level module. If the control frame (request) from the partner is detected, it is considered that the sync is given. Thus, the sync reception after-transmission timer is stopped, initial setting to an internal parameter or the like is performed, and the negotiation of the communication parameter is performed. The link establishment is completed at normal completion of the negotiation, the sync establishment is notified to the high-level module, and it enters into the in-communication state. If the negotiation of the communication parameter is not normally completed due to parameter incoincidence or the like, the sync establishment failure is notified to the high-level module.

(2) Link Release

<Control Starting Side>

In this sequence, if there is the release request from the high-level module or the internal release request, the control frame (data link release) is initially sent so as to request the link release. After then, a confirmation waiting timer is started to detect the response confirmation frame from the partner. In case of time-out, it is considered that the link is released. Thus, the link release is notified to the high-level module, and the communication ends. If the response confirmation frame from the partner is detected, it is considered that the link is released. Thus, the confirmation waiting timer is stopped, the link release is notified to the high-level module, and the communication ends.

<Control Started Side>

If the link release is possible, the side which received the control frame for requesting the link release continuously sends the response confirmation frame to the control frame "K" times. Then the control started side notifies the link release to the high-level module, and the communication ends.

(3) Frame Sync and RTF Measurement Method

When the initial sync/re-sync sequence starts, the control starting side sends the sync request. The control started side is in the state for waiting the sync request, and transmits the sync reception to the control starting side after receiving the frame. If the response is impossible for some reasons although the sync request is received, the sync refusal as well as the sync refusal reason display is transmitted. The sync frame is detected on condition that "SYNC coincident", "FI confirmation" and "CRC no error" are satisfied. The sync sequence is started on condition that (a) data link start time, (b) ARQ reception frame continuous FCS error detection time, and (c) the sync frame reception time during transmission of the control frame or the data frame are satisfied. Further, if a terminal station apparatus can monitor the state of a mobile station (PS), it is possible to start the sync sequence when the information channel (TCH) is switched and the hand-off ends.

(3-1) Initial Sync Sequence

Figure 30:
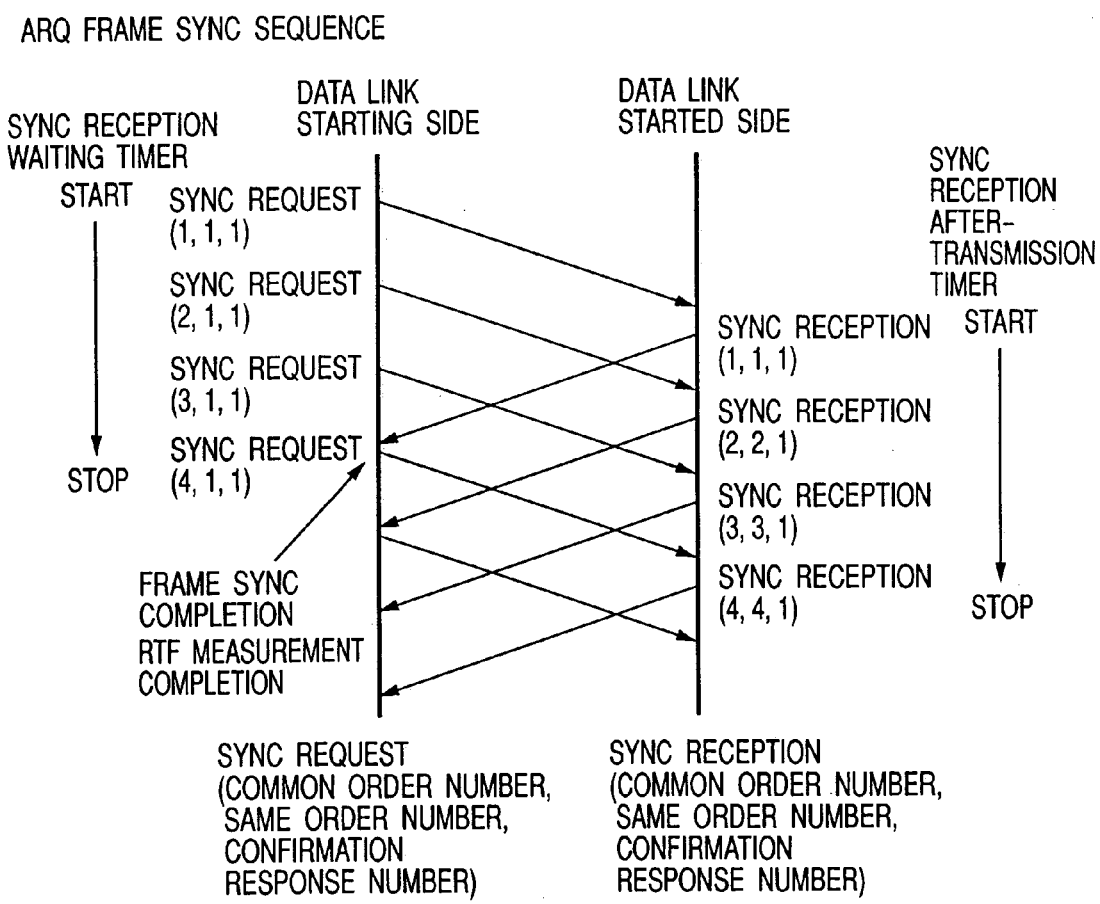
FIG. 30 is a view for explaining a sync frame sequence in the ARQ transfer control procedure.

For the initial sync of the ARQ frame, the negotiation frame (including sync frame function) is used. FIG. 30 shows the ARQ sync sequence. The ARQ frame initial sync establishment method accords to the following.

<Step 1>

The control starting side sends the negotiation frame (negotiation classification: request, sync function existing, sync request) and also starts the sync reception waiting timer. Then "COMMON ORDER NUMBER" in the option area is incremented one by one from the negotiation frame (negotiation classification: request, sync function existing, sync request) sending start time. In the negotiation frame (negotiation classification: request, sync function existing, sync request), "SAME ORDER NUMBER" and "CONFIRMATION RESPONSE NUMBER" in the option area are fixed to "1".

<Step 2>

If the control started side receives the negotiation frame (negotiation classification: request, sync function existing, sync request), it sends the negotiation frame (negotiation classification: reception, sync function existing, sync reception) and also starts the sync reception after-sending timer. Then "COMMON ORDER NUMBER" and "SAME ORDER NUMBER" in the option area are incremented one by one from the negotiation frame (negotiation classification: request, sync function existing, sync reception) sending start time. In the negotiation frame (negotiation classification: reception, sync function existing, sync reception), "COMMON ORDER NUMBER" in the option area added to the negotiation frame (negotiation classification: request, sync function existing, sync request) from the control starting side and initially received at the control started side is copied and written into "CONFIRMATION RESPONSE NUMBER" in the option area.

<Step 3>

If the control starting side receives the negotiation frame (negotiation classification: reception, sync function existing, sync reception), the ARQ sync is given, and the control starting side stops the sync reception waiting timer. At the same time, it is possible to measure the RTF, and the communication parameter is negotiated.

<Step 4>

If the control frame (request) from the partner is detected, the control started side considers that the sync is given, and thus stops the sync reception after-sending timer, whereby the communication parameter is negotiated.

<Step 5>

In case of time-out of the sync reception waiting timer or the sync reception after-sending timer, the ARQ sync establishment fails, and the high-level module is notified of the data link establishment failure.

\<Step 6\>

If competition of the data links occurs, the process from the partner starting side is preceded. Namely, if the sync request from the partner is received during the sync request transmission, transmission of own sync request is stopped, and the process to the sync request from the partner starting side is performed.

(3-2) Re-Sync Sequence

As described above, during the communication, (b) when the ARQ reception frame continuous FCS error detection is performed, (c) when the sync frame is received during the transmission of the control frame or the data frame, or when the information channel (TCH) is switched and the hand-off ends while the terminal station apparatus can monitor the state of the movable station (PS) by the terminal station apparatus, the re-sync is performed. The sync frame is used for the ARQ frame re-sync.

Initially, the control starting side establishes the ARQ sync according to the following.

\<Step 1\>

The control starting side sends the sync frame (sync request) and also starts the sync reception waiting timer to detect the sync frame (sync reception) from the partner. Then "COMMON ORDER NUMBER" is incremented one by one from the sync frame (sync request) sending start time. In the sync request, "SAME ORDER NUMBER" and "CONFIRMATION RESPONSE NUMBER" are fixed to "11".

\<Step 2\>

If the control started side receives the sync frame (sync request), the ARQ sync is established, and the sync reception waiting timer is stopped. At the same time, it becomes possible to measure the RTF, and thus the ARQ parameter is negotiated.

\<Step 3\>

In case of time-out of the sync reception timer, the ARQ sync establishment fails, whereby the sync establishment failure is notified to the high-level module.

On the other hand, the control started side establishes the ARQ sync according to the following.

\<Step 1\>

As described above, (b) when the ARQ reception frame continuous FCS error detection is performed, and (c) when the sync frame is received during the transmission of the control frame or the data frame, the sync request waiting timer is started to wait the sync frame from the partner station.

\<Step 2\>

If the sync frame (sync request) is received from the partner station, the sync request waiting timer is stopped. At the same time, the sync reception after-sending timer is started, and the sync frame (sync reception) is sent. Then "COMMON ORDER NUMBER" and "SAME ORDER NUMBER" are respectively incremented one by one from the sync frame (sync reception) sending start time. Further, "COMMON ORDER NUMBER" added to the sync frame (sync request) from the control starting side and initially received at the control started side is copied and written into "CONFIRMATION RESPONSE NUMBER".

\<Step 3\>

If the control frame (request) from the partner station is detected, it is considered that the sync can be given. Thus, the sync reception after-sending timer is stopped, and the ARQ parameter is negotiated.

\<Step 4\>

In case of time-out of each timer, the ARQ sync establishment fails, and the sync establishment failure is notified to the high-level module.

If both the stations operate as the control starting side, it is possible to occur the competition of the sync frame (sync request) even at the ARQ frame re-sync starting time. Even in this case, the process from the partner starting side is preceded. That is, if the sync request is received from the partner during the sync request transmission, the transfer of own sync request is stopped, and the process for the sync request from the partner starting side is performed.

(3-3) RTF Measurement Method

The RTF value is the parameter for defining an frame interval until the re-sending is performed. That is, a response delay time is measured every call connection, and the measured value is set as the RTF value. The RTF value is measured at the control starting side, and then notified to the control started side with the control frame after the sync is established. The control started side measures the RTF value according to the following.

\<Step 1\>

At the time when the sync reception from the control started side is received, following values are detected.

($\alpha$) "COMMON ORDER NUMBER" added to currently sent sync request/sync reception ($\beta$) "SAME ORDER NUMBER" attached to the sync reception from the partner station ($\gamma$) "CONFIRMATION RESPONSE NUMBER" attached to the sync reception from the partner station \<Step 2\>

The RTF value is calculated and set by the following equation.

$$RTF=\{\alpha+510-(\beta+\gamma)\}\bmod 255+2+N$$

In the equation, the constant N is assumed as "2" in this case.

\<Step 3\>

If "RTF$-$N$\leq$2" and "60$\leq$RTF$-$N", the data link release sequence starts.

\<Step 4\>

The RTF value calculated (or measured) in the step 2 is notified to the control started side by the control frame.

(3-4) ARQ Frame Refusal Sequence

In the case where the sync request has been received, if the response is impossible for some reasons, the sync refusal (refusal reason) is set at "REASON DISPLAY" instead of the sync reception, and the set reason is continuously transmitted L times. In order to simplify the process of the ARQ sync process unit, the processes same as those in the sync reception are performed for "COMMON ORDER NUMBER", "SAME ORDER NUMBER" and "CONFIRMATION RESPONSE NUMBER". It is assumed that the value of "L" is "20".

If the control starting side received such the sync refusal frame, it stops the sync request transmission and the sync reception waiting timer. Then the data link establishment failure is notified to the high-level module.

(4) Control Signal System

(4-1) Control Information Transfer System

The control information sent from the control starting side is "request" and "notification". If "REQUEST" is permitted, "reception" is issued as the reception confirmation. On the other hand, if "request" is not permitted, "refusal" is issued as the reception confirmation. Further, the reception confirmation "response" is corresponding to "notification". The control information transfer system in this case is the system in which the control frame reception confirmation of the reception/response/refusal/continuous frame transmittable (hereinafter called as confirmation frame) from the control started side is expected as the response every time the request/notification control frame is sent from the control starting side.

If the control frame sending is requested, the control starting side preferentially sends the control frame even if there is the data to be sent. Then the control starting side repeatedly sends the control frame of the identical contents until the confirmation frame is received. In case of continuously sending the control frame, the control starting side waits the reception of the confirmation frame and then sends the next control frame.

In order to discriminate the control frames continuously sent, the sequence number is provided for the control information. Therefore, the control started side returns to the control starting side the sequence number attached to the control information sent from the control starting side, so that the control starting side can discriminate which control frame the confirmation frame corresponds to. The number of modulo of the sequence number at this time is assumed as "16", and the sequence number is independent in end-to-end state. The initial value of the sequence number at the starting time is "0".

The control starting side receives the confirmation frame and then sends the data frame if there is no control information to be continuously sent. The control started side can confirm that the confirmation frame has reached the partner, by receiving the control frame of the incremented sequence number or receiving the data frame. Until that time, the control started side continues to send the confirmation frame even if there is the data to be sent.

Figure 31:
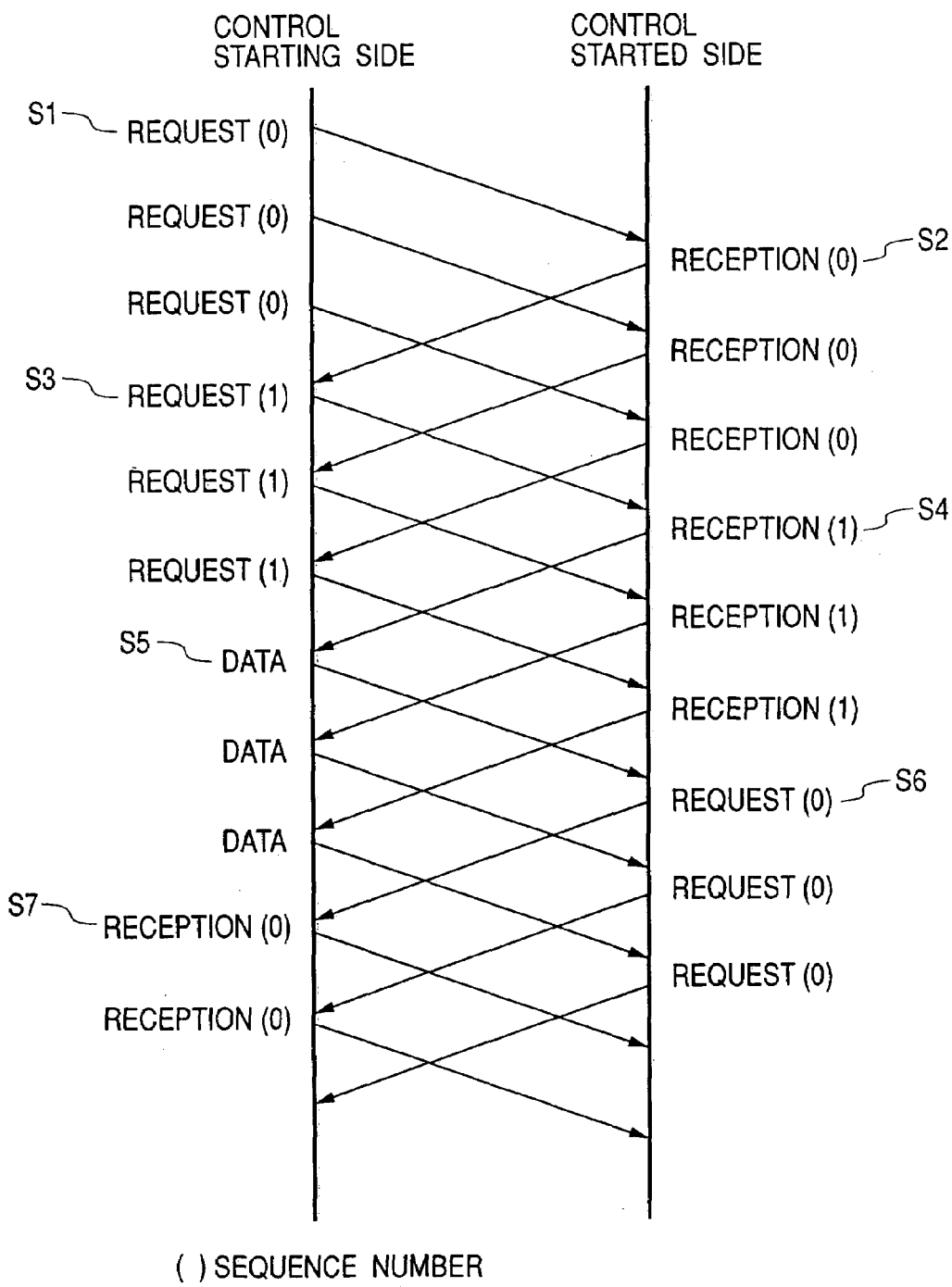
FIG. 31 is a view for explaining a control frame sequence in the ARQ transfer control procedure.

FIG. 31 shows an example of the above-described control frame transmission/reception sequence.

As shown in FIG. 31, initially, the control starting side sends the request (0) (step S1), and the control started side sends the reception (0) to the request (0) (step S2).

Subsequently, the control starting side receives the reception (0) (step S3) and thus sends the next request (1) (step S4). If the control starting side receives the reception (1) for the request (1), it sends the data because there is no request to be sent (step S5).

Subsequently, since the control started side can confirm that the reception (1) has been sent in the step S5, it sends the control frame of the request (0) to be transmitted (step S6). Then the control starting side sends the reception (0) to the request (0) (step S7).

If the control frame competition with the partner occurs, the control frame from the partner is preceded. That is, if the control frame "request" or "notification" is received while own side is transmitting the control frame, the own side stops sending the control frame and performs the control process to the frame "request" or "notification". Then the own side returns the confirmation frame.

If the ARQ re-sync process is started during the transfer of the control frame, the control frame is transferred after the ARQ re-sync is completed. In this case, the control information and the sequence number transmitted before the ARQ sync process are stored.

Further, if the competition of the control frame occurs during the continuous frame transmission, the same process as above is performed.

Figure 32:
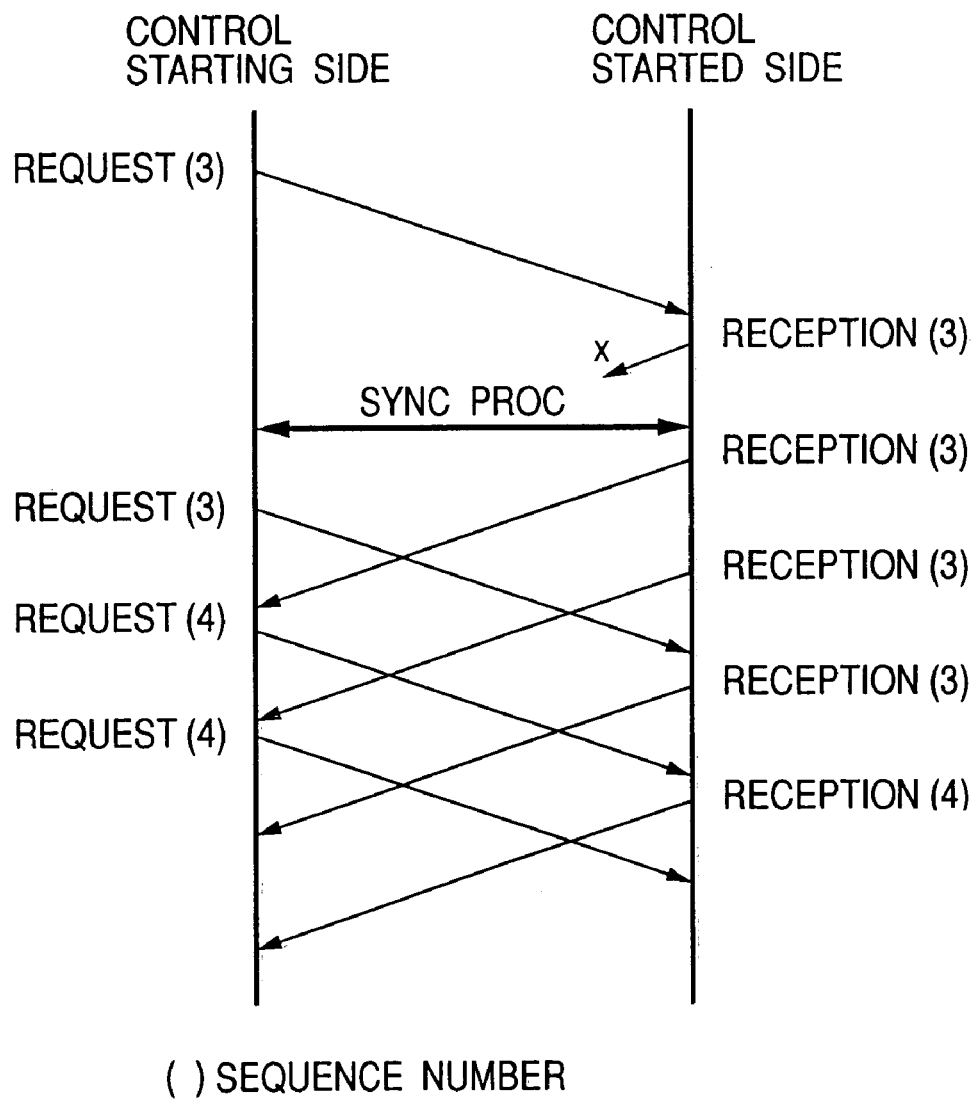
FIG. 32 is a view for explaining re-sync during the control information transfer in the control frame sequence.

FIG. 32 shows an example of the sequence in the case where the ARQ re-sync process starts during the control frame transfer.

In FIG. 32, the ARQ re-sync process starts when the control started side intends to send the reception (3) to the request (3). Therefore, the control started side interrupts the sending of the reception (3), and restarts such the sending after the ARQ re-sync process ends.

In this case, the "control information" may extend over the plural control frames. If so, the fact that the continuous frames exist is indicated by "continuous frame discrimination bit". As the process to "request" (continuous frame existing), there are the following two cases.

Figure 33:
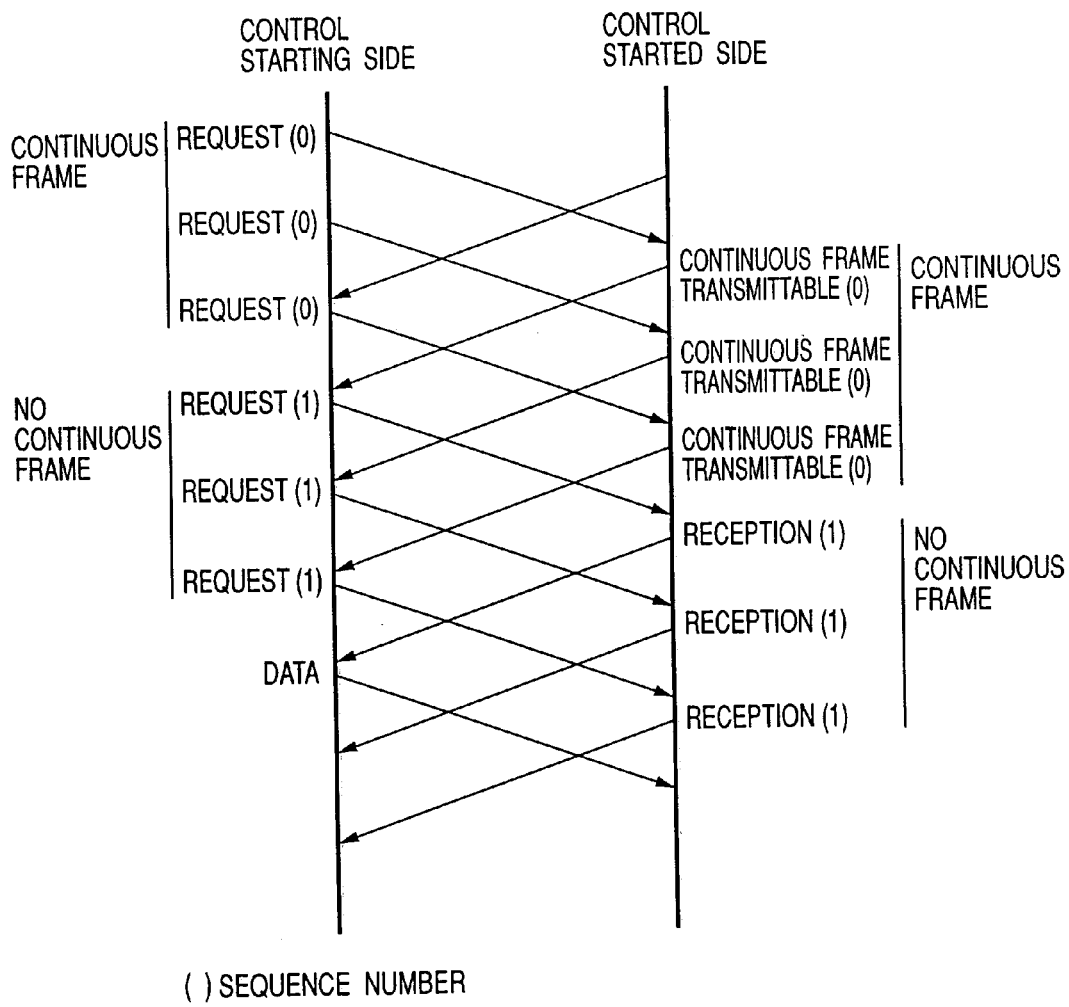
FIG. 33 is a view for explaining the control information transfer (continuous frame being existing and request being processed individually) in the control frame sequence.

In the first case, as shown in FIG. 33, the control started side sends the response "continuous frame transmittable" to "request" (continuous frame existing), and collectively performs the processes after receiving all "request". The control started side indicates the processed result (reception/refuse) to the final frame (no continuous frame).

Figure 34:
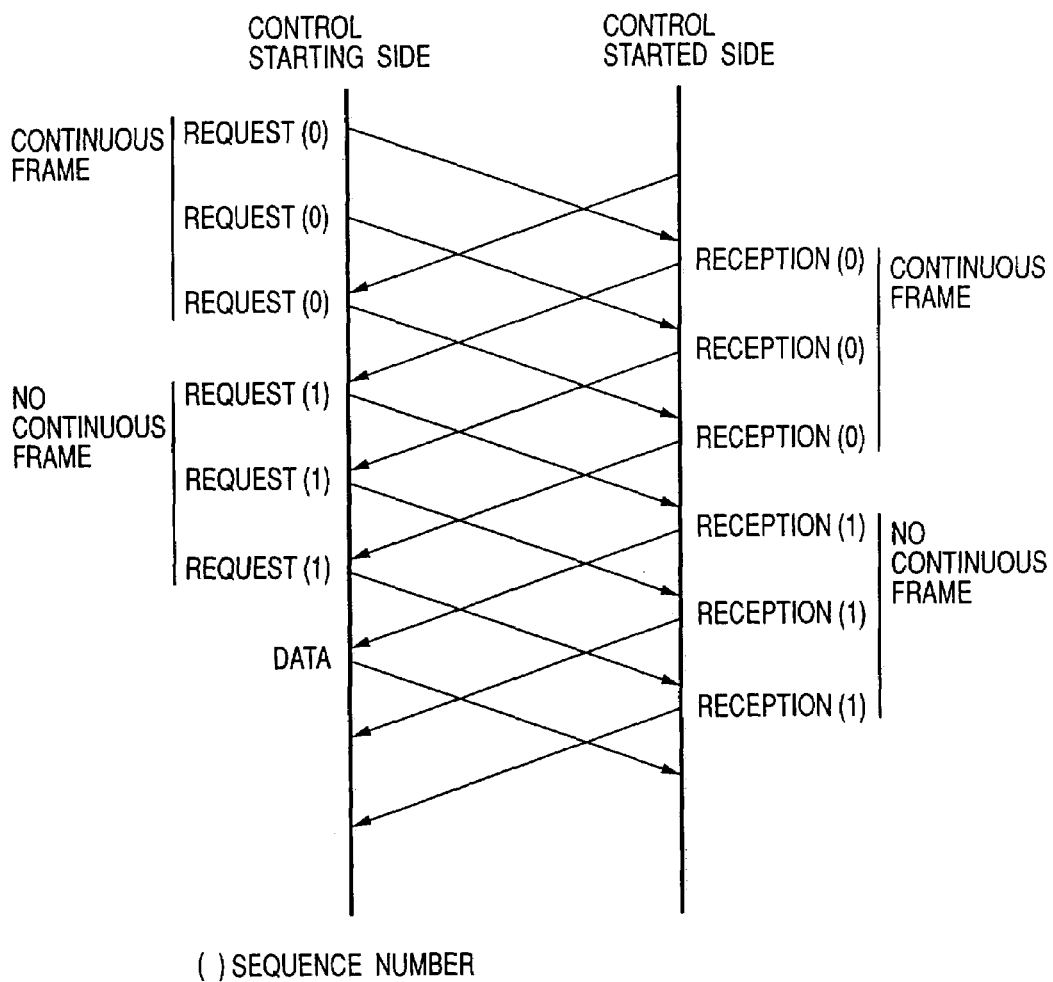
FIG. 34 is a view for explaining the control information transfer (continuous frame being existing and request being processed individually) in the control frame sequence.

In the second case, as shown in FIG. 34, the control started side independently processes each "request". When the control continues (continuous frame existing), if the control starting side receives "refuse" from the control started side, it ends the control. The control started side collectively performs the processes to "notification" (continuous frame existing) and sends the response "continuous frame transmittable" to "notification" (continuous frame existing).

To "reception", the contents of the significant information of "request" are copied and returned. However, it is possible that the response is sent to "reception" even if the partial parameter is not permitted. Such a fact is shown as the reception result at the final octet of "reception".

Figure 35:
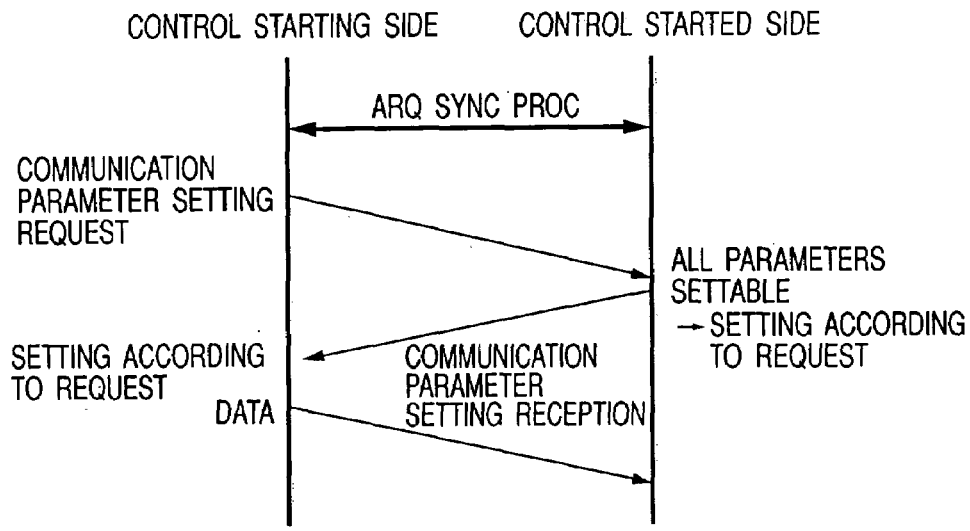
FIG. 35 is a view for explaining communication parameter setting success in the control frame sequence.

For example, FIG. 35 shows "version information" set by the communication parameters. This information can be negotiated. If the requested side (i.e., control started side) can not provide the protocol of the requested version, it returns the providable version to the requesting side (i.e., control starting side). If the communication is possible with the changed version, the requesting side (control starting side) continues the communication as it is. On the other hand, if the communication is impossible (i.e., requesting side having no protocol of changed version), the data link is released. If the requested side (control started side) can not permit the negotiation-impossible parameter, such the side sends "refusal". In this "refusal", all the fields of the corresponding parameter are set with "1" to clearly indicate the refused requested parameter.

The final octets in "request", "notification", "response" and "continuous frame transmittable" are all assumed as "1".

The confirmation frame waiting timer is 10 seconds equally for the request and notification frames. In case of time-out of this timer, the data link is released. If the ARQ re-sync process is started during the control frame transfer, this timer is reset (i.e., once stopped and the started again).

Hereafter, if the control information contents in the control frame are added and thus the control information impossible to be recognized by the own station is received, the contents of this control information are not considered as the significant information and thus discarded. However, even if all the significant information are settable, the result of the reception is made partially settable. This process is the same as that for "REQUEST" (continuous frame existing). At the time when the control started side discriminates that there is no significant information in the continuous frame, it executes the process to the request.

(4-2) Communication Parameter Negotiation

In order to set the communication parameter usable on both the control starting side and the control started side, the parameter in "communication parameter setting" or "ARQ parameter setting" is transferred by the control frame, and subjected to end-to-end negotiation. If the negotiation fails, the data link is released because the connection is impossible. In the communication parameter setting, the negotiation possible parameters are "ARQ data transfer protocol version", "ARQ control information transfer protocol version", "measured RTF value", "data compression system identifier", "total number of codes (P1)", "maximum character string length (P2)", "frame length" and "maximum frame number". On the other hand, in the ARQ parameter setting, the negotiation possible parameter is "measured RTF value".

Figure 36:
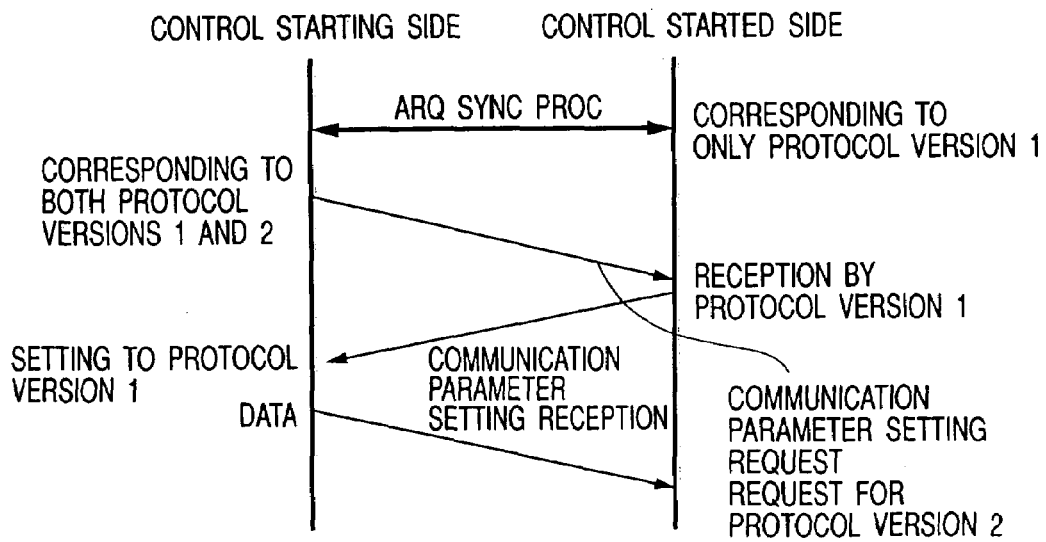
FIG. 36 is a view for explaining the communication parameter setting success (low-level protocol setting in negotiation) in the control frame sequence.

FIG. 36 shows an example of the sequence succeed in the communication parameter setting without changing the parameter.

If the negotiation competition occurs, the control starting side previously stores the parameters request by itself. After then, at the time when the communication parameter is received from the partner, the received parameter and the parameter sent to the partner by itself are compared with each other according to the negotiation rule, so as to select (or set) the low-level parameter. In FIG. 36, the parameter of which level (protocol version 1) is lower than the requested level (protocol version 2) is set as a result of the negotiation, and the communication parameter setting ends.

(5) Data Frame Retransmission Control System (5-1) Process at Data Transmission Side (FFI Determination Process)

For the error control in the data frame, an SR (selective repeat type) ARQ for retransmitting only the error frame is used. The flow control is absorbed by the ARQ data frame process unit.

If the continuous frame error is detected equal to or larger than the defined times, the ARQ re-sync process starts. Further, in order to effectively realize transmission number feedback type SR ARQ in the limited buffer, the last one byte of "user data area" in the data frame is used to manage the modulo. "FFI" represents frame numbers "1 to M", and "FBI" represents request frame numbers "1 to M".

(5-2) Process at Data Transmission Side

The increment is started from the currently requested frame (represented by "FBI") and repeated maximumly up to the outstanding frame. However, if there is the data of M (maximum frame number) frames to be transmitted does not exist, only the frames in which the data exist are transmitted.

During the above repetition, the frame requested by "FBI" is transmitted. However, "FBI" in "RTF" is ignored. The RTF value is measured at the same time when the ARQ frame sync is established.

If there is no data to be sent, the frame in which "FFI=0" and "data length=0" is sent.

The outstanding frame is the frame which can be transmitted without waiting the transmission confirmation from the reception side, and the upper limit of this frame is called as the maximum outstanding frame. It is satisfied the relation that "the number of maximum outstanding frames (M)"="the number of modulo−1".

(5-3) Process at Data Reception Side (FBI Determination Process)

The error frame in "FCS" is discarded.

The oldest not-received frame number is written into the feedback information (FBI) as the request frame.

If there is the flow control request due to the DTE reception process delay, update of the request frame number is not performed. The contents of "FBI" are not changed until a buffer-full state is released, whereby the advance of the ARQ protocol is suppressed.

Among the reception data frames, the frame of "FFI =0" and the frame discriminated as the same frame by the reception comparison are discarded without "FBI".

Figure 37:
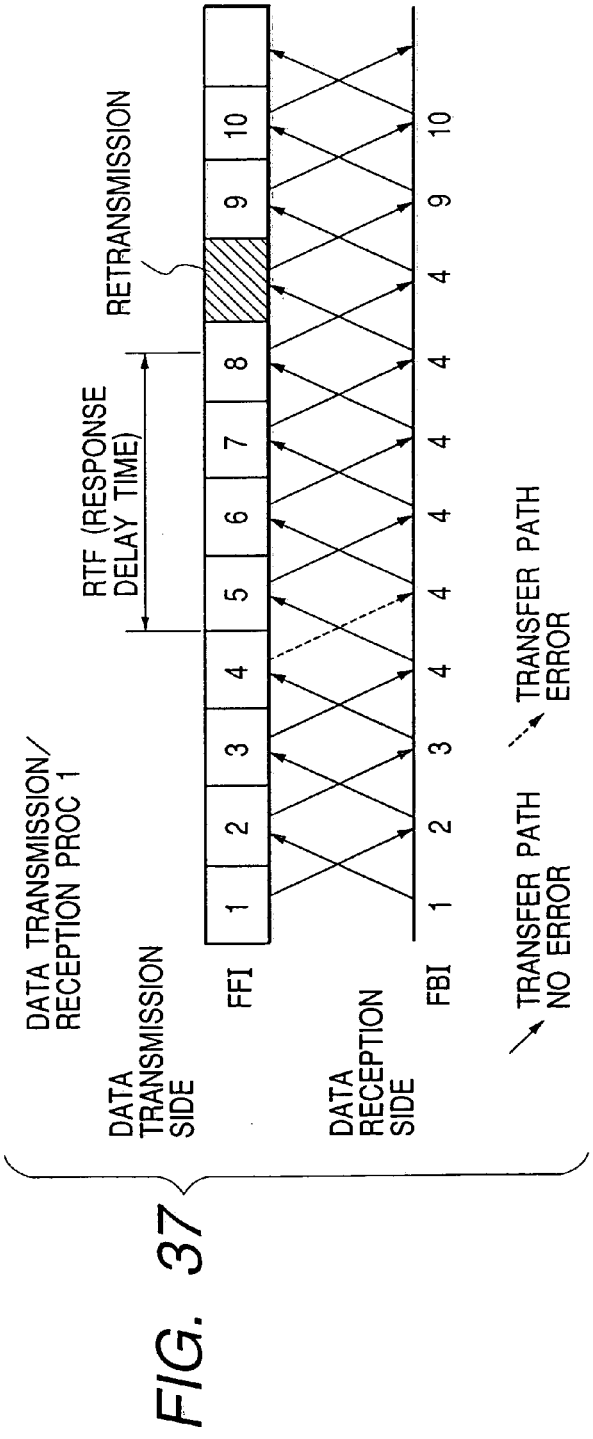
FIG. 37 is a view for explaining data frame sequence (retransfer of only error frame) in the ARQ transfer control procedure.

FIG. 37 shows an example of the case where only the error frame is sent again.

As shown in FIG. 37, if the frame of which number is "FFI=4" at the data transmission side is not transferred due to a transfer path error, the data reception side continues to send the frame of which request frame number is "FBI=4" until the frame of which frame number is "FFI=4" is received. After "RTF" (response delay time) elapses, the frame of which frame number is "FFI=4" is transmitted again.

Figure 38:
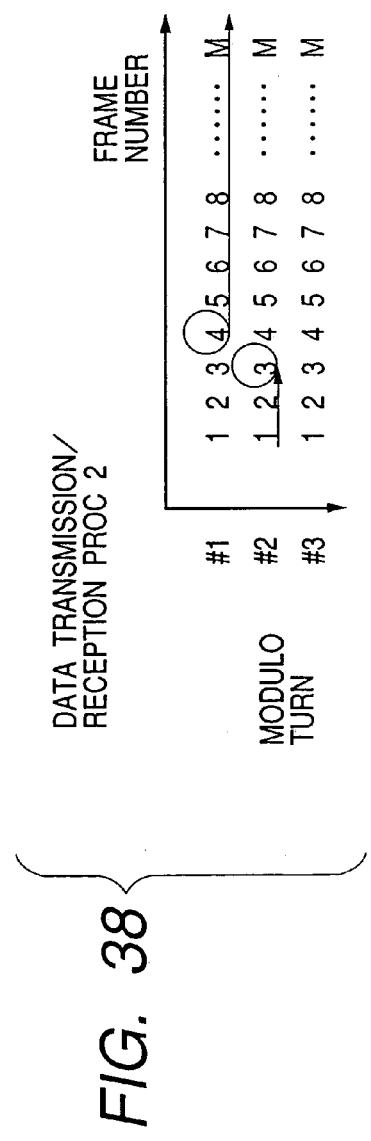
FIG. 38 is a view for explaining the data frame sequence (repetitive retransfer until maximum outstanding frame) in the ARQ transfer control procedure.

FIG. 38 shows an example of the case where the frame sending is repeated up to the maximum outstanding frame. In this example, the frame is represented by "frame (#modulo number, frame number).

If the frame (#1, 4) is the oldest frame of which transmission confirmation is not yet given, the transmission side sequentially sends the frames (#1, 5), (#1, 6), . . . , (#1, M), (#2, 1), (#2, 3), . . . . Then after the frame reaches the maximum outstanding frame, the frame returns to the unconfirmed frame (#1, 4), and the SR ARQ is repeated again.

(5-4) Data Comparison Process

In order to be able to adopt the transmission number feedback type SR ARQ in limited outstanding frame rate, the following process is performed at data construction time and data reception time on the data transmission side.

<Data Construction Time>

Figure 39:
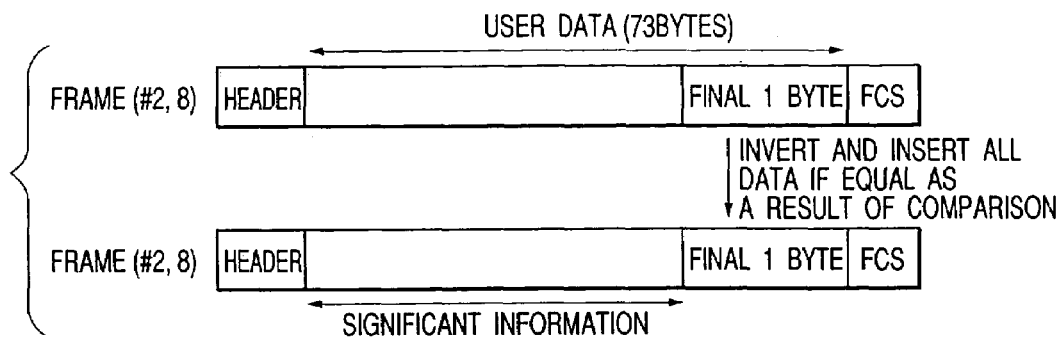
FIG. 39 is a view for explaining user data structure (in case of significant information final one byte is equal) in the data frame sequence.

In a case where the significant information of 73 bytes or more exist, if final one byte of the data area in the currently constructed data frame (also referred simply as data area hereinafter) is identical with one byte of the data area prior to 1 mod, such one byte is sent in the next frame. Instead, as shown in FIG. 39, the eight-bit array of one byte obtained by all inverting one byte in the data area prior to 1 mod is inserted. Therefore, the significant information in this case has 72 bytes.

Figure 40:
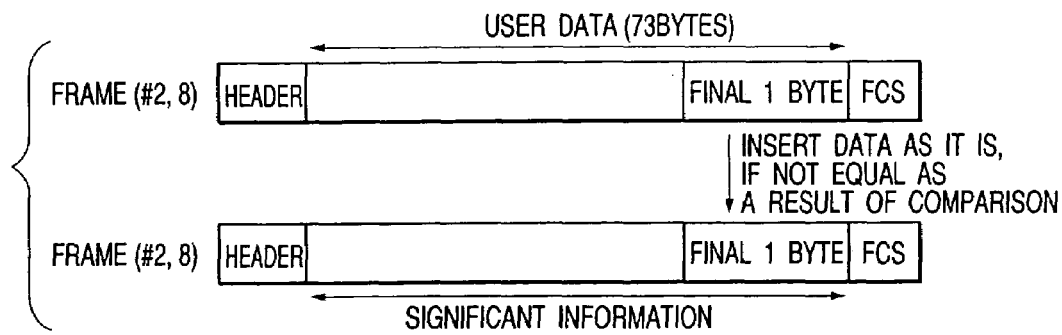
FIG. 40 is a view for explaining the user data structure (in case of significant information final one byte is not equal) in the data frame sequence.

Further, if final one byte of the data area in the currently constructed data frame is different from one byte of the data area prior to 1 mod, as shown in FIG. 40, the data is constructed as it is. Therefore, the significant information has 73 bytes.

Figure 41:
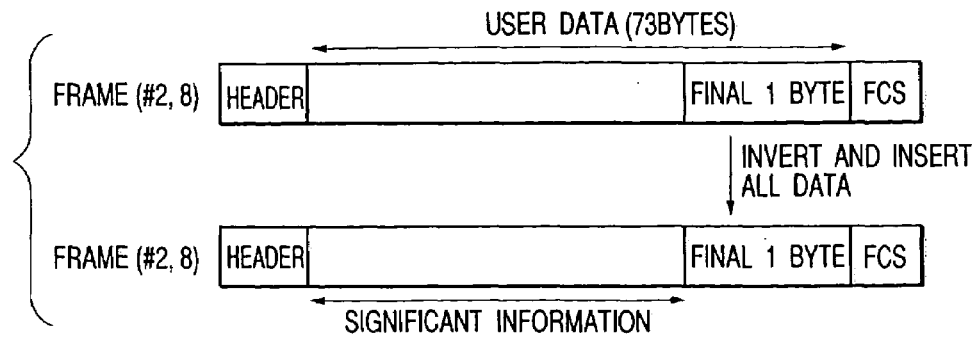
FIG. 41 is a view for explaining the user data structure (in case of significant information <73 bytes) in the data frame sequence.

On the other hand, if the data amount of the significant information is smaller than 73 bytes, as shown in FIG. 41, the eight-bit array of one byte obtained by all inverting one byte in the data area prior to 1 mod is inserted.

<Data Reception Time>

The final one byte of the data area currently in the reception operation is compared (i.e., monitored) with the final one byte of the data area in the reception frame buffer of the same number. As a result, if the final one byte is identical between both the data areas, user data in the reception frame is discarded.

(6) Data Decomposition and Composition

At the data transmission side, if the data given from the high-level module is larger than one ARQ frame or if there are some reasons, one data can be decomposed into the plural ARQ frames. The decomposition information at this time is represented by "continuous frame discrimination bit" and notified to the data reception side. Further, when one data is decomposed into the plural data, the finally decomposed data frame is set as "one or final frame", and the data frames prior to that frame are set as "intermediate-state frames". When "continuous" attribute is formally given from the high-level module, these data frames are sent as "intermediate-state frames".

Basically, the data reception side composes the data until the frame "one or final frame" is received, and gives the composed data to the high-level module. However, if the "continuous" attribute can be formally given to the high-level module, the information in the in-composing state can be given with the "continuous" attribute.

(7) Operation of Data Compression/Decomposition Unit

Data compression and decompression (or expansion) are performed according to ITU-T Recommendation V42.bis.

The 1394 serial bus and the PIAFS protocol used in the system 100 shown in FIG. 1 have been explained.

Subsequently, the system 100 will be concretely explained.

In the system 100, various data such as video data, voice data and the like are transmitted and received. However, to simplify the explanation, the operation of the system 100 in case of transmitting and receiving the video (or image data) will be concretely explained hereinafter.

Figure 42A:
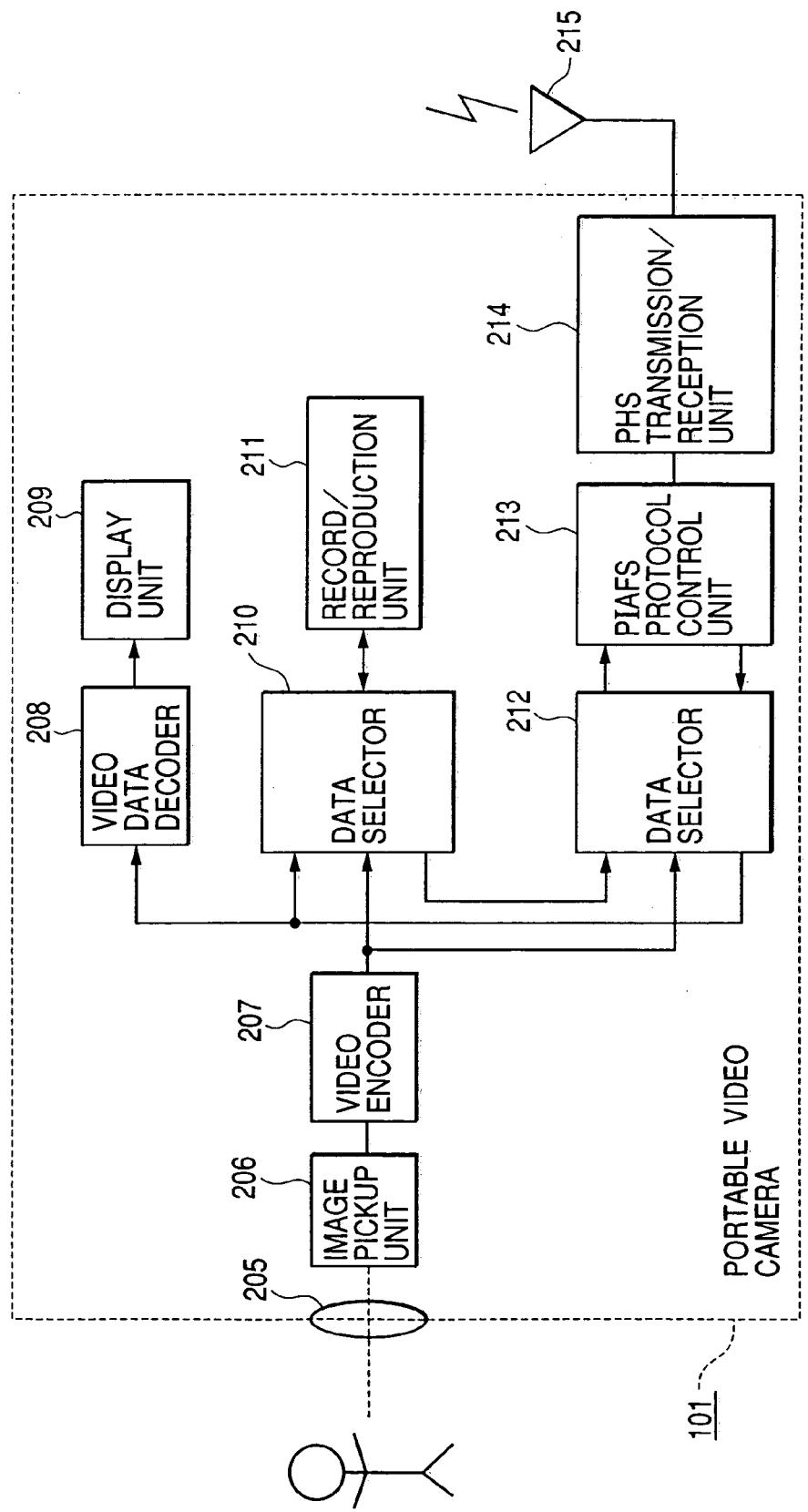

FIGS. 42A and 42B show the internal structures of the portable video camera 101, the home station 102, the living room TV monitor 103 and the VTR 104 included in the system 100.

The portable video camera 101 contains an image pickup unit 206 which takes an image of a subject through a lens 205 and generates an image signal (or video signal) of the subject, a video encoder 207 which encodes the video signal from the image pickup unit 206 to generate the encoded video data, a record/reproduction unit 211 which performs record and reproduction processes of the encoded video data, a video data decoder 208 which decodes the encoded video data to obtain the prior (i.e., not-encoded or before-encoding) video signal, a display unit 209 which displays the video signal from the unit 208 on a screen, a PIAFS protocol control unit 213 which performs a predetermined process for transmitting and receiving various data according to the PIAFS protocol, and a PHS transmission/reception unit 214 which transmits and receives the various data through an antenna 215 under the control of the PIAFS protocol control unit 213.

Further, the portable video camera 101 contains two data selectors 210 and 212.

The data selector 210 selects one of the outputs from the video encoder 207 and the PIAFS protocol control unit 213 and outputs the selected data to the record/reproduction unit 211. Further, the output (e.g., encoded video data obtained in reproduction process) from the unit 211 is supplied to the data selector 212.

The data selector 212 selects one of the output from the video encoder 207 and the output (e.g., encoded video data obtained in reproduction process) from the record/reproduction unit 211 and outputs the selected data to the PIAFS protocol control unit 213. Further, the output from the unit 213 is supplied to each of the data selector 210 and the video data decoder 208. Further, the output from the video encoder 207 is output to the decoder 208.

Such switching (i.e., selecting) operations by the data selectors 210 and 212 are controlled by a not-shown control unit.

The home station 102 contains a PHS transmission/reception unit 217 which performs transmission and reception of various data through an antenna 216, a PIAFS protocol control unit 218 which performs a predetermined process for transmission and reception of the various data according to the PIAFS protocol, a video decoder 222 which decodes the encoded video data received by the PHS transmission/reception unit 217 under the control of the control unit 218 to obtain the prior (i.e., not-encoded or before-encoding) video signal, a video encoder 223 which encodes the video signal from the decoder 222 to generate the encoded video data, a 1394 interface (I/F) unit 225 which is the interface for a 1394 serial bus (home bus) 240, a video decoder 221 which decodes the encoded video data from the unit 225 to obtain the prior (i.e., not-encoded or before-encoding) video signal, and a video encoder 220 which encodes the video signal from the decoder 221 to generate the encoded video data.

Further, the home station 102 contains two data selectors 219 and 224.

The data selector 219 selects one of the output from the PIAFS protocol control unit 218 to the video decoder 222 and the output from the video encoder 220 to the PIAFS protocol control unit 218.

On the other hand, the data selector 224 selects one of the output from the video encoder 223 to the 1394 I/F unit 225 and the output from the 1394 I/F unit 225 to the video decoder 221.

Such switching (i.e., selecting) operations by the data selectors 219 and 224 are controlled by a not-shown control unit.

The living room TV monitor 103 contains a 1394 I/F unit 226 which is the interface for the 1394 serial bus 240, a video decoder 229 which decodes the encoded video data from the unit 226 to obtain the prior (i.e., not-encoded or before-encoding) video signal, a display unit 230 which displays the video signal from the unit 229 on a screen, a TV controller 228 which controls the display unit 230 according to the control signal from the 1394 I/F unit 226, and a data selector 227.

The data selector 227 selects one of the output from the 1394 I/F unit 226 to the TV controller 228, the video decoder 229 and the 1394 I/F unit 226. Such a switching (i.e., selecting) operation by the data selector 227 is controlled by a not-shown control unit.

Initially, the operation of the system 100 to be performed in a case where the video (video signal or image data) obtained by the portable video camera 101 is transferred to the living room TV monitor 103 and the VTR 104 through the home station 102 will be explained hereinafter.

In the portable video camera 101, the video signal of the subject taken by the image pickup unit 206 through the lens 205 is supplied to the video encoder 207.

The video encoder 207 encodes the supplied video signal in an encoding system (e.g., H.263 system) optimum for transfer in accordance with the PIAFS protocol, to generate first encoded video data.

The first encoded video data generated by the encoder 207 is supplied to the data selector 212 and also supplied to the data selector 210.

According to the control of the control unit, the data selector 212 supplies the first encoded video data from the encoder 207 to the PIAFS protocol control unit 213, and also supplies to, e.g., the video data decoder 208.

Similarly, according to the control of the control unit, the data selector 210 supplies the first encoded video data from the encoder 207 to the record/reproduction unit 211.

The PIAFS protocol control unit 213 generates the data frame shown in FIG. 23, from the first encoded video data supplied through the data selector 212. At this time, the first encoded video data is divided according to the data structure shown in FIG. 23, and the divided data is stored in (or mounted on) the data area of each data frame. Also, predetermined information is stored in each area of the data frame.

The PIAFS protocol control unit 213 supplies thus obtained data frame to the PHS transmission/reception unit 214 according to the PIAFS protocol.

The PHS transmission/reception unit 214 spatially sends the data frame from the unit 213.

At the same time, the video data decoder 208 decodes the first encoded video data supplied through the data selector 212 to restore it to the video data before the encoding, and then supplies the restored video signal to the display unit 209. The unit 209 displays the video signal from the unit 208 on the screen.

The record/reproduction unit 211 records the first encoded video data supplied through the data selector 210, into a recording medium such as a magnetic tape, a solid magnetic disk (or hard disk), a magnetooptical disk, a solid memory or the like.

As above, the data frame (first encoded video data) spatially sent from the portable video camera 101 is received by the antenna 216 of the home station 102.

In the home station 102, the data frame sent from the portable video camera 101 (i.e., data frame in which first encoded video data has been stored) is received by the PHS transmission/reception unit 217 through the antenna 216, and then supplied to the PIAFS protocol control unit 218.

The PIAFS protocol control unit 218 extracts only the first encoded video data stored in the data frame received by the unit 217.

The data selector 219 supplies the first encoded video data obtained by the PIAFS protocol control unit 218 to the video decoder 222, according to the control of the control unit.

The video decoder 222 decodes the first encoded video data supplied through the data selector 219 to restore it to the original video signal, and then supplies the restored signal to the video encoder 223.

The video encoder 223 encodes the video signal from the decoder 222 in an encoding system (e.g., MPEG1 system) optimum for transmission of the 1394 serial bus 240 and capable of performing data decoding in the living room TV monitor 103 or the VTR 104, to generate second encoded video data.

In the present embodiment, the first encoded video data is once decoded by the video decoder 222 and then the decoded data is again encoded by the video encoder 223 as explained above. However, the first encoded video data may not be completely decoded. Namely, it is possible to decode only a part of the first encoded video data and then encode again such the decoded part.

The data selector 224 supplies the second encoded video data obtained by the video encoder 223 to the 1394 I/F unit 225 in accordance with the control of the control unit.

The 1394 I/F unit 225 generates the data packet shown in FIG. 14, from the second encoded video data supplied through the data selector 224. At this time, the second encoded video data is divided according to the data packet structure shown in FIG. 14, and the divided data is stored in (or mounted on) the data field area of each data packet. Also, predetermined information is stored in each area of the data packet. For example, a node ID of the transmission destination is determined, and the determined ID is stored in the object node ID area.

The 1394 I/F unit 225 sends thus generated data packet to the living room TV monitor 103 or the VTR 104 through the 1394 serial bus 240.

At this time, it is possible to cause the 1394 I/F unit 225 not to generate the data packet shown in FIG. 14 but to generate the isochronous data packet shown in FIG. 16 and send the generated data packet by the isochronous transfer through the 1394 serial bus 240.

In the living room TV monitor 103, the data packet (i.e., second encoded video data) sent from the home station 102 through the 1394 serial bus 240 is received by the 1394 I/F unit 226.

The 1394 I/F unit 226 extracts the second encoded video data stored in the received data packet.

The data selector 227 supplies the second encoded video data obtained by the 1394 I/F unit 226 to the video decoder 229, in accordance with the control by the control unit.

The video decoder 229 decodes the second encoded video data supplied through the data selector 227 to restore it to the original video signal, and then supplies the restored video signal to the display unit 230.

The display unit 230 displays on its screen the video signal from the video decoder 229 in accordance with the control by the TV controller 228.

In the VTR 104, the data packet (i.e., second encoded video data) sent from the home station 102 through the 1394 serial bus 240 is received by the 1394 I/F unit 231.

The 1394 I/F unit 231 extracts the second encoded video data stored in the received data packet.

The data selector 232 supplies the second encoded video data obtained by the 1394 I/F unit 231 to the record/reproduction unit 234.

The record/reproduction unit 234 records the second encoded video data supplied through the data selector 232, into a recording medium such as a magnetic tape, a solid magnetic disk (or hard disk), a magnetooptical disk, a solid memory or the like, in accordance with the control by a VTR controller 233.

Subsequently, the operation of the system 100 to be performed in a case where the video obtained by the reproduction of the VTR 104 is transferred to the portable video camera 101 through the home station 102 will be explained hereinafter.

In the VTR 104, the record/reproduction unit 234 reproduces the video data (i.e., reproduction encoded video data called as first dash encoded video data hereinafter) stored in the above recording medium, according to the control by the VTR controller 233.

The data selector 232 supplies the first dash encoded video data obtained by the record/reproduction unit 234 to the 1394 I/F unit 231, according to the control by the control unit.

The 1394 I/F unit 231 generates the data packet shown in FIG. 14, from the first dash encoded video data supplied through the data selector 232. At this time, the first dash encoded video data is divided according to the data packet structure shown in FIG. 14, and the divided data is stored in (or mounted on) the data field area of each data packet. Also, predetermined information is stored in each area of the data packet. For example, the node ID of the transmission destination is determined, and the determined ID is stored in the object node ID area.

Then the 1394 I/F unit 231 sends the data packet thus generated to the home station 102 through the 1394 serial bus 240.

At this time, it is possible to cause the 1394 I/F unit 231 not to generate the data packet shown in FIG. 14 but to generate the isochronous data packet shown in FIG. 16 and send it by the isochronous transfer through the 1394 serial bus 240.

In the home station 102, the data packet sent from the VTR 104 (i.e., data packet in which first dash encoded video data has been stored) is received by the 1394 I/F unit 225.

The 1394 I/F unit 225 extracts the first dash encoded video data stored in the received data packet.

The data selector 224 supplies the first dash encoded video data obtained by the 1394 I/F unit 225 to the video decoder 221, according to the control by the control unit.

The video decoder 221 decodes the first dash encoded video data supplied through the data selector 224 to restore it to the original video signal, and then supplies the restored video signal to the video encoder 220.

The video encoder 220 encodes the video signal from the video decoder 221 in an encoding system (e.g., H.263 system) optimum for the transfer in accordance with the PIAFS protocol, thereby generating second dash encoded video data.

The data selector 219 supplies the second dash encoded video data obtained by the video encoder 220 to the PIAFS protocol control unit 218, according to the control by the control unit.

The PIAFS protocol control unit 218 generates the data frame generates the data frame shown in FIG. 23, from the second dash encoded video data supplied through the data selector 212. At this time, the second dash encoded video data is divided according to the data frame structure shown in FIG. 23, and the divided data is stored in (or mounted on) the data area of each data frame. Also, predetermined information is stored in each area of the data frame.

Then the PIAFS protocol control unit 218 supplies the data frame thus generated to the PHS transmission/reception unit 217 according to the above PIAFS protocol.

The PHS transmission/reception unit 217 spatially sends the data frame from the PIAFS protocol control unit 218, through the antenna 216.

In the above manner, the data frame (i.e., second dash encoded video data) spatially sent from the home station 102 is received by the antenna 215 of the portable video camera 101.

In the portable video camera 101, the data frame (i.e., data frame in which second dash encoded video data has been stored) sent from the home station 102 is received by the PHS transmission/reception unit 214 through the antenna 215, and supplied to the PIAFS protocol control unit 213.

The PIAFS protocol control unit 213 extracts only the second dash encoded video data stored in the data frame received by the PHS transmission/reception unit 214.

The data selector 212 supplies the second dash encoded video data obtained by the PIAFS protocol control unit 213 to the data selector 210 and also to the video data decoder 208, according to the control by the control unit.

The video data decoder 208 decodes the second dash encoded video data supplied through the data selector 212 to restore it to the prior (i.e., non-encoded or before-encoding) video signal, and then supplies the restored video signal to the display unit 209. The display unit 209 displays on its screen the video signal from the video data decoder 208.

The data selector 210 supplies the second dash encoded video data from the data selector 212 to the record/reproduction unit 211, according to the control by the control unit. The record/reproduction unit 211 records the second dash encoded video data supplied through the data selector 210, into a recording medium such as a magnetic tape, a solid magnetic disk (or hard disk), a magnetooptical disk, a solid memory or the like.

As above, according to the present embodiment, in the home station 102, the data (i.e., data frame shown in FIG. 23 including first encoded video data) wirelessly sent from the portable video camera 101 according to the PIAFS protocol is subjected to the format conversion to obtain the data (i.e., data packet shown in FIG. 14 including second encoded video data) adaptive to the 1394 serial bus 240. Further, the data (data packet shown in FIG. 14 including first dash encoded video data) sent through the VTR 104 through the 1394 serial bus 240 is subjected to the format conversion to obtain the data (data frame shown in FIG. 23 including second dash encoded video data) adaptive to the PIAFS protocol.

By such the structure, the video obtained out of door by the portable video camera 101 can be displayed on the screen of the living room TV monitor 103 connected to the indoor 1394 serial bus 240 (home bus). On the other hand, the video reproduced by the VTR 104 connected to the indoor 1394 serial bus 240 (home bus) can be displayed on the screen of the outdoor portable video camera 101.

That is, even the data transferred according to the PIAFS protocol different from the protocol of the 1394 serial bus 240 can be easily transferred to the living room TV monitor 103 or the VTR 104 through the 1394 serial bus 240. On the other hand, even the data transferred according to the protocol of the 1394 serial bus 240 different from the PIAFS protocol can be easily transferred to the portable video camera 101 according to the PIAFS protocol.

Second Embodiment

The present invention can be applied to, e.g., a network system 300 shown in FIG. 43.

The network system 300 has substantially the same structure as that of the network system shown in FIG. 1. However, instead of the portable video camera 101 in the system 100, a portable telephone (or cellular phone) 301 is used in the system 300. Further, a speaker 103a is provided on a living room TV monitor 103.

Figure 44A:
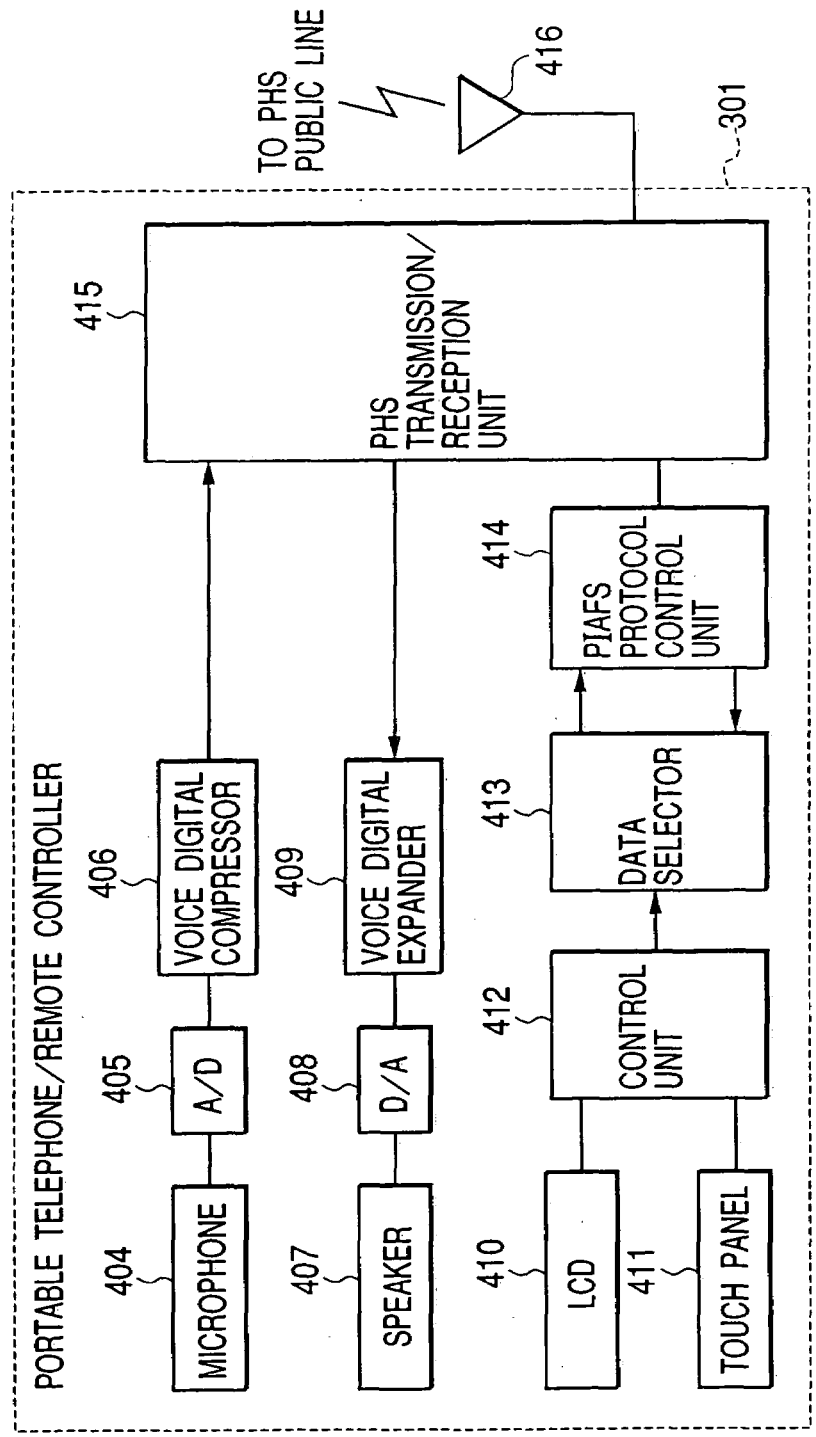
FIGS. 44A, 44B and 44C are block diagrams showing internal structure of the system.
Figure 44B:
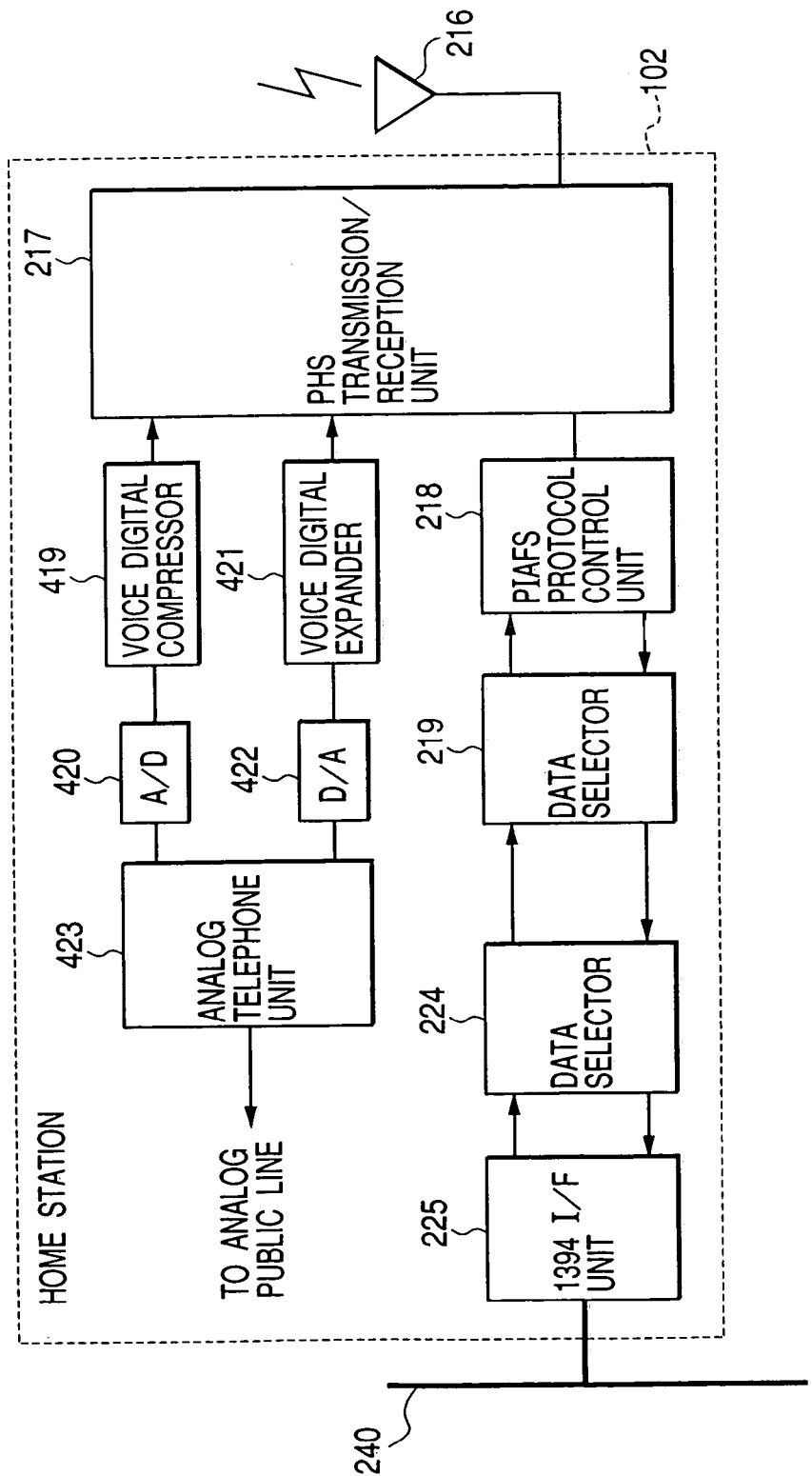
Figure 44C:
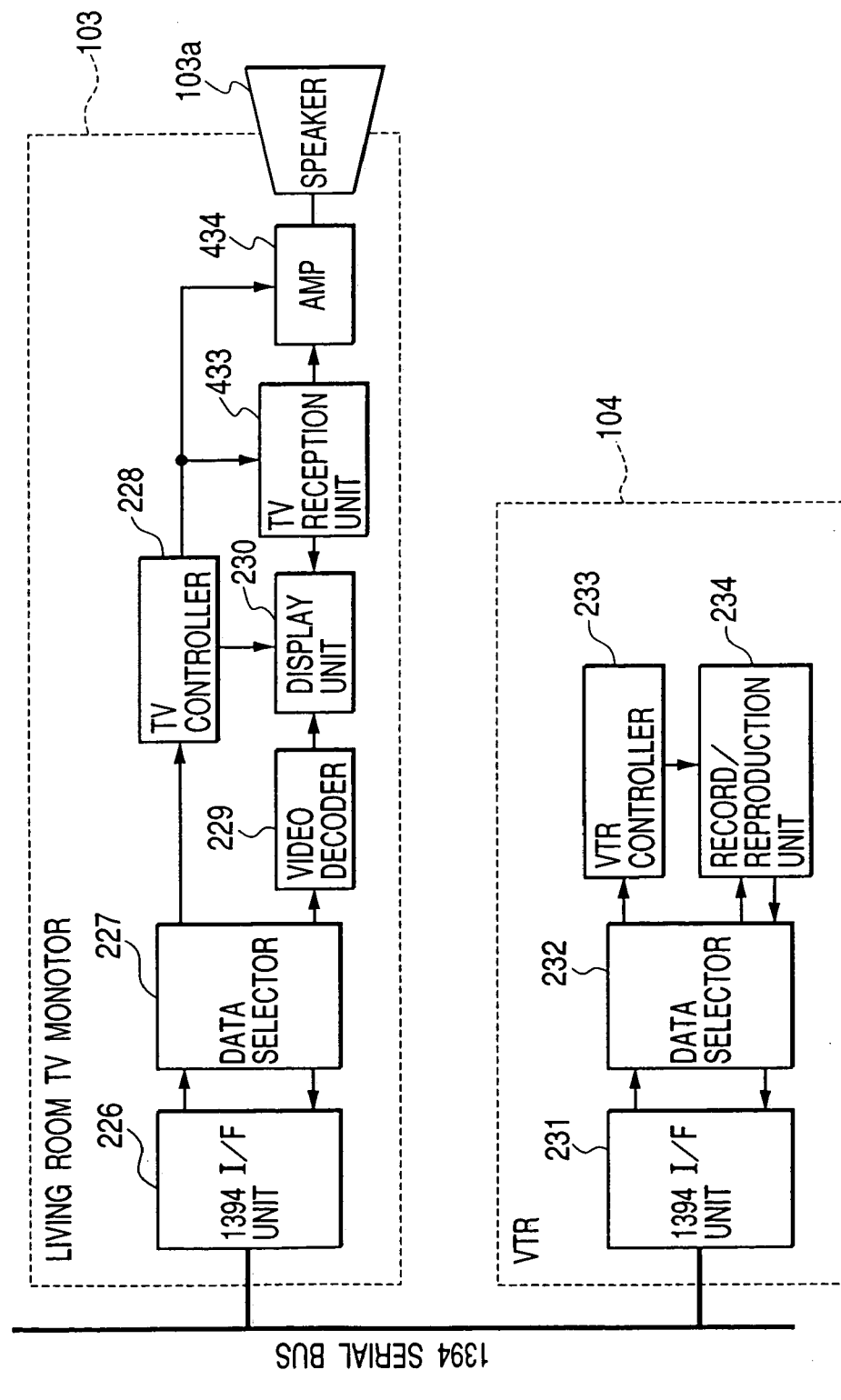

FIGS. 44A to 44C show internal structures of the portable telephone 301, a home station 102, a living room TV monitor 103 and VTR 104 which are included in the network system 300.

It should be noted that, in the system 300 shown in FIGS. 43, 44A to 44C, the same parts as those in FIGS. 1, 42A and 42B are added with same reference numerals respectively, and the detailed explanations thereof are omitted. Instead, only the different structures and parts will be concretely explained hereinafter.

The portable telephone 301 includes an analog-to-digital (A/D) converter 405 which digitizes voice or audio input from a microphone 404, a voice encoder (or voice digital compressor) 406 which encode voice data from the A/D converter 405 to generate the encoded voice data, a voice decoder (or voice digital expander) 409 which decodes the encoded voice data to obtain the prior (i.e., non-encoded or before-encoding) voice data, a digital-to-analog (D/A) converter 408 which analogizes (i.e., making analogue) the voice data from the voice decoder and outputs the analog data as the voice from a speaker 407, a PIAFS protocol control unit 414 which performs predetermined processes to transmit and receive various data according to the PIAFS protocol, and PHS transmission/reception unit 415 which performs the transmission and reception of the various data through an antenna 416 according to the PIAFS protocol control unit 414.

Further, the portable telephone 301 includes a later-described liquid crystal display (LCD) 410, a touch panel 411, a control unit 412 which controls them, and a data selector 413.

The data selector 413 selects one of the output from the PIAFS protocol control unit 414 to the control unit 412 and the output from the control unit 412 to the PIAFS protocol control unit 414. Such a switching (i.e., selecting) operation by the data selector 413 is controlled by a not-shown control unit.

Figure 45C:
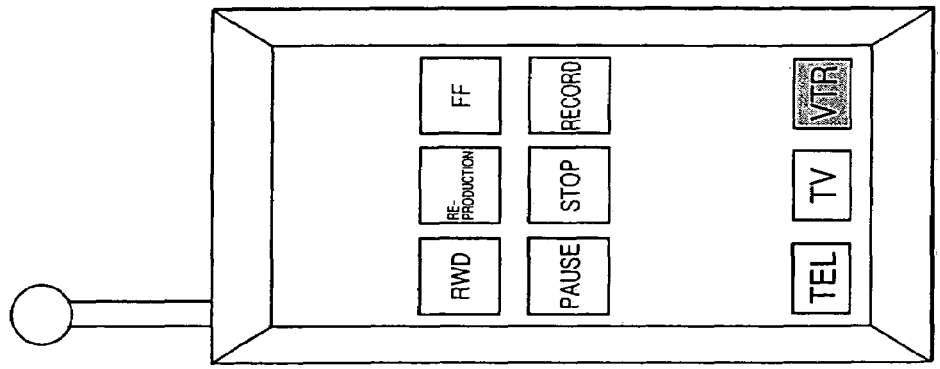
FIGS. 45A, 45B and 45C are views for explaining an operation mode of a portable telephone in the system.
Figure 45B:
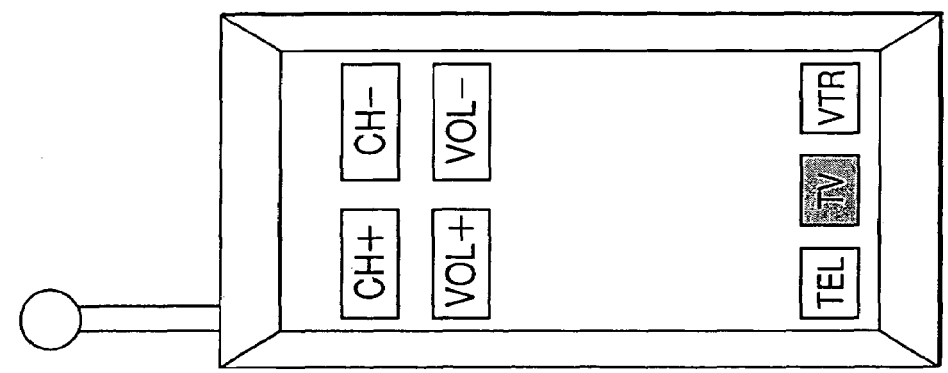
Figure 45A:
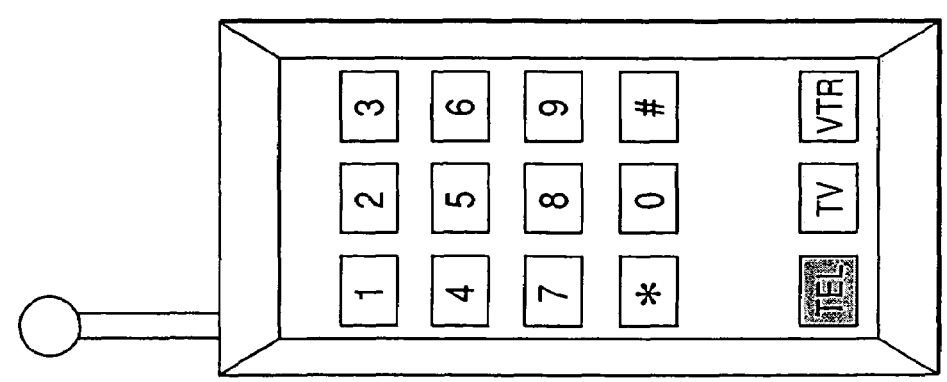

Each of FIGS. 45A, 45B and 45C shows the outline of the portable telephone 301.

The portable telephone 301 has a telephone mode of which display is shown in FIG. 45A, a TV remote controller mode of which display is shown in FIG. 45B, and a VTR remote controller mode of which display is shown in FIG. 45C. Such the display is performed by the LCD 410.

The touch panel 411 is provided on the screen of the LCD 410. Thus, if a user touches one of "TEL", "TV" and "VTR" buttons common to all the modes, one of the telephone mode, the TV remote controller mode and the VTR remote controller mode is selected, and the displayed contents are changed accordingly.

After the mode is selected, if later-described various touch buttons on LCD 410 displayed in correspondence with the currently selected operation mode are touched or depressed by the user, the operation control corresponding to the touched button is performed.

The telephone mode includes a PHS public mode and a PHS extension mode, and these modes are used when the portable telephone 301 is used as the ordinary telephone. It is possible in the PHS public mode to directly connect an external PHS public line, and it is possible in the PHS extension mode to a public line of a later-described analog telephone through the home station 102.

As shown in FIG. 45A, the display screen in the telephone mode is composed of ten keys "1", "2", . . . , "0" and the like to input a partner's telephone number and the like.

The TV remote controller mode is used when the portable telephone 301 is used as the remote controller for the living room TV monitor 103, and the VTR remote controller mode is used when the telephone 301 is used as the remote controller for the VTR 104. In these modes, by the wireless data communication using the PIAFS protocol spread over the PHS public line, the equipment control command data is communicated between the telephone 301 and the home station 102.

At this time, the home station 102 transmits the equipment control command data from the portable telephone 301 to the living room TV monitor 103, the PC 105 or the VTR 104 through a 1394 serial bus 240, thereby controlling operations of these equipments.

As shown in FIG. 45B, the display screen in the TV remote controller mode is composed of "CH+" and "CH−" buttons for switching channels, "VOL+" and "VOL−" buttons for changing volume and the like.

Further, as shown in FIG. 45C, the display screen in the VTR remote controller mode is composed of "RWD", "REPRODUCTION", "FF", "PAUSE", "STOP" and "RECORD" buttons respectively used for video tape rewinding, reproducing, fast forwarding, pausing, stopping and recording.

Instead of the video encoders 220 and 223 and the video decoders 221 and 222 shown in FIGS. 42A and 42B, the home station 102 in the present embodiment includes an analog telephone unit 423 which is connected to the analog line, an A/D converter 420 which digitizes the voice from the unit 423, a voice encoder (voice digital compressor) 419 which encodes the voice data from the A/D converter 420 to generate the encoded voice data, a voice decoder (voice digital expander) 421 which decodes the encoded voice data to obtain the prior (i.e., not-encoded or before-encoding) voice data, and a D/A converter 422 which analogizes the voice data from the decoder 421 and outputs the obtained data to the analog telephone unit 423. The voice encoder 419 and the voice decoder 421 are connected to a PHS transmission/reception unit 217.

Therefore, data selectors 219 and 224 select one of the output from a PIAFS protocol control unit 218 to a 1394 I/F unit 225 and the output from the 1394 I/F unit 225 to the PIAFS protocol control unit 218.

As explained above, the living room TV monitor 103 includes the speaker 103a in addition to the components shown in FIGS. 42A and 42B. Further, the monitor 103 includes an amplifier 434 which is connected to the speaker 103a, and a TV reception unit 344 which is connected to a display unit 230 and the amplifier 434.

A TV controller 228 controls operation of the display unit 230, the TV reception unit 433 and the amplifier 434.

Hereinafter, the operation of the network system 300 will be explained.

For example, if the portable telephone 301 operates in the telephone mode (PHS public line mode), the voice (analog signal) of conversation input by the user to the microphone 404 is converted into the digital voice data by the A/D converter 405, and then subjected to compression encoding by the voice encoder 406. The compressed and encoded voice data (encoded voice data) is supplied to the PHS transmission/reception unit 415.

The PHS transmission/reception unit 415 spatially sends the encoded voice data from the voice encoder 406. Therefore, the encoded voice data emitted from the antenna 416 is output to the PHS public line through an external base station, and supplied to a partner's telephone.

On the other hand, the voice from the partner's telephone is received by the antenna 416 through the PHS public line. The received voice data (digital encoded voice data) is supplied to the voice decoder 409 through the PHS transmission/reception unit 415, and decoded to restore it to the prior (i.e., not-encoded or before-encoding) voice data. The restored voice data is converted into the analog signal by the D/A converter 208, and reproduced as a voice by the speaker 407.

In the above PHS public line mode, the system is directly connected to the PHS public line for communication, while in the PHS extension mode the system 300 is connected to the PHS public line through the home station 216 for communication.

Similarly, in the TV remote controller mode or the VTR remote controller mode, the system communicates with the living room TV monitor 103 or the VTR 104 through the home station 216.

Figure 46:
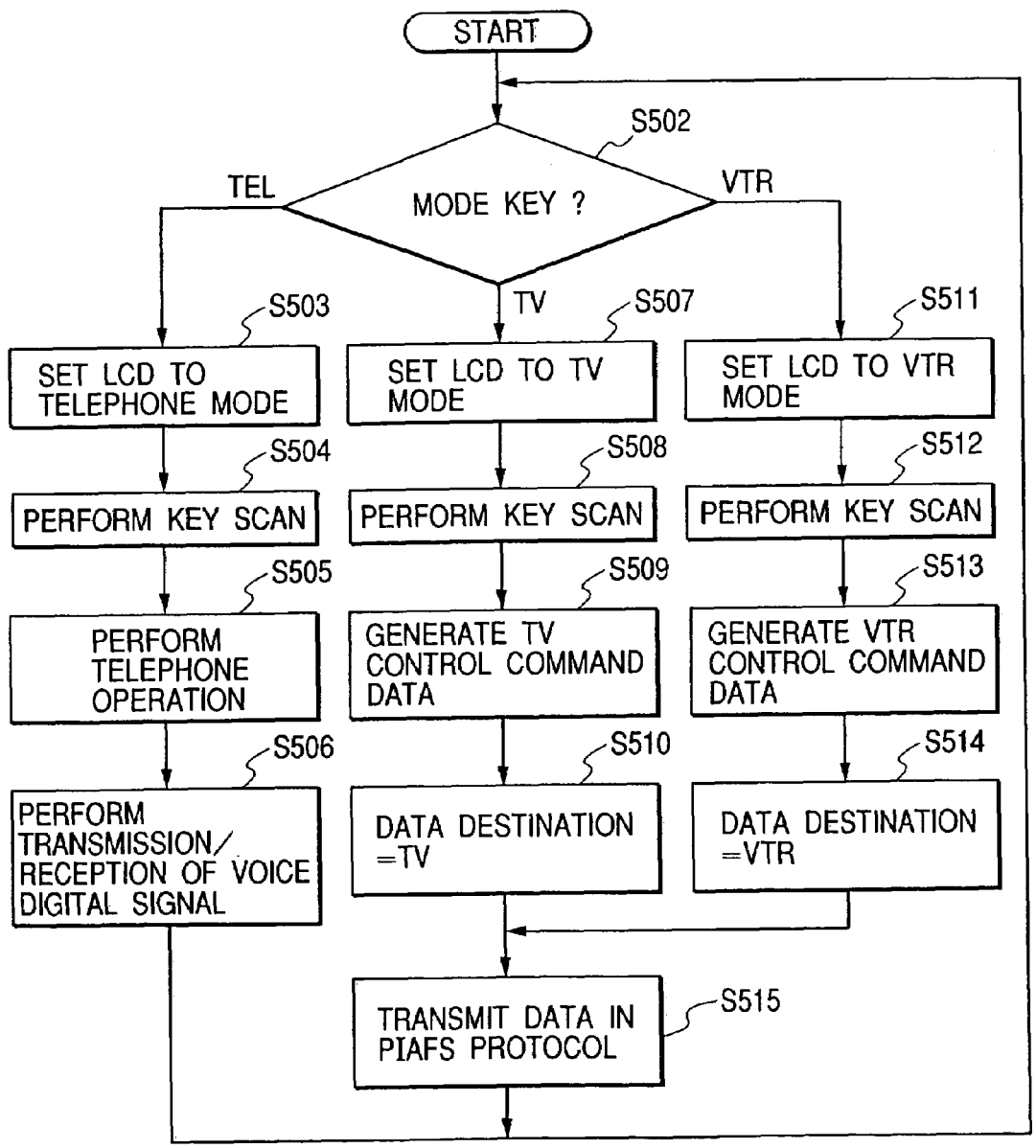
FIG. 46 is a flow chart for explaining an operation of the portable telephone.
Figure 47:
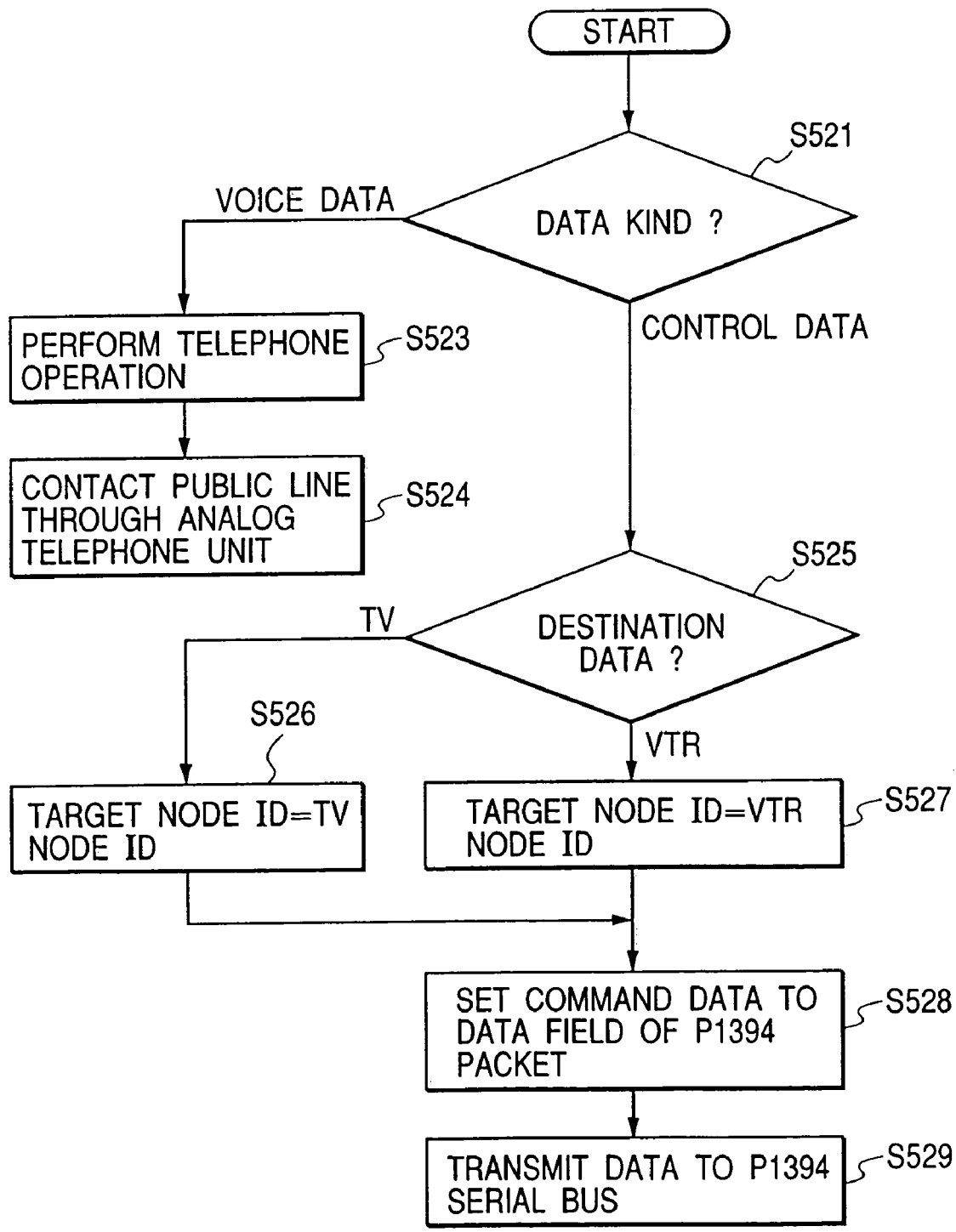
FIG. 47 is a flow chart for explaining an operation of a home station in the system.

Such the communication through the home station 216 is performed according to, e.g., flow charts shown in FIGS. 46 and 47.

In FIG. 46, in the portable telephone 301, the touch panel 411 overlaid on the LCD 401 is connected to the control unit 412.

The control unit 412 detects touching operations of the above "TEL", "TV" and "VTR" buttons to judge which button (or key) is depressed (step S502).

If it is judged in the step S502 that the "TEL" button is depressed or touched, the control unit 412 causes the LCD 410 to display the screen shown in FIG. 45A (step S503).

Then the unit 412 performs key scanning on the screen of FIG. 45A (step S504) to detect the telephone number input operation and the like, and controls the portable telephone 301 to function as the telephone. Thus, the portable telephone 301 is connected to the analog public line through the home station 102 and comes to be in a calling state with the partner side. Like the above PHS public mode, the encoded voice data obtained by the voice encoder 406 is emitted from the antenna 416 through the PHS transmission/reception unit 415. Although later explained in detail, the voice data (i.e., voice from the partner side) from the home station 102 is received by the antenna 416 and restored to the prior (i.e., not-encoded or before-encoding) voice data by the voice decoder 409. Then the restored data is output as the voice from the speaker 407 (steps S505 and S506).

After then, the flow returns to the mode button discrimination process in the step S502.

If it is judged in the step S502 that the "TV" button is touched, the control unit 412 causes the LCD 410 to display the screen shown in FIG. 45B (step S507).

Then the unit 412 performs key scanning on the screen of FIG. 45B (step S508) to generate the equipment control command data based on the scanned result. Thus, for example, if the "CH+" button or the "CH−" button is touched, the equipment control command data indicating a change of the reception channel number is generated. Further, if the "VOL+" button or the "VOL−" button is touched, the equipment control command data indicating a change of the output volume is generated (step S509).

The control unit 412 sets the destination of the control command data to the living TV monitor 103 (step S510).

The control command data and its destination data thus generated by the control unit 412 are supplied to the PIAFS protocol control unit 414 through the data selector 413. The PIAFS protocol control unit 414 sets the control command data and the destination data supplied through the data selector 413, to the data frame according to the data frame structure shown in FIG. 23. Then the unit 414 causes the PHS transmission/reception unit 415 to emit the data frame through the antenna 416 in accordance with the PIAFS protocol (step S515).

The data frame spatially emitted from the antenna 416 is received by the antenna 216 of the home station 102.

After then, the flow returns to the mode button discrimination process in the step S502.

If it is judged in the step S502 that the "VTR" button is touched, the control unit 412 causes the LCD 410 to display the screen shown in FIG. 45C (step S511).

Then the control unit 412 performs key scanning on the screen of FIG. 45C (step S512) to generate the equipment control command data based on the scanned result. Thus, for example, if the "RWD" button is touched, the equipment control command data indicating the video tape rewinding is generated. Further, if the "REPRODUCTION" button is touched, the equipment control command data indicating the video tape reproduction is generated (step S513).

The control unit 412 sets the destination of the control command data to the VTR 104 (step S514).

The control command data and its destination data thus generated by the control unit 412 are supplied to the PIAFS protocol control unit 414 through the data selector 413. The PIAFS protocol control unit 414 sets the control command data and the destination data supplied through the data selector 413, to the data frame according to the data frame structure shown in FIG. 23. Then the unit 414 causes the PHS transmission/reception unit 415 to emit the data frame through the antenna 416, in accordance with the data frame structure shown in FIG. 23 (step S515).

The data frame spatially emitted from the antenna 416 is received by the antenna 216 of the home station 102.

After then, the flow returns to the mode button discrimination process in the step S502.

Subsequently, in FIG. 47, in the home station 102, the PHS transmission/reception unit 217 discriminates whether the data received by the antenna 216 is the voice data or the data frame in which the control command data and the destination data have been set (step S521).

If it is judged in the step S521 the received data is the voice data, the PHS transmission/reception unit 217 recognizes that the portable telephone 301 functions as a telephone, and thus supplied the voice data (i.e., digital encoded voice data) received by the antenna 216 to the voice decoder 421. The voice decoder 421 decodes the voice data from the PHS transmission/reception unit 217 to restore it to the prior (i.e., not-encoded or before-encoding) voice data, and supplies the restored data to the D/A converter 422. The D/A converter 422 analogizes the voice data from the voice decoder 421 and outputs it to the analog public line through the analog telephone unit 423.

In this case, the voice signal from the analog public line is supplied to the A/D converter 420 through the analog telephone unit 423. The A/D converter 420 digitizes the voice signal from the analog telephone unit 423 and then supplies it to the voice encoder 419. The voice encoder 410 encodes the voice data from the A/D converter 420 and emits it from the antenna 216 through the PHS transmission/reception unit 217. Therefore, the emitted voice data is received by the antenna 416 of the portable telephone 301 and output as a voice from the speaker 507 (steps S523 and S524).

If it is judged in the step S521 that the received data is the data frame in which the control command data and the destination data have been set, the PHS transmission/reception unit 217 extracts only the control command data and the destination data from the data frame and supplies them to the 1394 I/F unit 225 through the data selectors 219 and 224.

On the basis of the control command data and the destination data supplied through the data selector 224, the 1394 I/F unit 225 judges whether the destination to which the control command data is to be sent is the living room TV monitor 103 or the VTR 104 (step S525).

If judged in the step S525 that the destination is the living room TV monitor 103, the 1394 I/F unit 225 generates the data packet according to the packet format shown in FIG. 14. At this time, a node ID of the living room TV monitor 103 is set to an object node ID (i.e., node ID of transfer destination) (step S526), and the control command data is set at the data field (step S528).

Then the 1394 I/F unit 225 outputs thus generated data packet to the 1394 serial bus 240 (step S529).

If judged in the step S525 that the destination is the VTR 104, the 1394 I/F unit 225 generates the data packet according to the packet format shown in FIG. 14. At this time, a node ID of the VTR 104 is set to the object node ID (step S527), and the control command data is set at the data field (step S528).

Then the 1394 I/F unit 225 outputs thus generated data packet to the 1394 serial bus 240 (step S529).

Therefore, in the living room TV monitor 103, the 1394 I/F unit 226 receives only the data packet of which destination is own equipment, and the control command set in the received data packet to the TV controller 228 through the data selector 227.

The TV controller 228 controls the a reception channel selection operation at the TV reception unit 433 according to the control command supplied through the data selector 227, and controls the output volume of the speaker 103a by controlling an amplification amount of the amplifier 434.

Similarly, in the VTR 104, the 1394 I/F unit 231 receives only the data packet of which destination is own equipment, and then supplies the control command set in the received data packet to the VTR controller 233 through the data selector 232.

The TV controller 233 controls the operations (i.e., rewinding, reproduction, fast forwarding, pausing, stopping, recording and the like) of the record/reproduction unit 234 in accordance with the control command supplied through the data selector 232.

As described above, according to the present embodiment, in the home station 102, the equipment control command data wirelessly sent from the portable telephone 310 according to the PIAFS protocol is subjected to the format conversion to obtain the data adaptive to the 1394 serial bus 240, and then supplied to the living room TV monitor 103 or the VTR 104 through the 1394 serial bus 240.

By such the structure, it is possible to cause the portable telephone 301 to function as the remote controller for controlling the living room TV monitor 103 and the VTR 104 connected to the 1394 serial bus 240 (home bus).

Further, since the screen corresponding to the equipment intended to be currently controlled or operated is displayed on the LCD 410 of the portable telephone 301, it is possible to increase operational efficiency.

In the above embodiments, the wireless data communication (or wireless data transfer) according to the PIAFS communication protocol (PIAFS protocol) spread over the extension and public modes of the PHS has been explained. However, the present invention is not limited to this, but can be applied to other communication protocols.

Needless to say, the object of the invention can be achieved in a case where a storage medium recording therein program codes of software for realizing the functions of the host computer and the terminal equipment or apparatus in the above embodiments is supplied to the system or the apparatus, and thus a computer (including CPU or MPU) of the system or the apparatus reads and executes the program codes stored in the storage medium.

In this case, the program codes themselves read from the storage medium realize the functions of the above embodiments, whereby the storage medium storing therein the program codes constitutes the invention.

As the storage medium for storing the program codes, for example, a ROM, a floppy disk, a hard disk, an optical disk, a magnetooptical disk, a CD-ROM, a CD-R, a magnetic tape, a nonvolatile memory card and the like can be used.

Further, needless to say, the invention includes not only a case where the computer executes the read program codes to realize the functions of the above embodiments, but also a case where an OS (operating system) running on the computer executes a part or all of the actual processes on the basis of the instructions of the program codes and thus the functions of the above embodiments are realized by such the processes.

Further, needless to say, the invention also includes a case where, after the program codes read from the storage medium are written into a memory provided in a function expansion board inserted in the computer or a function expansion unit connected to the computer, a CPU or the like provided in the function expansion board or the function expansion unit executes a part or all of the actual processes on the basis of the instructions of the program codes and thus the functions of the above embodiments are realized by such the processes.

As explained above, according to the embodiments, by the data communication apparatus (i.e., home station) provided between the first and second equipments, the data wirelessly transmitted from the first equipment is subjected to the format conversion according to the second protocol and then transmitted to the second equipment through the bus (i.e., home bus), and the data transmitted from the second equipment through the bus is subjected to the format conversion according to the first protocol and then wirelessly transmitted to the first equipment.

Thus, it is possible to freely perform the data communication even between the equipments each performing the data communication according to the different protocol.

Concretely, the wireless video equipment (i.e., first equipment such as portable wireless video equipment) transmits the video data obtained by the image pickup means to the home station (i.e., data communication apparatus) in wireless digital transfer (i.e., transfer according to PIAFS protocol or the like). The home station performs the image formation conversion to the video data such that the video data from the wireless video equipment adapts to the home bus (i.e., bus according to IEEE 1394 Standard protocol or the like), and outputs the converted video data to the home bus. Thus, the video display and recording equipments (i.e., second equipment such as video equipment, video monitor and the like) connected to the home bus can display on the screen and record into the recording medium the video data (i.e., video obtained by wireless video equipment) on the home bus, respectively.

Further, when the video data is transmitted from the video display and recording equipments (i.e., second equipment) through the home bus, the home station performs the image format conversion to the received video data such that the data adapts to the wireless digital transfer. Then the home station wirelessly transmits the converted video data. Thus, it is possible for even the wireless video equipment to display on the screen and record into the recording medium the video obtained by the video equipment connected to the home bus.

Therefore, it is possible to freely handle the video data between the wireless video equipment and the vide equipment on the home bus.

Further, for example, if the first equipment is set as the wireless telephone equipment and the object of data transmission and reception is the control data, it is possible to cause the wireless telephone equipment to function as a remote controller, whereby the equipments connected to the home bus can be appropriately controlled.

At this time, it is possible to change the display on the control panel of the wireless telephone equipment so as to correspond to the equipment currently intended to be controlled (or operated). Thus, the wireless telephone equipment can be used as the remote controller of the equipment connected to the home, and also it is possible to improve operation ability of the entire system.

Although the invention has been explained by using the several preferred embodiments, the invention is not limited to the structures of these embodiments. That is, various modifications and changes are possible in the invention without departing from the spirit and scope of the annexed claims.

What is claimed is:

1. A communication system comprising:
a first apparatus in a wireless network;
a second apparatus in a wired network; and
a communication apparatus that includes a wireless communication unit, a decoding unit, an encoding unit, and a wired communication unit,
wherein the wireless communication unit receives first encoded video data encoded by a first video encoding system from the first apparatus through the wireless network,
wherein the decoding unit decodes the first encoded video data received by the wireless communication unit to provide decoded video data,
wherein the encoding unit encodes the decoded video data into second encoded video data using a second video encoding system,
wherein the wired communication unit transmits the second encoded video data to the second apparatus through the wired network,
wherein the first video encoding system is suitable for a first communication protocol used between the first apparatus and the communication apparatus, and the second video encoding system is suitable for a second communication protocol used between the second apparatus and the communication apparatus, and
wherein the first video encoding system uses a video encoding different from MPEG encoding, and the second video encoding system uses MPEG encoding.

2. A communication system according to claim 1, wherein the first apparatus is a video camera, and the second apparatus is an apparatus adapted to record the second encoded video data on a recording medium.

3. A communication system according to claim 1, wherein the first apparatus is a video camera, and the second apparatus is an apparatus adapted to display the second encoded video data.

4. A communication system according to claim 1, wherein the wired communication unit is adapted to transmit the second encoded video data using an isochronous transfer.

5. A communication system according to claim 1, wherein the first video encoding system uses H.263 and the second video encoding system uses MPEG encoding.

6. A communication apparatus comprising:
a wireless communication unit which receives first encoded video data encoded by a first video encoding system from the first apparatus through a wireless network;
a decoding unit which decodes the first encoded video data received by the wireless communication unit to provide decoded video data;
an encoding unit which encodes the decoded video data into second encoded video data using a second video encoding system; and
a wired communication unit which transmits the second encoded video data to the second apparatus through a wired network,
wherein the first video encoding system is suitable for a first communication protocol used between the first apparatus and the communication apparatus, and the second video encoding system is suitable for a second communication protocol used between the second apparatus and the communication apparatus, and
wherein the first video encoding system uses a video encoding different from MPEG encoding, and the second video encoding system uses MPEG encoding.

7. A communication apparatus according to claim 6, wherein the first apparatus is a video camera, and the second apparatus is an apparatus adapted to record the second encoded video data on a recording medium.

8. A communication apparatus according to claim 6, wherein the first apparatus is a video camera, and the second apparatus is an apparatus adapted to display the second encoded video data.

9. A communication apparatus according to claim 6, wherein the wired communication unit is adapted to transmit the second encoded video data using an isochronous transfer.

10. A method for controlling a communication apparatus, the communication apparatus including (a) a wireless communication unit which communicates with a first apparatus through a wireless network and (b) a wired communication unit which communicates with a second apparatus through a wired network, the method comprising the steps of:
receiving first encoded video data encoded by a first video encoding system from the first apparatus using the wireless communication unit;
decoding the first encoded video data received in the receiving step to provide decoded video data;
encoding the decoded video data into second encoded video data using a second video encoding system; and
transmitting the second encoded video data to the second apparatus using the wired communication unit,
wherein the first video encoding system is suitable for a first communication protocol used between the first apparatus and the communication apparatus, and the second video encoding system is suitable for a second communication protocol used between the second apparatus and the communication apparatus, and
wherein the first video encoding system uses a video encoding different from MPEG encoding, and the second video encoding system uses MPEG encoding.

11. A method according to claim 10, wherein the first apparatus is a video camera, and the second apparatus is an apparatus adapted to record the second encoded video data on a recording medium.

12. A method according to claim 10, wherein the first apparatus is a video camera, and the second apparatus is an apparatus adapted to display the second encoded video data.

13. A method according to claim 10, wherein the second encoded video data is transmitted using an isochronous transfer.

14. A communication system comprising:
a first apparatus in a wireless network;
a second apparatus in a wired network; and
a communication apparatus that includes a wireless communication unit, a decoding unit, an encoding unit, and a wired communication unit,
wherein the wired communication unit receives second encoded video data encoded by a second video encoding system from the second apparatus through the wired network, wherein the decoding unit decodes the second encoded video data received by the wired communication unit to provide decoded video data, wherein the encoding unit encodes the decoded video data into first encoded video data using a first video encoding system, wherein the wireless communication unit transmits the first encoded video data to the first apparatus through the wireless network, wherein the first video encoding system is suitable for a first communication protocol used between the first apparatus and the communication apparatus, and the second video encoding system is suitable for a second communication protocol used between the second apparatus and the communication apparatus, and wherein the first video encoding system uses a video encoding different from MPEG encoding, and the second video encoding system uses MPEG encoding.

15. A communication system according to claim 14, wherein the first apparatus is an apparatus adapted to record the first encoded video data on a recording medium, and the second apparatus is an apparatus adapted to reproduce the second encoded video data from a recording medium.

16. A communication system according to claim 14, wherein the first apparatus is an apparatus adapted to display the first encoded video data, and the second apparatus is an apparatus adapted to reproduce the second encoded video data from a recording medium.

17. A communication system according to claim 14, wherein the wired communication unit is adapted to receive the second encoded video data using an isochronous transfer.

18. A communication apparatus comprising:
a wired communication unit which receives second encoded video data encoded by a second video encoding system from the second apparatus through a wired network;
a decoding unit which decodes the second encoded video data received by the wired communication unit to provide decoded video data;
an encoding unit which encodes the decoded video data into first encoded video data using a first video encoding system; and
a wireless communication unit which transmits the first encoded video data to the first apparatus through a wireless network,
wherein the first video encoding system is suitable for a first communication protocol used between the first apparatus and the communication apparatus, and the second video encoding system is suitable for a second communication protocol used between the second apparatus and the communication apparatus, and
wherein the first video encoding system uses a video encoding different from MPEG encoding, and the second video encoding system uses MPEG encoding.

19. A communication apparatus according to claim 18, wherein the first apparatus is an apparatus adapted to record the first encoded video data on a recording medium, and the second apparatus is an apparatus adapted to reproduce the second encoded video data from a recording medium.

20. A communication apparatus according to claim 18, wherein the first apparatus is an apparatus adapted to display the first encoded video data, and the second apparatus is an apparatus adapted to reproduce the second encoded video data from a recording medium.

21. A communication apparatus according to claim 18, wherein the wired communication unit is adapted to receive the second encoded video data using an isochronous transfer.

22. A method for a communication apparatus, the communication apparatus including (a) a wireless communication unit which communicates with a first apparatus through a wireless network and (b) a wired communication unit which communicates with a second apparatus through a wired network, the method comprising the steps of:
receiving second encoded video data encoded by a second video encoding system from the second apparatus using the wired communication unit;
decoding the second encoded video data received in the receiving step to provide decoded video data;
encoding the decoded video data into first encoded video data using a first video encoding system; and
transmitting the first encoded video data to the first apparatus using the wireless communication unit,
wherein the first video encoding system is suitable for a first communication protocol used between the first apparatus and the communication apparatus, and the second video encoding system is suitable for a second communication protocol used between the second apparatus and the communication apparatus, and
wherein the first video encoding system uses a video encoding different from MPEG encoding, and the second video encoding system uses MPEG encoding.

23. A method according to claim 22, wherein the first apparatus is an apparatus adapted to record the first encoded video data on a recording medium, and the second apparatus is an apparatus adapted to reproduce the second encoded video data from a recording medium.

24. A method according to claim 22, wherein the first apparatus is an apparatus adapted to display the first encoded video data, and the second apparatus is an apparatus adapted to reproduce the second encoded video data from a recording medium.

25. A method according to claim 22, wherein the second encoded video data is received using an isochronous transfer.

26. A communication system according to claim 5, wherein the MPEG encoding is MPEG1 encoding.

* * * * *

UNITED STATES PATENT AND TRADEMARK OFFICE
CERTIFICATE OF CORRECTION

PATENT NO. : 7,275,255 B2
APPLICATION NO. : 09/371537
DATED : September 25, 2007
INVENTOR(S) : Hirofumi Suda et al.

It is certified that error appears in the above-identified patent and that said Letters Patent is hereby corrected as shown below:

COLUMN 4:
    Line 14, "as" should read --to as--.
    Line 16, "as" should read --to as--.
    Line 19, "as" should read --to as--.

COLUMN 6:
    Line 35, "a equipment" should read --an equipment--.

COLUMN 8:
    Line 58, "request" should read --requests--.

COLUMN 9:
    Line 65 "and-can" should read --and can--.

COLUMN 10:
    Line 7, "an" should read --a--.

COLUMN 11:
    Line 46, "cannot" should read --cannot be--.

COLUMN 12:
    Line 1, "fair" should read --a fair--.

COLUMN 21:
    Line 49, "wait" should read --wait for--.

COLUMN 22:
    Line 18, "an" should read --a--.

COLUMN 24:
    Line 43, "can not" should read --cannot--.
    Line 50, "can not" should read --cannot--.

UNITED STATES PATENT AND TRADEMARK OFFICE
CERTIFICATE OF CORRECTION

PATENT NO. : 7,275,255 B2
APPLICATION NO. : 09/371537
DATED : September 25, 2007
INVENTOR(S) : Hirofumi Suda et al.

It is certified that error appears in the above-identified patent and that said Letters Patent is hereby corrected as shown below:

COLUMN 25:
  Line 22, "succeed" should read --success--.

COLUMN 26:
  Line 18, "of which" should read --of which the--.
  Line 22, "of which" should read --of which the--.

COLUMN 31:
  Line 36, "generates the data frame shown" should read --shown--.

COLUMN 32:
  Line 25, "door" should read --doors--.
  Line 64, "encode" should read --encodes--.

COLUMN 37:
  Line 14, "the a" should read --the--.

COLUMN 38:
  Line 57, "vide" should read --video--.

Signed and Sealed this

Twenty-seventh Day of May, 2008

JON W. DUDAS
*Director of the United States Patent and Trademark Office*